(12) United States Patent
Meier et al.

(10) Patent No.: US 7,331,523 B2
(45) Date of Patent: Feb. 19, 2008

(54) ADAPTIVE OPTICAL IMAGE READER

(75) Inventors: Timothy Meier, Camillus, NY (US); Andrew Longacre, Jr., Skaneateles, NY (US); Thomas Hawley, Skaneateles, NY (US); John Pettinelli, Camillus, NY (US); Robert M. Hussey, Camillus, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 26 days.

(21) Appl. No.: 10/775,983

(22) Filed: Feb. 10, 2004

(65) Prior Publication Data
US 2005/0056699 A1    Mar. 17, 2005

Related U.S. Application Data

(63) Continuation-in-part of application No. 09/904,697, filed on Jul. 13, 2001, now Pat. No. 6,722,569.

(60) Provisional application No. 60/470,016, filed on May 12, 2003.

(51) Int. Cl.
G02B 26/10 (2006.01)

(52) U.S. Cl. .......................... 235/462.25; 235/462.24; 235/462.26

(58) Field of Classification Search ........... 235/462.25, 235/462.26, 462.24
See application file for complete search history.

(56) References Cited

U.S. PATENT DOCUMENTS

| | | | |
|---|---|---|---|
| 3,582,884 A | 6/1971 | Shepard |
| 3,663,762 A | 5/1972 | Joel, Jr. |
| 3,684,868 A | 8/1972 | Christie et al. |
| 3,723,970 A | 3/1973 | Stoller |
| 3,906,166 A | 9/1975 | Cooper et al. |
| 4,004,237 A | 1/1977 | Kratzer |
| 4,041,391 A | 8/1977 | Deerkoski |
| 4,097,847 A | 6/1978 | Forsen et al. |
| 4,114,155 A | 9/1978 | Raab |
| 4,164,628 A | 8/1979 | Ward et al. |
| 4,210,802 A | 7/1980 | Sakai |
| 4,291,410 A | 9/1981 | Caples et al. |

(Continued)

FOREIGN PATENT DOCUMENTS

AU          701057          5/1997

(Continued)

OTHER PUBLICATIONS

U.S. Appl. No. 10/982,393, filed Nov. 5, 2004, Biss et al.

(Continued)

*Primary Examiner*—Ahshik Kim
(74) *Attorney, Agent, or Firm*—Marjama Muldoon Blasiak & Sullivan LLP

(57) ABSTRACT

There is described in one embodiment a method for use by an apparatus that can acquire an image. According to a described method, parameters for utilization by the apparatus are provided. According to a described method, a method can include acquiring an image and can further include evaluating an image. In another embodiment, there is described an apparatus comprising a plurality of digitizers. In one example of an embodiment of an apparatus including a plurality of digitizers, the digitizers can be configured to run in parallel. In another example of an embodiment of an apparatus including a plurality of digitizers, the digitizers can be configured to run in series.

43 Claims, 25 Drawing Sheets

U.S. PATENT DOCUMENTS

| | | | |
|---|---|---|---|
| 4,315,245 A | 2/1982 | Nakahara et al. | |
| 4,435,822 A | 3/1984 | Spencer et al. | |
| 4,445,118 A | 4/1984 | Taylor et al. | |
| 4,488,678 A | 12/1984 | Hara et al. | |
| 4,488,679 A | 12/1984 | Bockholt et al. | |
| 4,500,776 A | 2/1985 | Laser | |
| 4,538,060 A | 8/1985 | Sakai et al. | |
| 4,542,528 A | 9/1985 | Sanner et al. | |
| 4,561,089 A | 12/1985 | Rouse et al. | |
| 4,570,057 A | 2/1986 | Chadima, Jr. et al. | |
| 4,610,359 A | 9/1986 | Muller | |
| 4,628,532 A | 12/1986 | Stone et al. | |
| 4,636,624 A | 1/1987 | Ishida et al. | |
| 4,639,932 A | 1/1987 | Schiff | |
| 4,644,523 A | 2/1987 | Horwitz | |
| 4,646,353 A | 2/1987 | Tenge et al. | |
| 4,653,076 A | 3/1987 | Jerrim et al. | |
| 4,686,363 A | 8/1987 | Schoon | |
| 4,690,530 A | 9/1987 | Fujino et al. | |
| 4,710,817 A | 12/1987 | Ando | |
| 4,785,463 A | 11/1988 | Janc et al. | |
| 4,791,446 A | 12/1988 | Ishida et al. | |
| 4,794,239 A | 12/1988 | Allais | |
| 4,807,256 A | 2/1989 | Holmes et al. | |
| 4,818,856 A | 4/1989 | Matsushima et al. | |
| 4,825,058 A * | 4/1989 | Poland | 235/462.01 |
| 4,841,544 A | 6/1989 | Nuytkens | |
| 4,874,936 A | 10/1989 | Chandler et al. | |
| 4,877,949 A | 10/1989 | Danielson et al. | |
| 4,896,029 A | 1/1990 | Chandler et al. | |
| 4,901,073 A | 2/1990 | Kibrick | |
| 4,908,500 A | 3/1990 | Baumberger | |
| 4,942,474 A | 7/1990 | Akimoto et al. | |
| 4,998,010 A | 3/1991 | Chandler et al. | |
| 5,019,699 A | 5/1991 | Koenck | |
| 5,113,445 A | 5/1992 | Wang | |
| 5,138,140 A | 8/1992 | Siemiatkowski et al. | |
| 5,153,418 A | 10/1992 | Batterman et al. | |
| 5,153,421 A | 10/1992 | Tandon et al. | |
| 5,189,292 A | 2/1993 | Batterman et al. | |
| 5,212,777 A | 5/1993 | Gove et al. | |
| 5,223,701 A | 6/1993 | Batterman et al. | |
| 5,235,187 A | 8/1993 | Arney et al. | |
| 5,245,695 A | 9/1993 | Basehore | |
| 5,262,871 A | 11/1993 | Wilder et al. | |
| 5,272,323 A | 12/1993 | Martino | |
| 5,278,397 A * | 1/1994 | Barkan et al. | 235/462.49 |
| 5,286,960 A | 2/1994 | Longacre, Jr. et al. | |
| 5,294,783 A | 3/1994 | Hammond, Jr. et al. | |
| 5,304,786 A | 4/1994 | Pavlidis et al. | |
| 5,304,787 A | 4/1994 | Wang | |
| 5,311,001 A | 5/1994 | Joseph et al. | |
| 5,319,185 A | 6/1994 | Obata | |
| 5,331,176 A | 7/1994 | Sant' Anselmo et al. | |
| 5,343,028 A | 8/1994 | Figarella et al. | |
| 5,345,266 A | 9/1994 | Denyer | |
| 5,354,977 A | 10/1994 | Roustaei | |
| 5,378,881 A | 1/1995 | Adachi | |
| 5,378,883 A | 1/1995 | Batterman et al. | |
| 5,392,447 A | 2/1995 | Schlack et al. | |
| 5,396,054 A | 3/1995 | Krichever et al. | |
| 5,399,852 A | 3/1995 | Zheng et al. | |
| 5,401,949 A | 3/1995 | Ziemacki et al. | |
| 5,412,197 A | 5/1995 | Smith | |
| 5,414,251 A | 5/1995 | Durbin | |
| 5,418,862 A | 5/1995 | Zheng et al. | |
| 5,420,409 A | 5/1995 | Longacre, Jr. et al. | |
| 5,422,470 A | 6/1995 | Kubo | |
| 5,428,211 A | 6/1995 | Zheng et al. | |
| 5,430,286 A | 7/1995 | Hammond, Jr. et al. | |
| 5,430,472 A | 7/1995 | Curry | |
| 5,446,271 A | 8/1995 | Cherry et al. | |
| 5,461,425 A | 10/1995 | Fowler et al. | |
| 5,463,214 A | 10/1995 | Longacre, Jr. et al. | |
| 5,471,515 A | 11/1995 | Fossum et al. | |
| 5,471,592 A | 11/1995 | Gove et al. | |
| 5,477,042 A | 12/1995 | Wang | |
| 5,478,997 A | 12/1995 | Bridgelall et al. | |
| 5,478,999 A | 12/1995 | Figarella et al. | |
| 5,479,515 A | 12/1995 | Longacre, Jr. | |
| 5,481,098 A | 1/1996 | Davis et al. | |
| 5,487,115 A | 1/1996 | Surka | |
| 5,489,769 A | 2/1996 | Kubo | |
| 5,504,524 A | 4/1996 | Lu et al. | |
| 5,512,739 A | 4/1996 | Chandler et al. | |
| 5,517,018 A | 5/1996 | Zheng et al. | |
| 5,521,366 A | 5/1996 | Wang et al. | |
| 5,524,068 A | 6/1996 | Kacandes et al. | |
| 5,537,431 A | 7/1996 | Chen et al. | |
| 5,545,886 A | 8/1996 | Metlitsky et al. | |
| 5,565,669 A | 10/1996 | Liu | |
| 5,567,934 A | 10/1996 | Zheng et al. | |
| 5,569,901 A * | 10/1996 | Bridgelall et al. | 235/470 |
| 5,572,006 A | 11/1996 | Wang et al. | |
| 5,585,616 A | 12/1996 | Roxby et al. | |
| 5,591,955 A | 1/1997 | Laser | |
| 5,591,956 A | 1/1997 | Longacre, Jr. et al. | |
| 5,598,007 A | 1/1997 | Bunce et al. | |
| 5,600,119 A | 2/1997 | Dvorkis et al. | |
| 5,610,387 A | 3/1997 | Bard et al. | |
| 5,612,524 A | 3/1997 | Sant' Anselmo et al. | |
| 5,621,203 A | 4/1997 | Swartz et al. | |
| 5,637,849 A | 6/1997 | Wang et al. | |
| 5,638,465 A | 6/1997 | Sano et al. | |
| 5,640,202 A * | 6/1997 | Kondo et al. | 348/222.1 |
| 5,663,549 A | 9/1997 | Katz et al. | |
| 5,665,959 A | 9/1997 | Fossum et al. | |
| 5,666,167 A | 9/1997 | Tults | |
| 5,668,803 A | 9/1997 | Tymes et al. | |
| 5,672,858 A | 9/1997 | Li et al. | |
| 5,698,833 A | 12/1997 | Skinger | |
| 5,702,059 A | 12/1997 | Chu et al. | |
| 5,703,349 A * | 12/1997 | Meyerson et al. | 235/462.48 |
| 5,710,417 A | 1/1998 | Joseph et al. | |
| 5,723,823 A | 3/1998 | Bell | |
| 5,723,853 A | 3/1998 | Longacre, Jr. et al. | |
| 5,723,868 A | 3/1998 | Hammond, Jr. et al. | |
| 5,726,435 A | 3/1998 | Hara et al. | |
| 5,739,518 A | 4/1998 | Wang | |
| 5,756,981 A | 5/1998 | Roustaei et al. | |
| 5,763,864 A | 6/1998 | O'Hagan et al. | |
| 5,773,806 A | 6/1998 | Longacre, Jr. | |
| 5,773,810 A | 6/1998 | Hussey et al. | |
| 5,774,357 A | 6/1998 | Hoffberg et al. | |
| 5,780,834 A | 7/1998 | Havens et al. | |
| 5,783,811 A | 7/1998 | Feng et al. | |
| 5,784,102 A * | 7/1998 | Hussey et al. | 348/296 |
| 5,811,774 A | 9/1998 | Ju et al. | |
| 5,811,784 A | 9/1998 | Tausch et al. | |
| 5,814,801 A | 9/1998 | Wang et al. | |
| 5,814,803 A | 9/1998 | Olmstead et al. | |
| 5,815,200 A | 9/1998 | Ju et al. | |
| 5,818,028 A | 10/1998 | Meyerson et al. | |
| 5,818,528 A | 10/1998 | Roth et al. | |
| 5,825,006 A | 10/1998 | Longacre, Jr. et al. | |
| 5,831,254 A | 11/1998 | Karpen et al. | |
| 5,831,674 A | 11/1998 | Ju et al. | |
| 5,841,121 A | 11/1998 | Koenck | |
| 5,841,126 A | 11/1998 | Fossum et al. | |
| 5,867,594 A | 2/1999 | Cymbalski | |
| 5,867,595 A | 2/1999 | Cymbalski | |
| 5,875,108 A | 2/1999 | Hoffberg et al. | |
| 5,877,487 A | 3/1999 | Tani et al. | |
| 5,900,613 A | 5/1999 | Koziol et al. | |

| | | | |
|---|---|---|---|
| 5,914,476 A | 6/1999 | Gerst, III et al. | |
| 5,917,171 A | 6/1999 | Sasai | |
| 5,917,945 A | 6/1999 | Cymbalski | |
| 5,920,477 A | 7/1999 | Hoffberg et al. | |
| 5,926,214 A | 7/1999 | Denyer et al. | |
| 5,929,416 A | 7/1999 | Dos Santos Pato et al. | |
| 5,929,418 A | 7/1999 | Ehrhart et al. | |
| 5,932,862 A | 8/1999 | Hussey et al. | |
| 5,942,741 A | 8/1999 | Longacre et al. | |
| 5,949,052 A | 9/1999 | Longacre, Jr. et al. | |
| 5,949,054 A | 9/1999 | Karpen et al. | |
| 5,949,056 A | 9/1999 | White | |
| 5,962,838 A * | 10/1999 | Tamburrini | 235/462.45 |
| 5,965,863 A | 10/1999 | Parker et al. | |
| 5,979,763 A | 11/1999 | Wang et al. | |
| 5,979,768 A | 11/1999 | Koenck | |
| 5,984,186 A | 11/1999 | Tafoya | |
| 5,986,297 A | 11/1999 | Guidash et al. | |
| 6,003,008 A | 12/1999 | Postrel et al. | |
| 6,017,496 A | 1/2000 | Nova et al. | |
| 6,019,286 A * | 2/2000 | Li et al. | 235/454 |
| 6,053,407 A | 4/2000 | Wang et al. | |
| 6,064,763 A | 5/2000 | Maltsev | |
| 6,070,800 A | 6/2000 | Fujita et al. | |
| 6,082,619 A | 7/2000 | Ma et al. | |
| 6,119,179 A | 9/2000 | Whitridge et al. | |
| 6,123,264 A | 9/2000 | Li et al. | |
| 6,129,278 A | 10/2000 | Wang et al. | |
| 6,144,453 A | 11/2000 | Hallerman et al. | |
| 6,152,368 A | 11/2000 | Olmstead et al. | |
| 6,155,488 A | 12/2000 | Olmstead et al. | |
| 6,155,491 A | 12/2000 | Dueker et al. | |
| 6,161,760 A | 12/2000 | Marrs et al. | |
| 6,170,749 B1 | 1/2001 | Goren et al. | |
| 6,173,894 B1 | 1/2001 | Olmstead et al. | |
| 6,176,428 B1 | 1/2001 | Joseph et al. | |
| 6,176,429 B1 | 1/2001 | Reddersen et al. | |
| 6,179,208 B1 * | 1/2001 | Feng | 235/472.01 |
| 6,186,404 B1 | 2/2001 | Ehrhart et al. | |
| 6,215,992 B1 | 4/2001 | Howell et al. | |
| 6,219,182 B1 | 4/2001 | McKinley | |
| 6,230,975 B1 | 5/2001 | Colley et al. | |
| 6,264,105 B1 | 7/2001 | Longacre, Jr. et al. | |
| 6,276,605 B1 | 8/2001 | Olmstead et al. | |
| 6,311,895 B1 | 11/2001 | Olmstead et al. | |
| 6,315,204 B1 | 11/2001 | Knighton et al. | |
| 6,329,139 B1 | 12/2001 | Nova et al. | |
| 6,347,163 B2 | 2/2002 | Roustaei | |
| 6,360,948 B1 | 3/2002 | Yang et al. | |
| 6,385,352 B1 * | 5/2002 | Roustaei | 382/324 |
| 6,398,112 B1 | 6/2002 | Li et al. | |
| 6,429,934 B1 | 8/2002 | Dunn et al. | |
| 6,462,842 B1 | 10/2002 | Hamilton | |
| 6,486,911 B1 | 11/2002 | Denyer et al. | |
| 6,491,223 B1 | 12/2002 | Longacre et al. | |
| 6,493,029 B1 | 12/2002 | Denyer et al. | |
| 6,505,778 B1 | 1/2003 | Reddersen et al. | |
| 6,508,404 B2 | 1/2003 | Hecht | |
| 6,512,218 B1 | 1/2003 | Canini et al. | |
| 6,525,827 B2 | 2/2003 | Liu | |
| 6,547,139 B1 | 4/2003 | Havens et al. | |
| 6,547,142 B1 | 4/2003 | Goren et al. | |
| 6,552,323 B2 | 4/2003 | Guidash et al. | |
| 6,552,746 B1 | 4/2003 | Yang et al. | |
| 6,565,003 B1 | 5/2003 | Ma | |
| 6,575,367 B1 | 6/2003 | Longacre, Jr. | |
| 6,578,766 B1 | 6/2003 | Parker et al. | |
| 6,585,159 B1 | 7/2003 | Meier et al. | |
| 6,598,797 B2 | 7/2003 | Lee | |
| 6,606,171 B1 | 8/2003 | Renk et al. | |
| 6,634,558 B1 | 10/2003 | Patel et al. | |
| 6,637,658 B2 | 10/2003 | Gardiner et al. | |
| 6,655,595 B1 | 12/2003 | Longacre, Jr. et al. | |
| 6,661,521 B1 | 12/2003 | Stern | |
| 6,665,012 B1 | 12/2003 | Yang et al. | |
| 6,666,377 B1 | 12/2003 | Harris | |
| 6,672,511 B1 | 1/2004 | Shellhammer | |
| 6,678,412 B1 | 1/2004 | Shigekusa et al. | |
| 6,685,095 B2 | 2/2004 | Roustaei et al. | |
| 6,698,656 B2 | 3/2004 | Parker et al. | |
| 6,714,239 B2 | 3/2004 | Guidash | |
| 6,714,665 B1 | 3/2004 | Hanna et al. | |
| 6,722,569 B2 * | 4/2004 | Ehrhart et al. | 235/469 |
| 6,729,546 B2 * | 5/2004 | Roustaei | 235/462.45 |
| 6,732,929 B2 | 5/2004 | Good et al. | |
| 6,732,930 B2 | 5/2004 | Massieu et al. | |
| 6,736,321 B2 | 5/2004 | Tsikos et al. | |
| 6,739,511 B2 | 5/2004 | Tsikos et al. | |
| 6,742,707 B1 | 6/2004 | Tsikos et al. | |
| 6,814,290 B2 | 11/2004 | Longacre | |
| 6,832,729 B1 | 12/2004 | Perry et al. | |
| 6,837,432 B2 | 1/2005 | Tsikos et al. | |
| 6,854,649 B2 | 2/2005 | Worner et al. | |
| 6,857,570 B2 | 2/2005 | Tsikos et al. | |
| 6,858,159 B2 | 2/2005 | Lyons | |
| 6,860,428 B1 | 3/2005 | Dowling et al. | |
| 6,863,216 B2 | 3/2005 | Tsikos et al. | |
| 6,877,665 B2 | 4/2005 | Challa et al. | |
| 6,982,800 B1 | 1/2006 | Cavill et al. | |
| 7,055,747 B2 | 6/2006 | Havens et al. | |
| 7,059,525 B2 | 6/2006 | Longacre et al. | |
| 7,077,317 B2 | 7/2006 | Longacre, Jr. et al. | |
| 7,077,321 B2 | 7/2006 | Longacre, Jr. et al. | |
| 7,080,786 B2 | 7/2006 | Longacre, Jr. et al. | |
| 7,086,596 B2 | 8/2006 | Meier et al. | |
| 7,090,132 B2 | 8/2006 | Havens et al. | |
| D528,146 S | 9/2006 | Fitch | |
| 7,104,456 B2 | 9/2006 | Parker et al. | |
| 2002/0039099 A1 | 4/2002 | Harper | |
| 2002/0039457 A1 | 4/2002 | Helms et al. | |
| 2002/0135683 A1 | 9/2002 | Tamama et al. | |
| 2002/0145043 A1 | 10/2002 | Challa et al. | |
| 2002/0158127 A1 | 10/2002 | Hori et al. | |
| 2003/0042311 A1 | 3/2003 | Longacre et al. | |
| 2003/0062418 A1 | 4/2003 | Barber et al. | |
| 2003/0085282 A1 | 5/2003 | Parker et al. | |
| 2003/0146283 A1 | 8/2003 | Longacre et al. | |
| 2003/0218067 A1 | 11/2003 | Parker et al. | |
| 2004/0004128 A1 | 1/2004 | Pettinelli et al. | |
| 2004/0094627 A1 | 5/2004 | Parker et al. | |
| 2004/0195332 A1 | 10/2004 | Barber et al. | |
| 2004/0206821 A1 | 10/2004 | Longacre et al. | |
| 2004/0256464 A1 | 12/2004 | Longacre et al. | |
| 2004/0256465 A1 | 12/2004 | Longacre et al. | |
| 2004/0262392 A1 | 12/2004 | Longacre et al. | |
| 2004/0262394 A1 | 12/2004 | Longacre et al. | |
| 2004/0262395 A1 | 12/2004 | Longacre et al. | |
| 2004/0262396 A1 | 12/2004 | Longacre et al. | |
| 2004/0262399 A1 | 12/2004 | Longacre et al. | |
| 2005/0056699 A1 | 3/2005 | Meier et al. | |
| 2005/0103851 A1 | 5/2005 | Zhu et al. | |
| 2005/0161511 A1 | 7/2005 | Parker et al. | |
| 2006/0175413 A1 | 8/2006 | Longacre et al. | |
| 2006/0255150 A1 | 11/2006 | Longacre | |

FOREIGN PATENT DOCUMENTS

| | | |
|---|---|---|
| CA | 2156153 A1 | 9/1994 |
| CA | 2190189 A1 | 9/1994 |
| CA | 2190190 A1 | 9/1994 |
| CA | 02234617 A1 | 4/1997 |
| CN | 1204411 A | 6/1999 |
| DE | 694 18 598 T2 | 11/1999 |
| EP | 97/15024 | 4/1997 |
| EP | 0685092 T3 | 11/1999 |
| ES | 2 134 933 T3 | 10/1999 |

| | | |
|---|---|---|
| GB | 2 308 267 A | 6/1997 |
| GB | 2 343 079 A | 4/2000 |
| GB | 2 344 486 A | 6/2000 |
| JP | 08-506678 | 7/1996 |
| JP | 10-508133 | 8/1998 |
| JP | 2895236 | 3/1999 |
| JP | 11-515124 | 12/1999 |
| WO | WO 93/04442 | 3/1993 |
| WO | WO 93/14458 | 7/1993 |
| WO | WO 93/17397 | 9/1993 |
| WO | WO 93/18478 | 9/1993 |
| WO | WO 94/19766 | 9/1994 |
| WO | WO 95/32580 | 11/1995 |
| WO | WO 97/01828 | 1/1997 |
| WO | WO 97/08647 | 3/1997 |
| WO | WO 97/15024 | 4/1997 |

OTHER PUBLICATIONS

U.S. Appl. No. 10/938,416, filed Sep. 10, 2004, Fitch et al.
U.S. Appl. No. 11/236,176, filed Sep. 28, 2005, Charles P. Barber et al.
International Searching Authority, International Search Report and Written Opinion, Mailed Sep. 7, 2005, (20 pgs.).
U.S. Appl. No. 11/413,128, filed Apr. 27, 2006, Longacre, Jr.
U.S. Appl. No. 11/412,703, filed Apr. 27, 2006, Longacre, Jr., et al.

* cited by examiner

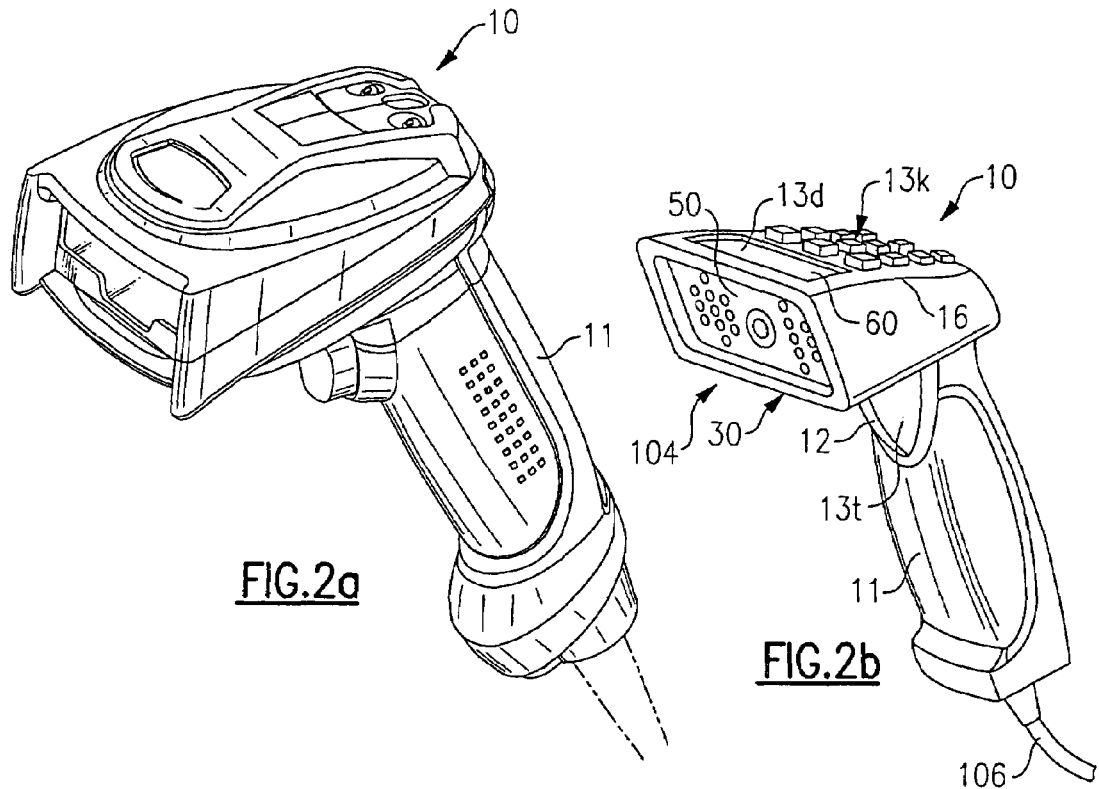
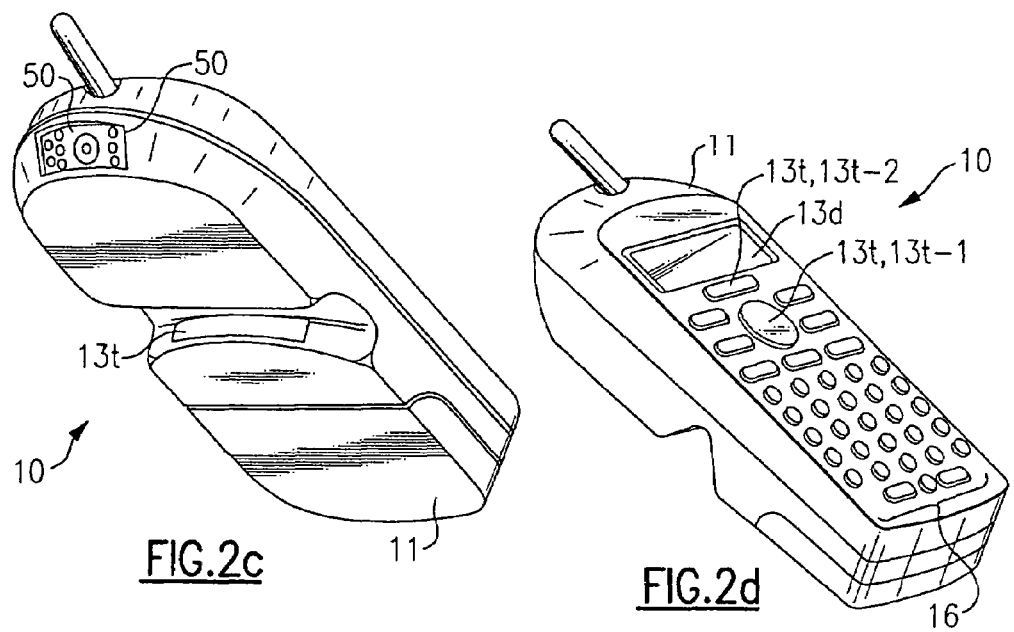
FIG.2a  FIG.2b  FIG.2c  FIG.2d

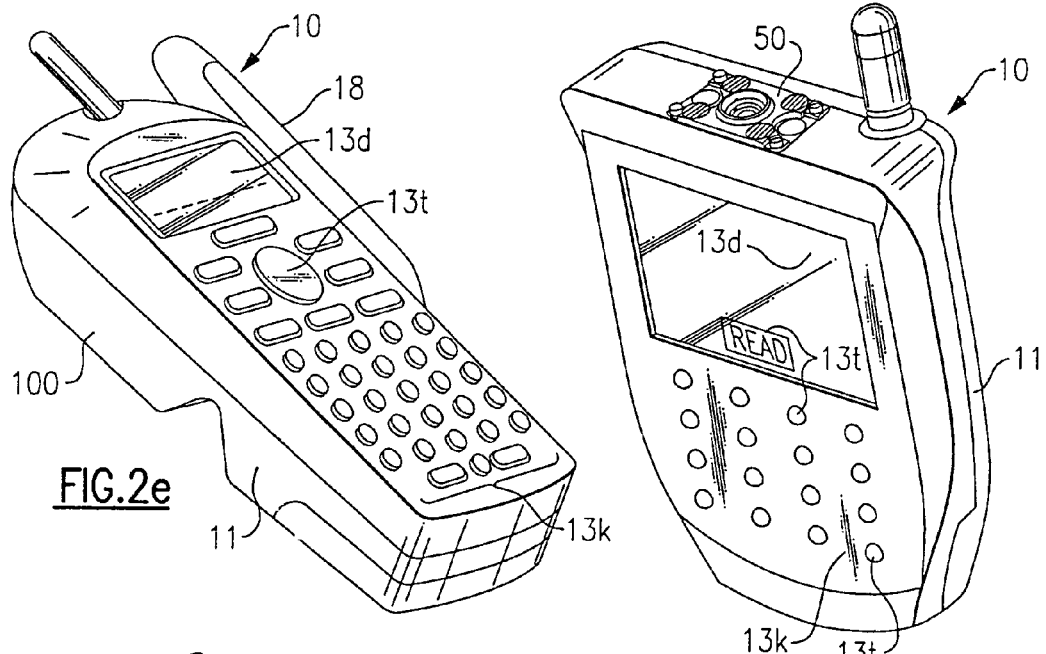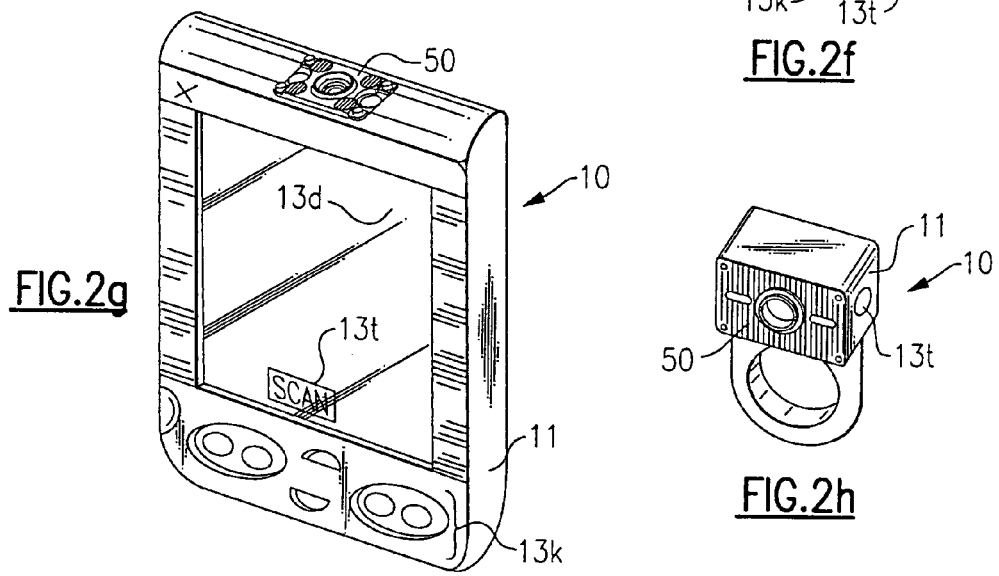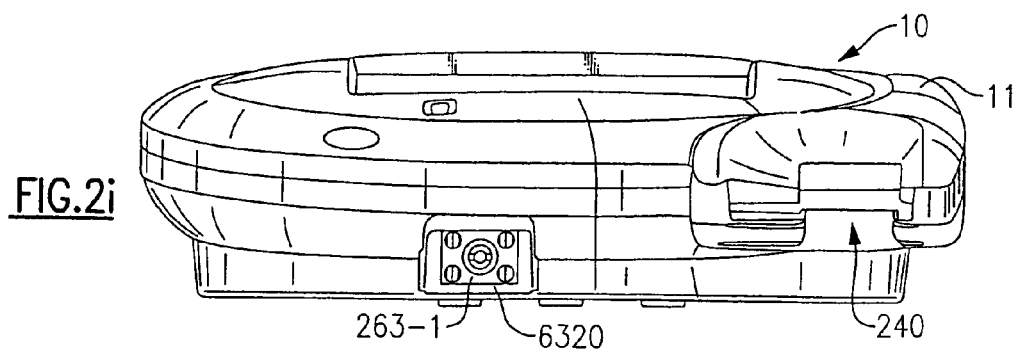

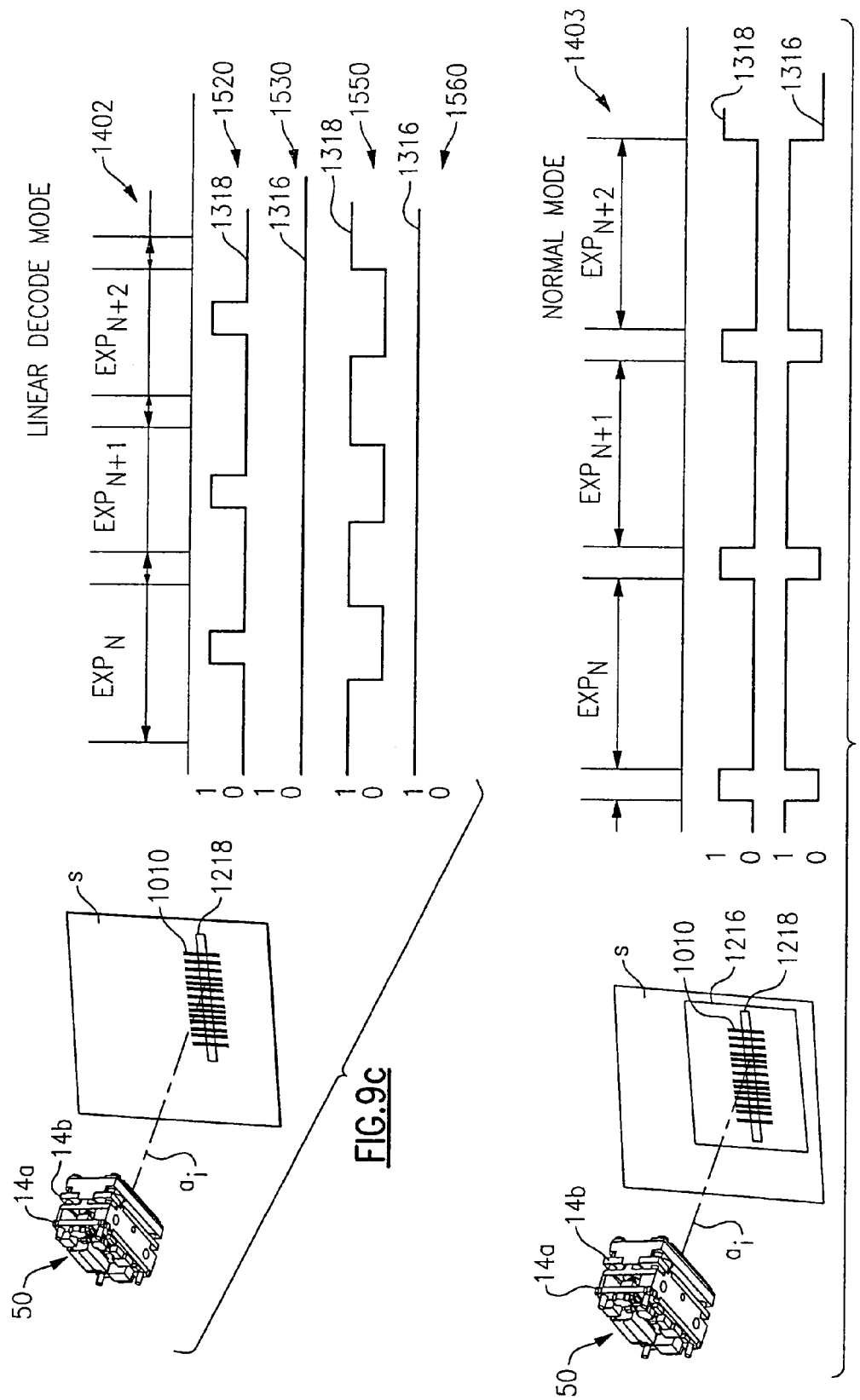

ADAPTIVE OPTICAL IMAGE READER

CROSS REFERENCE TO RELATED APPLICATIONS

This application claims the priority of U.S. Provisional Application No. 60/470,016 filed May 12, 2003. The priority of the above application is claimed and the above application is incorporated herein by reference. This application also incorporates by reference U.S. patent application Ser. No. 09/904,697 filed Jul. 13, 2001, now U.S. Pat. No. 6,722,569.

FIELD OF THE INVENTION

Embodiments of the invention are directed to optical image reader apparatus and methods and, more particularly, to an optical image reader apparatus and method providing improved functionality and adaptability to object environments.

BACKGROUND OF THE INVENTION

Optical readers tend to fall into one of three classes: wand readers, laser scan engine optical readers and image sensor based optical readers.

Wand readers generally comprise a single light source and single photodetector housed in a pen shaped housing. A user drags the wand reader across a decodable symbol (e.g., a bar code) and a signal is generated representative of the bar space pattern of the bar code.

Laser scan engine based optical readers comprise a laser diode assembly generating a laser light beam, a moving mirror for sweeping the laser light beam across a decodable symbol and a signal is generated corresponding to the decodable symbol. Image sensor based optical readers comprise multielement image sensors such as CID, CCD, and CMOS image sensors and an imaging optic for focusing an image onto the image sensor. In operation of an image sensor based optical reader, an image of a decodable symbol is focused on an image sensor and a signal is generated corresponding to the image.

Image sensor based optical readers are more durable and offer additional features relative to laser scan engine based bar code readers. An additional function which has been incorporated into image sensor based optical readers is a picture taking function. Optical readers have been developed which can both take pictures and decode decodable symbols represented in captured image data.

The evolution of data forms (bar code formats) from one dimensional linear codes to two dimensional matrix symbologies has spurred a concomitant need to read and decode greater amounts of data in shorter periods of time, with a higher degree of accuracy, and under more demanding environmental conditions (e.g., low light levels, longer read distances, etc.) than before. These challenges also demand device ease of use and speed of use, which is being addressed in part by the automatic adaptation of reader systems and methods. As an illustration, the interested reader is directed to commonly assigned published application U.S. 2004/0004128, incorporated herein by reference in its entirety to the fullest extent allowed by applicable laws and rules, which relates to 1D/2D auto discrimination and reader reprogramability.

Optical decoding optical readers digitize image data prior to subjecting the image data to decoding processing such as bar code symbology decoding or OCR decoding. It is generally known that the best digitizing algorithm for use in digitizing a certain set of image data depends on features of the image data. A digitization method that may be useful for digitizing image data under a first imaging condition or which corresponds to a first type of symbol may not be useful for digitizing image data captured under a second set of imaging conditions or which corresponds to a second type of symbol, for example.

The approach of prior artisans who are cognizant of the fact that a best digitization method for a particular set of image data may vary depending upon features of the image data has been to successively subject the set of image data to multiple digitization algorithms. U.S. Pat. No. 6,082,621, for example, describes an analog digitizer for developing a series of "1" value or "0" value pixel values wherein an analog signal is subjected to multiple gray-to-binary conversion threshold values. If decoding the image data digitized utilizing the first binary conversion threshold fails, the image data is redigitized using a second binary conversion threshold and subjected to decoding again. If decoding again fails, the image data is digitized again using a third binary conversion threshold and so on. In digitization methods that use the reiterative decoding attempt approach method, the digitizing methods useful for digitizing the most commonly encountered image features are tried first, and the least commonly encountered image features are attempted last.

The decoding of image data by digitization of rarely seen image features subjects the image data to multiple digitation methods and decoding attempts before one is successful. Furthermore, if a symbol representation of a set of image data is of a type that cannot be decoded, several attempts to digitize and decode the symbol representation are nevertheless made. It can be appreciated, therefore, that the above approach can be extremely time consuming and prone to repetitive failure.

An example is illustrated by the fact that most readers are designed to operate with a fixed field of view or, in other words, over a fixed and generally limited range of distances between the reader and the code. If a bar code read is attempted outside of the designed read range, neither the system components nor the reader algorithms will be sufficient to provide a successful first read attempt, leading to business inefficiencies in the long run. In addition to reading distance, an image reader may incorporate a digitizer algorithm that optimizes the reader for a different condition such as bar code contrast, color contrast, blurring due to motion, bar growth (inking related issues), or others, resulting in an image reader that is application or environment specific. Accordingly, there is a need to further advance operational adaptability of optical image readers.

SUMMARY OF THE INVENTION

There is described in one embodiment a method for use by an apparatus that can acquire an image. According to a described method, parameters for utilization by the apparatus are provided. According to a described method, a method can include acquiring an image and can further include evaluating an image. In another embodiment, there is described an apparatus comprising a plurality of digitizers. In one example of an embodiment of an apparatus including a plurality of digitizers, the digitizers can be configured to run in parallel. In another example of an embodiment of an apparatus including a plurality of digitizers, the digitizers can be configured to run in series.

These and other details, advantages and benefits of the presently embodied invention will become apparent from the detailed description of the preferred embodiment and the associated drawings.

BRIEF DESCRIPTION OF THE DRAWINGS

For a further understanding of these and objects of the invention, reference will be made to the following detailed description of the invention which is to be read in connection with the accompanying drawing, wherein:

FIGS. 2a-2i show various optical reader form factors according to an embodiment of the invention;

FIGS. 9a-9d show various timing diagrams illustrating possible embodiments of a linear decode mode according to an embodiment of the invention;

DETAILED DESCRIPTION OF THE INVENTION

Figure 1:
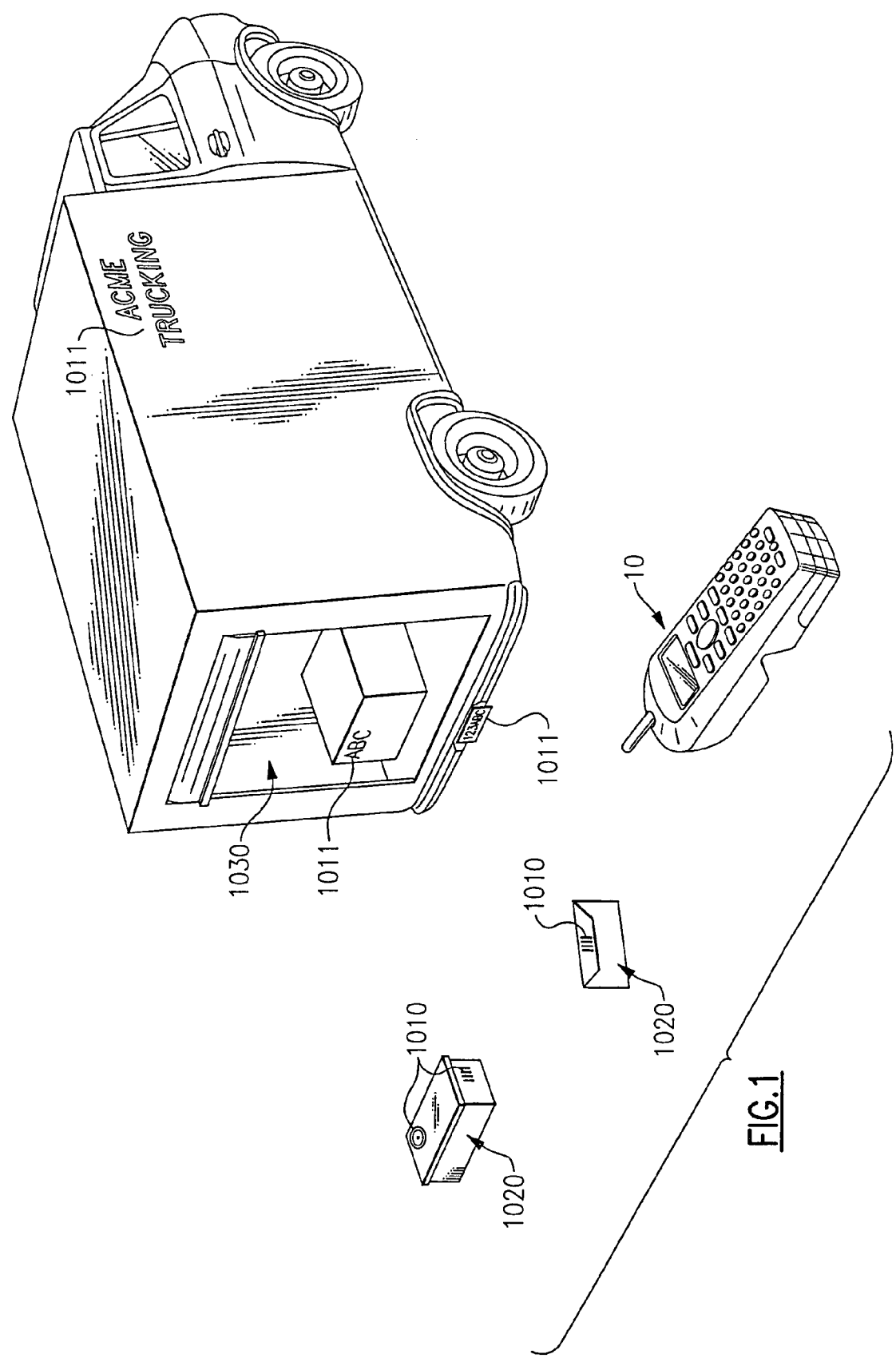
FIG. 1 depicts a reader in use in an operating environment according to an embodiment of the invention.

An optical reader 10, according to an embodiment of the invention, is depicted in use in FIG. 1. In an exemplary aspect, reader 10 is utilized to decode a bar code 1010 such as a bar code on a package 1012. In a "picture taking" mode aspect, reader 10 is utilized to take a picture of package 1020 carrying bar code 1010, or a storage container, or a trailer box 1030 or a signature or a face. In an automatic imaging mode aspect, reader 10 captures an image, classifies the image, and processes the image in a manner that depends on the image classification.

Examples of housings for optical readers in which embodiments of the invention can be employed are shown in FIGS. 2(a-i). In FIG. 2a, a gun style optical reader is shown as described in copending application Ser. No. 10/339,275, filed Jan. 9, 2003, entitled "Housing For Optical Reader," incorporated herein by reference in its entirety. An imaging module (as illustrated in FIGS. 3a-3d) is incorporated in the reader housing 11. In FIG. 2b, a gun style reader 10 is shown having an integrated keyboard 13k and display 13d. In FIGS. 2c, 2d and 2e, a portable data terminal (PDT) style reader is shown having a keyboard 13k and a display 13d. In FIG. 2e, an embodiment is shown wherein display 13d includes an associated touch screen overlay and which further includes a stylus for entering signature information. In FIG. 2f, a cellular phone is shown that has a display 13d and keyboard 13k and which incorporates an imaging module 50 as illustrated in FIGS. 3(a-d). In the embodiment of FIG. 2g, a reader 10 comprises a personal digital assistant (PDA). In the embodiment of FIG. 2i, reader 10 is in the form of a transaction terminal including card reader 240, as is described in U.S. patent application Ser. No. 10/339,444, filed Jan. 9, 2003, entitled, "Transaction Terminal Comprising Imaging Module," incorporated herein by reference in its entirety. Numerous other form factors are possible. For example, in U.S. application Ser. No. 10/092,789, filed Mar. 7, 2002, entitled "Optical Reader Imaging Module," incorporated by reference, a pen style optical reader is shown. In U.S. application Ser. No. 09/432,282, filed Nov. 2, 1999, entitled "Indicia Sensor System For Optical Reader," incorporated by reference, a reader is shown which rests on a "scan stand." Embodiments of the invention are not limited to these exemplary form factors.

Figure 3A:
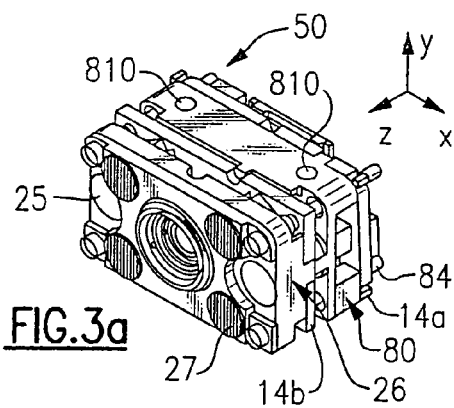
FIGS. 3a-3d show various views of an imaging module according to an embodiment of the invention.
Figure 3B:
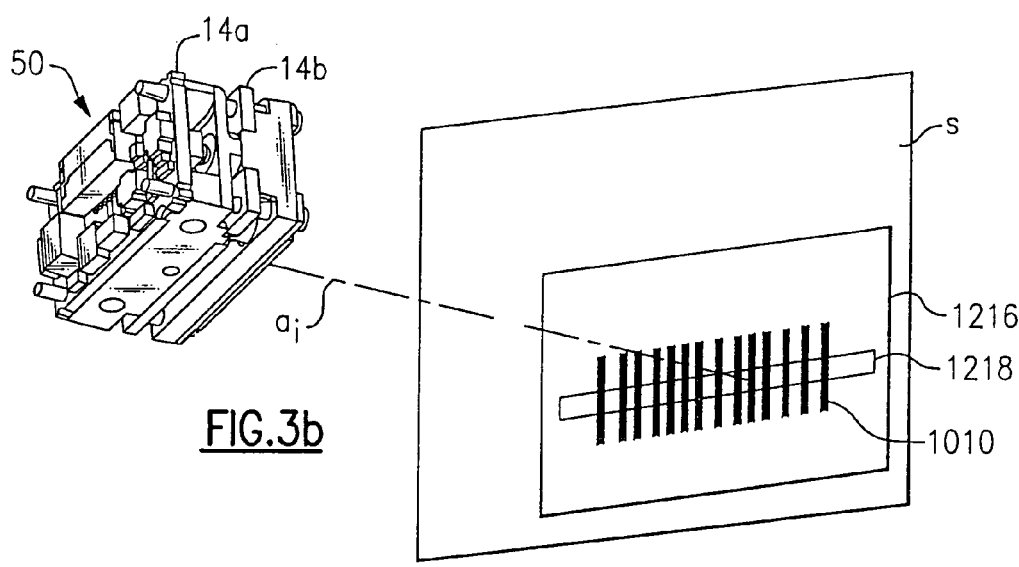
Figure 3C:
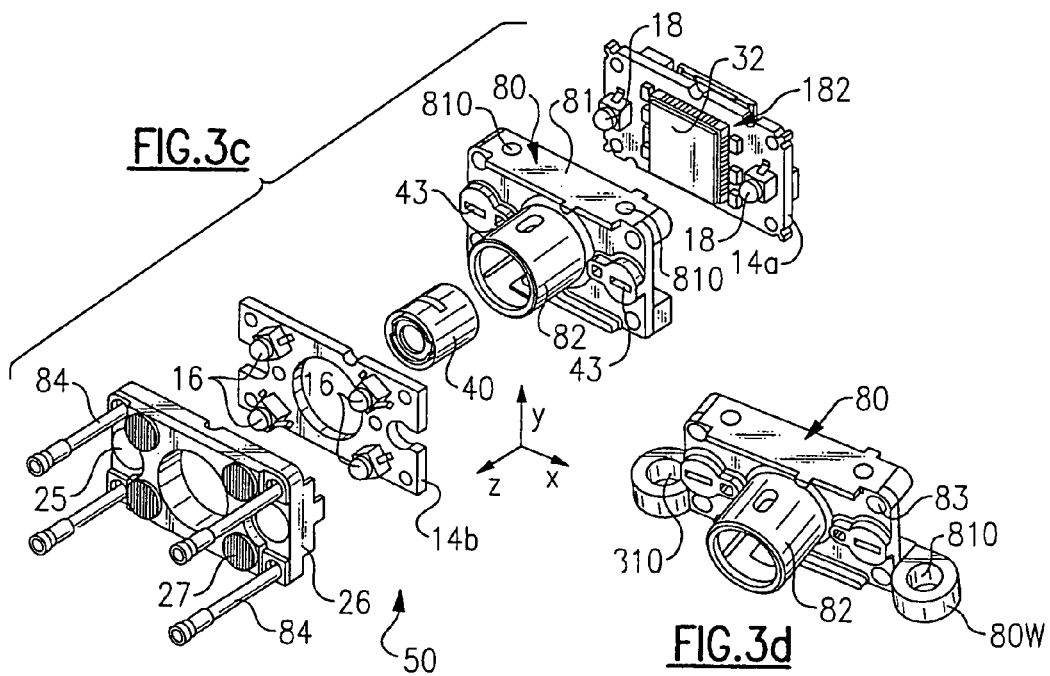

An imaging module 50, which may be incorporated into a reader housing to form an optical reader, is described with reference to FIGS. 3a-3d. Imaging module 50 may illustratively be an IT 4000 model imaging module of the type available from Hand Held Products, Inc. of Skaneateles Falls, N.Y. IT4000 imaging modules available from Hand Held Products, Inc. are available with associated decode circuits which may be actuated to decode a decodable indicia, such as bar code indicia, within a captured image. Alternatively, imaging module 50 could be an IT4200 model imaging module with an associated decode-out circuit, also available from Hand Held Products, Inc. Other imaging module models and brands are also available as those skilled in the art will appreciate, which will support both 1D linear readers and 2D readers incorporating CCD, CID, or CMOS based image sensors. In an exemplary embodiment, imaging module 50 includes a support 80 having a containment 81 containing image sensor 32 incorporated on chip 182, and a retainer section 82 retaining a lens assembly 40 provided by a lens barrel. Lens assembly 40 includes a lens or lenses which focus images from a substrate (as seen in FIG. 3b) onto image sensor 32. In one embodiment, lens assembly 40 is configured so that module 50 has a fixed best focus receive distance of less than two feet (e.g., 3 inches, 5 inches, 7 inches, 15 inches). Configuring lens assembly 40 so that module 50 has a best focus receive distance of less than two feet allows module 50 to capture high resolution images at short range, from which decodable indicia can readily be decoded. Module 5 can also be configured so that module 50 has a best focus distance of several feet such as 5 feet or more as is described in U.S. application Ser. No. 10/252,484, filed Sep. 23, 2002, entitled "Long Range 1-D Image Reader," incorporated herein by reference in its entirety. Module 50, can also include an adjustable lens assembly for providing an adjustable best focus receive distance.

Figure 3D:
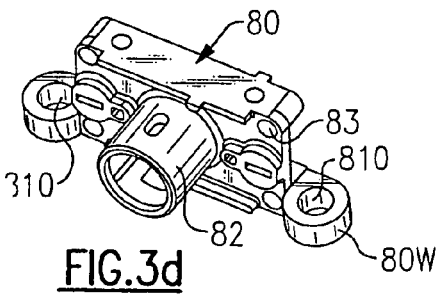

Referring to further aspects of module 50, a first circuit board 14a carrying image sensor chip 182 and aiming LEDs 18 is mounted to a back-end of support 80 while a front circuit board 14b carrying illumination LEDs 16 is mounted to a front end of support 80. An optical plate 26 carrying aiming and illumination optics is disposed forward of second circuit board 14b. Supporting the various components of imaging module 50 is a plurality of conductive support posts 84. As shown in FIG. 3d, support 80 can include integrated mounting wings 80w aiding in the mounting of module 50 within module 10. Imaging module 50 is fully assembled into a form substantially shown in FIGS. 3a and 3b, prior to being installed in reader housing 11. Further aspects of module 50 and variations thereof are described in U.S. application Ser. No. 10/092,789, filed Mar. 7, 2002, entitled "Optical Reader Imaging Module," incorporated herein by reference in its entirety.

Referring to FIG. 3b, illumination LEDs 16 together with illumination optics including diffusers 27, project an illumination pattern 90 onto a substrate s. Illumination pattern 1216 at normal working distances substantially corresponds to a field of view of imaging module 50. Aiming LEDs 18 together with aiming optics 43, 25 project an aiming pattern 1218 onto a substrate. Aiming pattern 1218 aids in the alignment of imaging module 50 relative to a target. If reader 10 is moved so that aiming pattern is located on a target indicia 1010 such as the bar code shown in FIG. 3b, there is strong assurance that target indicia 94 is within a field of view of imaging module 50.

Figure 4A:
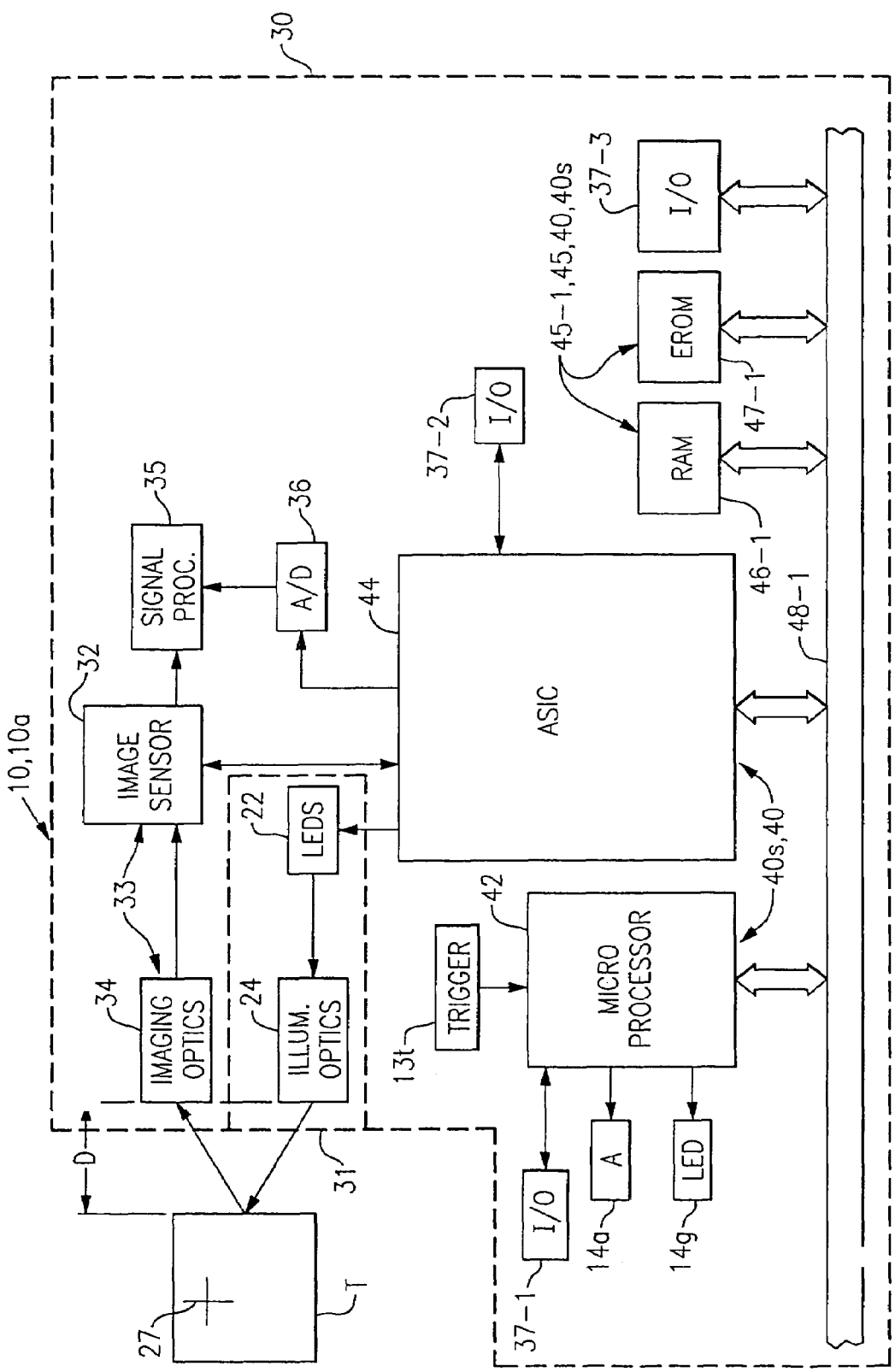
FIGS. 4a-4e show block diagrams for optical readers in which embodiments of the invention may be incorporated.

Block diagrams illustrating various types of optical readers are shown in FIGS. 4a-4e. Referring to FIG. 4a, single state optical reader 10a includes a reader processor assembly 30, and an illumination system 31. Reader processor assembly 30 captures an image of target T, decodes decodable symbols of the target to generate a message, and transmits the message to a host processor assembly to be described herein.

Reader processor system 30 of FIG. 4a also includes programmable control circuit 40s, which comprises an integrated circuit microprocessor 42 and an application specific integrated circuit (ASIC 44). The function of ASIC 44 could also be provided by a field programmable gate array (FPGA). Processor 42 and ASIC 44 are both programmable control devices, which are able to receive, output, and process data in accordance with a stored program stored in memory unit 45-1, which may comprise such memory elements as a read/write random access memory or RAM 46-1 and an erasable read only memory or EROM 47-1. RAM 46-1 typically includes at least one volatile memory device but may include one or more long-term non-volatile memory devices. Processor 42 and ASIC 44 are also both connected to a common bus 48-1 through which program data and working data, including address data, may be received and transmitted in either direction to any circuitry that is also connected thereto. Processor 42 and ASIC 44 differ from one another, however, in how they are made and how they are used.

More particularly, processor 42 is preferably a general purpose, off-the-shelf VLSI integrated circuit microprocessor, which has overall control of the circuitry, but which devotes most of its time to decoding decodable image data such as symbology or text character data stored in RAM 46-1 in accordance with program data stored in EROM 47-1. ASIC 44, on the other hand, is a special purpose VLSI integrated circuit, such as a programmable logic or gate array, which is programmed to devote its time to functions other than decoding image data, and thereby relieve processor 42 from the burden of performing these functions.

The actual division of labor between processor 42 and ASIC 44 will naturally depend on the type of off-the-shelf microprocessors that are available, the type of image sensor which is used, the rate at which image data is output by imaging assembly 33, etc. There is nothing in principle, however, that requires that any particular division of labor be made between processors 42 and 44, or even that such a division be made at all. With processor architectures of the type shown in FIG. 4a, a typical division of labor between processor 42 and ASIC 44 will be as follows. In an aspect, processor 42 is directed to decoding image data in response to trigger 13t being activated, once such data has been stored in RAM 46-1 and, recognizing characters represented in stored image data according to an optical character recognition (OCR) scheme in response to the actuation of trigger 13t. ASIC 44 is directed to controlling the image acquisition process, the A/D conversion process and the storage of image data, including the ability to access memories 46-1 and 47-1 via a DMA channel. ASIC 44 may also perform many timing and communication operations. ASIC 44 may, for example, control the illumination of LEDs 22, the timing of image sensor 32 and an analog-to-digital (A/D) converter 36-1, the transmission and reception of data to and from a processor system external to assembly 30, through an RS-232, a network such as an Ethernet, a serial bus such as USB, a wireless communication link (or other) compatible I/O interface as is indicated by interface 37-2. ASIC 44 may also control the outputting of user perceptible data via an output device, such as aural output device 14a, a good read LED 14g and/or a display monitor which may be provided by a liquid crystal display such as display 14d. Control of output, display and I/O functions may also be shared between processors 42 and 44, as suggested by bus driver I/O interface 37-3 or duplicated, as suggested by microprocessor serial I/O interface 37-1 and interface 37-2. As explained earlier, the specifics of this division of labor is of no significance to the present invention.

Figure 4B:
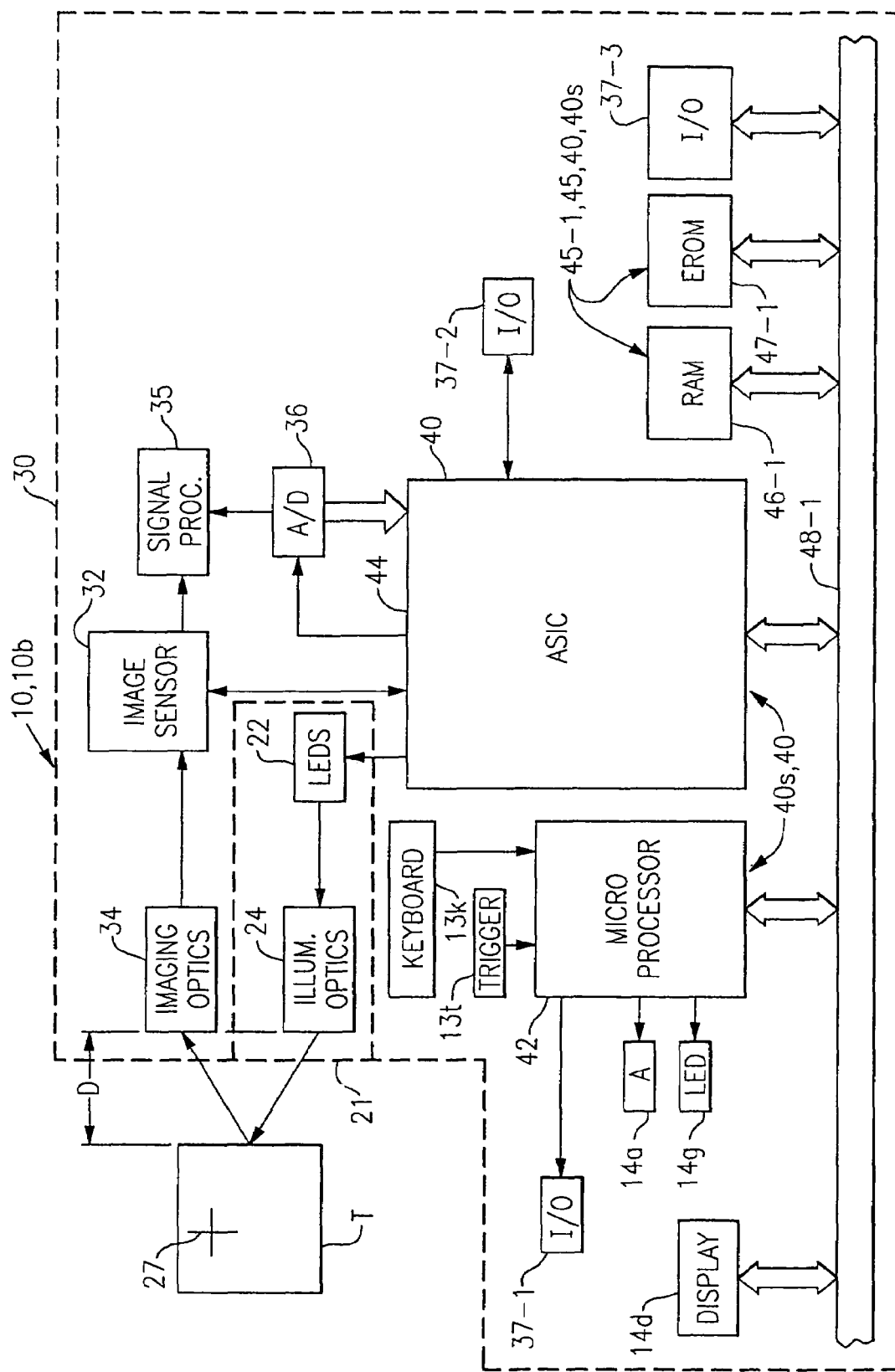

FIG. 4b shows a block diagram exemplary of an optical reader, which is adapted to receive control instructions resulting in a change in an operating program of a reader. In addition to having the elements of single state reader circuit of FIG. 4a, reader 10b includes a keyboard 13k for inputting data including instructional data and a display 14d for displaying text and/or graphical information to an operator. Keyboard 13k may be connected to bus 48-1, ASIC 44 or to processor 42 as indicated. Display 14d may be connected to ASIC 44, to processor 42 or to system bus 48-1 as is indicated in the particular embodiment of FIG. 4b.

An operator operating optical reader 10b can reprogram reader 10b in a variety of three different ways. In one method for reprogramming reader 10-b, an operator actuates a control button of keyboard 13k which has been pre-configured to result in the reprogramming of reader 10b. In another method for reprogramming reader 10b an operator actuates control of a processor system not integral with reader 10b to transmit an instruction to reprogram reader 10b. According to another method for reprogramming reader 10b, an operator moves reader 10b so that a "menu symbol" is in the field of view of image sensor 32 and then activates trigger 13t of reader 10b to capture an image representation of the menu symbol. A menu symbol is a specially designed bar code symbol which, when read by an appropriately configured optical reader results in a reader being programmed. The reprogramming of an optical reader with use of a menu symbol is described in detail in commonly assigned U.S. Pat. No. 5,965,863 incorporated herein by reference. Because the second and third of the above methodologies do not require actuation of a reader control button of keyboard 13k but nevertheless result in a reader being reprogrammed, it is seen that reader may be keyboardless but nevertheless reprogrammable.

Figure 5:
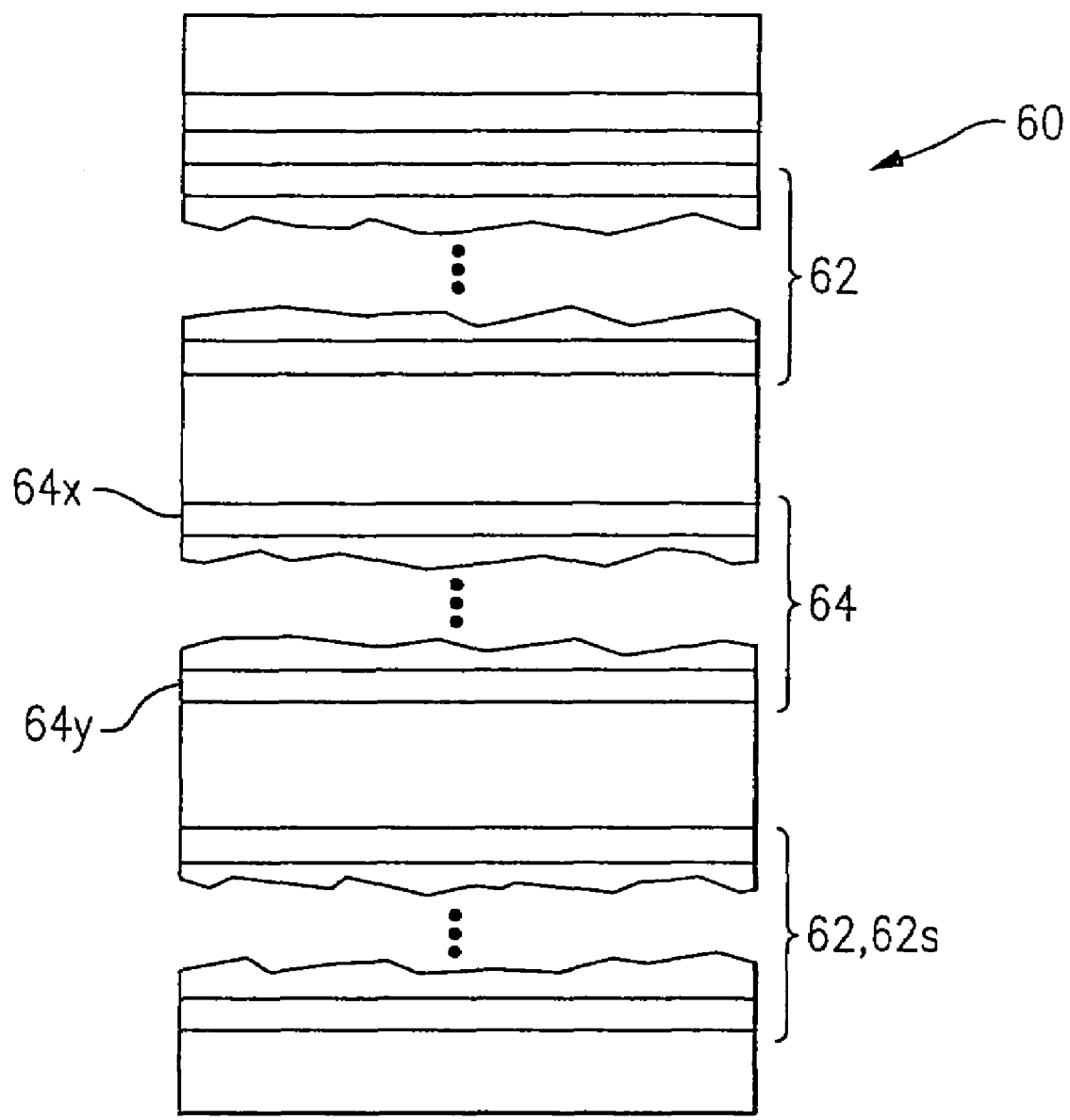
FIG. 5 illustrates a memory map of an optical reader according to an embodiment of the invention.

A typical software architecture for an application operating program typically executed by an optical reader as shown in FIG. 3b is shown in FIG. 5, which depicts a memory map of a program stored in program memory 47-1. Application operating program 60 adapts a reader for a particular application. Three major applications for an optical reader imaging device having image capture capability are: (1) bar code symbology decoding; (2) optical character recognition; and (3) signature capture. In a bar code symbology decoding application, reader 10 may preliminarily analyze and then decode a message corresponding to a bar code symbol. In a character recognition application reader 10 may locate decodable OCR characters, then execute an OCR algorithm to decode the message corresponding to the OCR characters. In a signature capture application, reader 10 may capture an image corresponding to a scene having a signature, parse out from the image data that image data corresponding to a signature, and transmit the captured signature data to another processing system. It is seen that the third of such applications can be carried out by an optical reader imaging device that is not an optical reader decoder equipped with decoding capability. Numerous other application operating programs are, of course possible, including a specialized 1D decoding application, a specialized 2D bar code decoding algorithm, a hybrid bar code decoding, an OCR decoding application, which operates to decode either decodable bar code symbols or OCR decodable text characters, depending on what is represented in a captured image.

Referring now to specific aspects of the software architecture of an operating program 60, program 60 includes an instructions section 62, and a parameter section 64. Further, instruction section 62 may include selectable routine section 62s. Instructions of instruction section 62 control the overall flow of operation of reader 10. Some instructions of instruction section 62 reference a parameter from a parameter table of parameter section 64. An instruction of instruction section 62 may state in pseudocode, for example, "Set illumination to level determined by [value in parameter row x]." When executing such an instruction of instruction section 62, control circuit 40 may read the value of parameter row 64x. An instruction of instruction section 62 may also cause to be executed a selectable routine that is selected depending on the status of a parameter value of parameter section 64. For example, if the application program is a bar code decoding algorithm then an instruction of instruction section 62 may sate in pseudocode, for example, "Launch Maxicode decoding if Maxicode parameter of parameter row 64y is set to "on." When executing such an instruction, control circuit 40 polls the contents of row 64y of parameter section 64 to determine whether to execute the routine called for by the instruction. If the parameter value indicates that the selectable routine is activated, control circuit 40, executes the appropriate instructions of routine instruction section 62s to execute the instruction routine.

It is seen, therefore, that the above described software architecture facilitates simplified reprogramming of reader 10. Reader 10 can be reprogrammed simply by changing a parameter of parameter section 64 of program 60, without changing the subroutine instruction section 62s or any other code of the instruction section 62 simply by changing a parameter of parameter section 64. The parameter of a parameter value of section 62 can be changed by appropriate user control entered via keyboard 13k, by reading a menu symbol configured to result in a change in parameter section 64, or by downloading a new parameter value or table via a processor system other than system 40-1. The reprogramming of reader 10b can of course also be accomplished by downloading an entire operating program including sections 62 and 64 from a processor system other than system 40-1. Reader 10 may also have customization and reprogramming as described in U.S. application Ser. No. 10/402,885 entitled "Customizable Optical Reader," filed Mar. 28, 2003, incorporated herein by reference in its entirety.

Figure 4C:
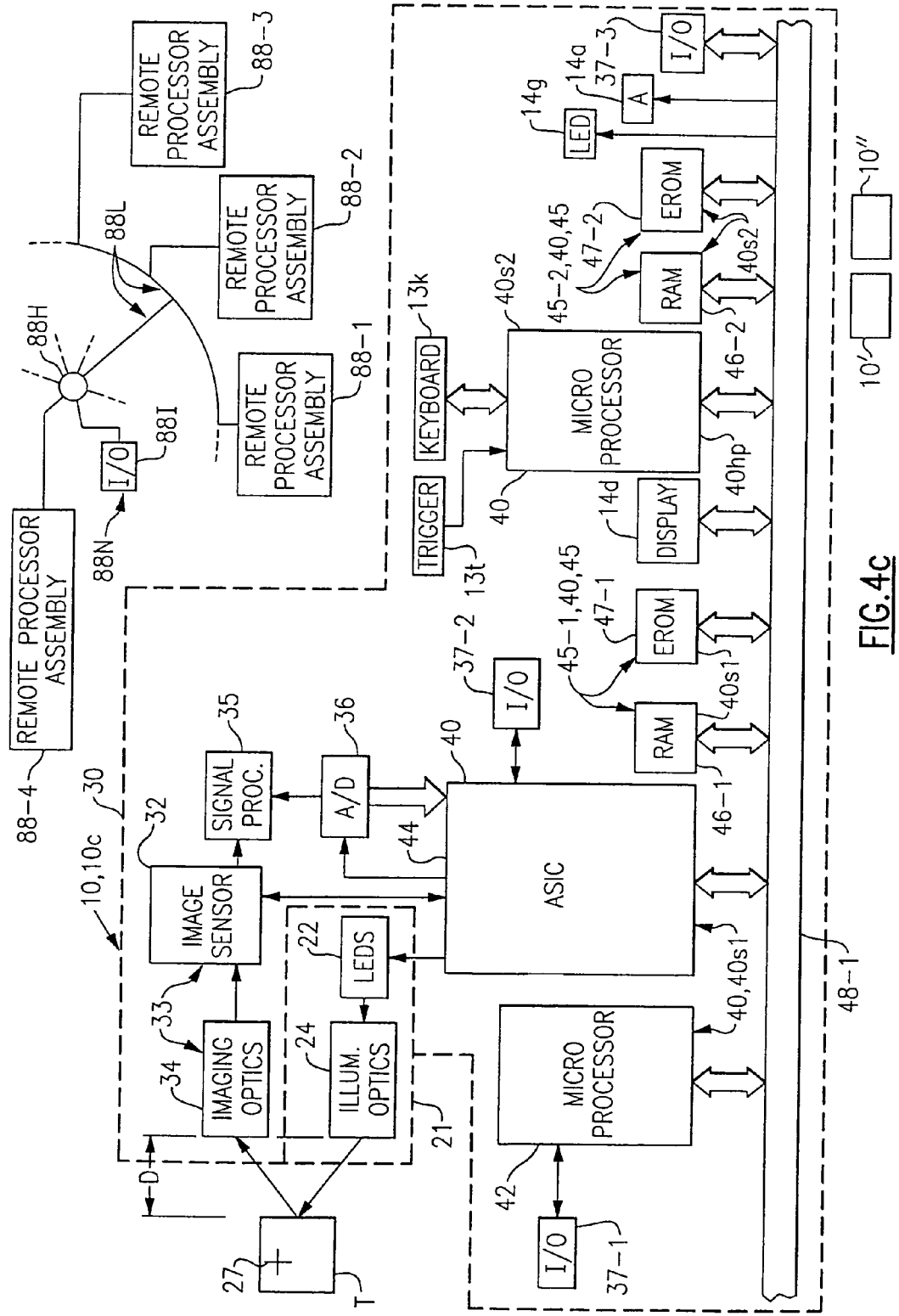

Another architecture typical of an optical reader is shown in FIG. 4c. Reader 10c includes processor system 40s1, and an integrated host processor system 40s2 which includes host processor 40hp and an associated memory 45-2. "Host processor system" herein shall refer to any processor system which stores a reader application operating program for transmission into a processor system controlling operation of a reader imaging system 33 or which exercises supervisory control over a processor system controlling operation of a reader imaging system 33, or which stores in it's associated memory more than one application operating program that is immediately executable on reception of a command of a user. In a reader having two processors such as processor 42 and processor 40hp, processor 42 is typically dedicated to process an image data to decode decodable indicia, whereas processor 40hp is devoted to instructing processor 42 to execute decoding operations, receiving inputs from trigger 13t and keyboard 13k, coordinating display and other types of output by output devices 14d, 14g, and 14a and controlling transmissions of data between various processor systems.

In the architecture shown in FIG. 4c having dedicated decoding processor system 40s1 and a powerful, supervisory host processor system 40s2, host processor system 40s2 commonly has stored thereon an operating system, such as DOS WINDOWS or WINDOWS, or an operating system specially tailored for portable devices such as, WINDOWS CE available from Microsoft, Inc. In the case that host processor system 40s2 includes an operating system such as DOS or WINDOWS CE, the instruction section and parameter section of the operating program controlling the operation of host processor system 40s2 normally are programmed in a high level programming language and assembled by an assembler before being stored in memory 47-2 and therefore may not reside in consecutive address locations as suggested by program 60 shown in FIG. 5. Nevertheless, host processor system 40s2 having an operating system integrated thereon can readily assemble an operating program into such a form for loading into an external processor system that does not have an operating system stored thereon.

Referring to further aspects of readers 10a, 10b, and 10c at least one I/O interface e.g. interface 37-1, 37-2, and 37-3 facilitates local "wired" digital communication such as RS-232, Ethernet, serial bus including Universal Serial Bus (USB), or local wireless communication technology including "Blue Tooth" communication technology. At least one I/O interface, e.g. interface 37-3, meanwhile, facilitates digital communication with remote processor system 41-1 in one of available remote communication technologies including dial-up, ISDN, DSL, cellular or other RF, and cable. Remote processor assembly 88-1 may be part of a network 88N of processor systems as suggested by assemblies 88-2, 88-3, and 88-4 links 88L and hub 88H e.g. a personal computer or main frame computer connected to a network, or a computer that is in communication with reader 10c only and is not part of a network. The network 88N to which system 88-1 belongs may be part of the Internet. Further, assembly 88-1 may be a server of the network and may incorporate web pages for viewing by the remaining processor assemblies of the network. In addition to being in communication with reader 10c, system 88-1 may be in communication with a plurality of additional readers 10' and 10." Reader 10c may be part of a local area network (LAN). Reader 10 may communicate with system 88-1 via an I/O interface associated with system 88-1 or via an I/O interface 881 of network 88N such as a bridge or router. While the components of readers 10a, 10b, and 10c are represented in FIGS. 4a-4c as discreet elements it is understood that integration technologies have made it possible to form numerous circuit components on a single integrated circuit chip. For example, with present fabrication technologies, it is common to form components such as components 42, 40, 46-1, 47-1, 37-2, and 37-1 on a single piece of silicone.

Furthermore, the number of processors of reader 10 is normally of no fundamental significance to the present invention. In fact if processor 42 is made fast enough and powerful enough, special purpose ASIC processor 44 can be eliminated. Likewise referring to reader 10c a single fast and powerful processor can be provided to carry out all of the functions contemplated by processors 40hp, 42, and 44 as is indicated by the architecture of reader 10e of FIG. 4e. Still further, it is understood that if reader 10 includes multiple processors the processors may communicate via parallel data transfers rather than via the serial communication protocol indicated by serial buses 48-1 and 48-2. In addition, there is no requirement of a one-to-one correspondence between processors and memory. Processors 42 and 40hp shown in FIG. 4c could share the same memory, e.g. memory 45-1. A single memory e.g. memory 45-1 service multiple processors e.g. processor 42 and processor 40hp.

Figure 4D:
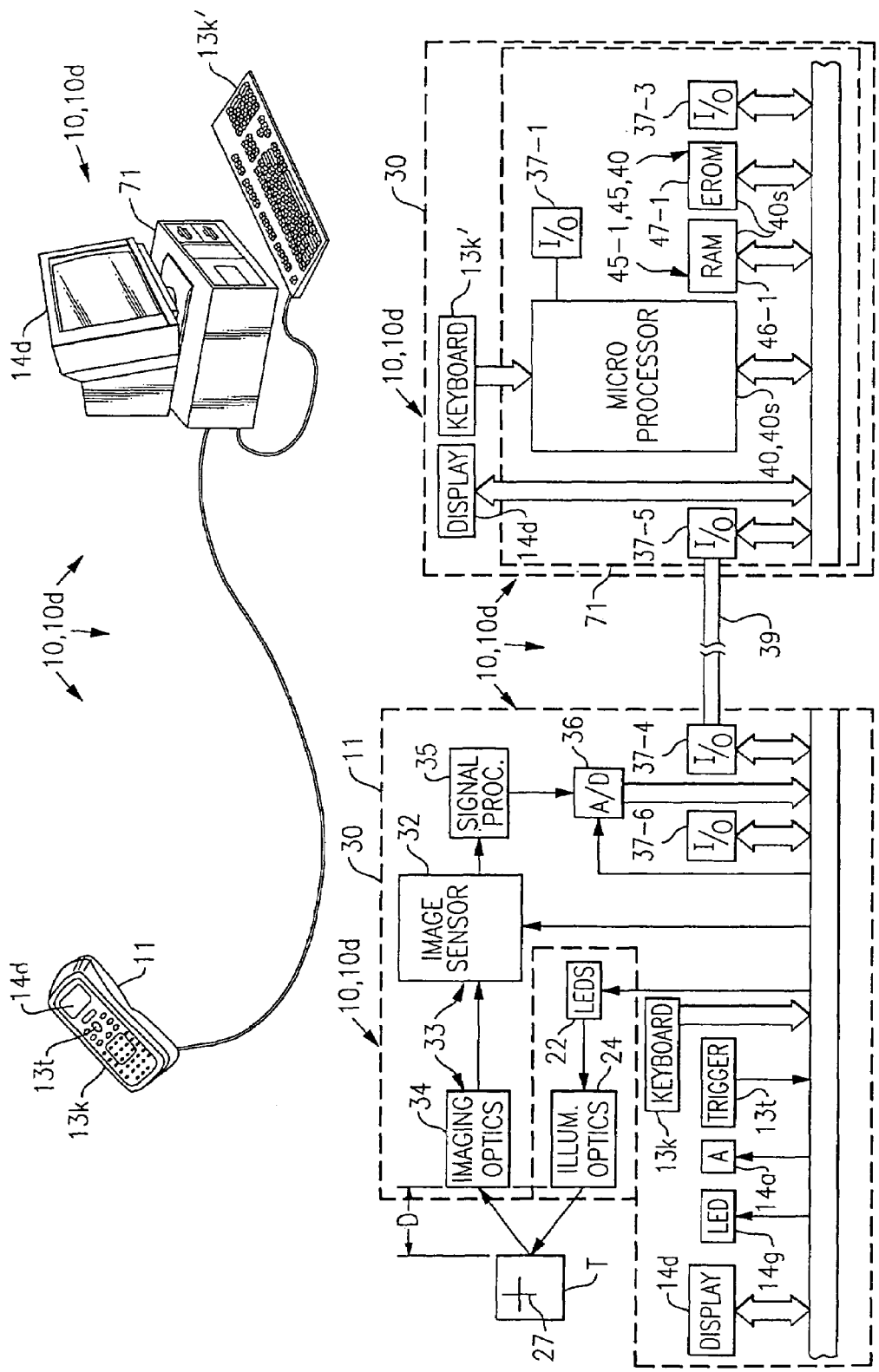

Referring to the embodiment of FIG. 4d, it is seen that it is not necessary that the entirety of electrical components of an optical reader 10 be incorporated in a portable device housing 11. The electrical components of reader 10-4 are spread out over more than one circuit boards that are incorporated into separate device housings 11 and 71. It is understood that circuitry could be spread out into additional housings. Control circuit 40 in the embodiment of FIG. 4d is incorporated entirely in the housing 71 that is nonintegral with portable device housing 11. Housing 71 is shown as being provided by a personal computer housing, but could also be provided by another type of housing such as a cash register housing, a transaction terminal housing or a housing of another portable device such as housing 11. At least one operating program for controlling imaging assembly 33 and for processing image signals generated from imaging assembly 33 is stored in EROM 47-1 located within PC housing 71. For facilitating processing of signals generated from imaging assembly 33 by a processor system that is not integrated into portable housing 11 a high-speed data communication link should be established between imaging assembly 33 and processor system. In the embodiment of FIG. 4d, I/O interfaces 37-4 and 37-5 and communication link 39 may be configured to operate according to the USB data communication protocol. The configuration shown in FIG. 4d reduces the cost, weight, and size requirements of the portable components of reader 10d, which in reader 10-4 are the components housed within portable housing 11. Because the configuration of FIG. 4d results in fewer components being incorporated in the portable section of reader 10-4 that are susceptible to damage, the configuration enhances the durability of the portable section of reader 10-4 delimited by housing 11.

Figure 4E:
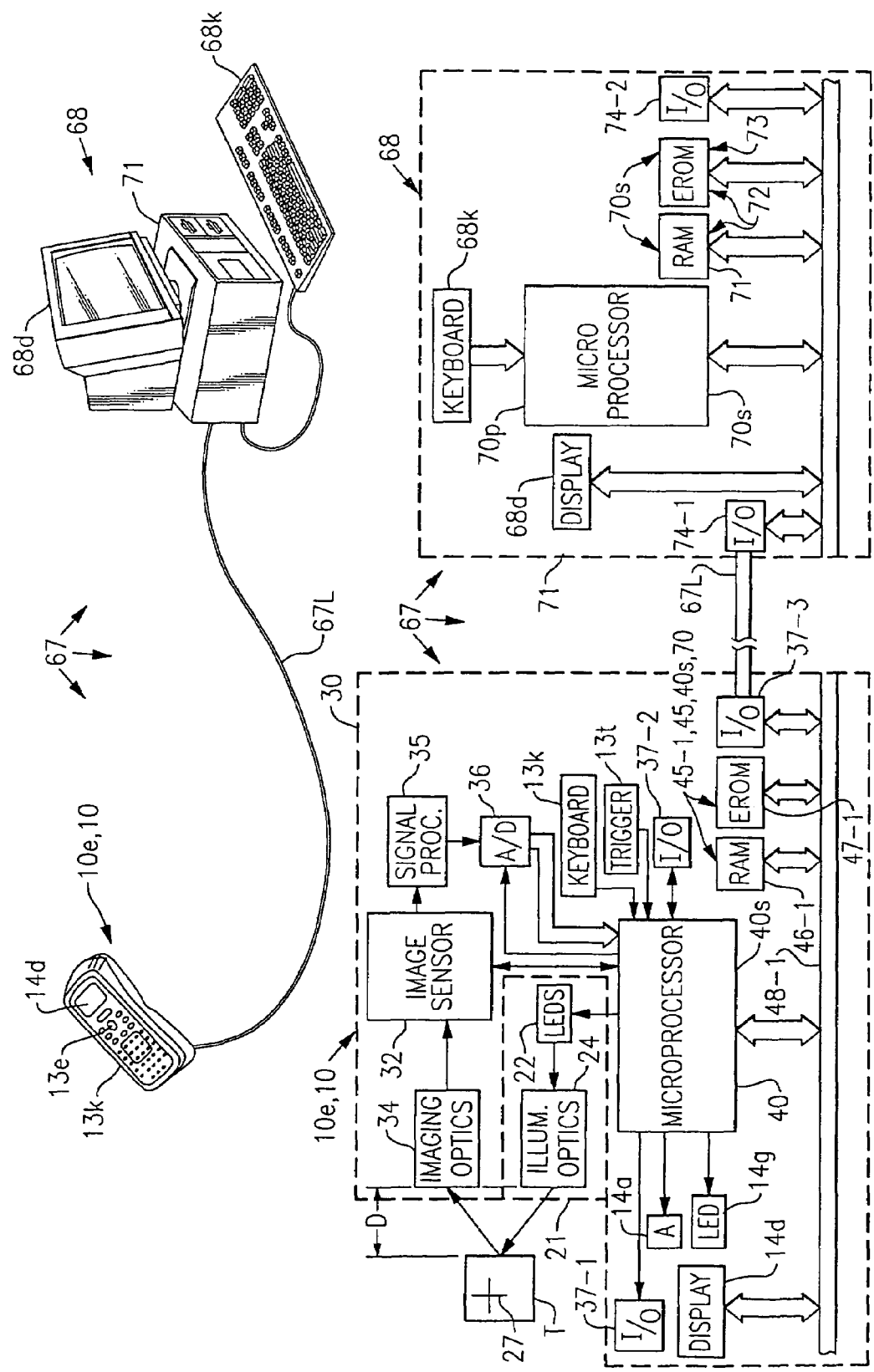

The reader communication system of FIG. 4e has a physical layout identical to reader 10d, but is optimized for a different operation. System 67 is a communication system in which reader processor system 40s communicated with a nonintegrated local host processor system 70s provided by a personal computer 68 having a PC housing 71, a keyboard 68d, a mouse 68, and a display 68d. Provided that link 67L is a high-speed communication link, nonintegrated local host processor system 70s could be programmed to provide functioning identical to processor system 40s of reader 10d. However, because reader 10e comprises an integrated processor system 40s such programming is normally unnecessary, although as described in copending application Ser. No. 09/385,597, incorporated herein by reference in its entirety, it is useful to configure processor system 40s so that certain components of reader 10 such as trigger 13t can be controlled remotely by host processor system, which in one embodiment is nonintegrated. Accordingly in reader-host communication systems as shown in FIG. 4e nonintegrated host processor assembly 68 typically is programmed to provide functions separate from those of the reader processor systems described in connection with FIGS. 4a-4d.

As described in U.S. Pat. No. 5,965,863, incorporated herein by reference in its entirety, one function typically provided by nonintegrated local host processor system 70s is to create operating programs for downloading into reader 10. Processor system 70s typically has an operating system incorporated therein, such as WINDOWS, which enables an operator to develop operating programs using a graphical user interface. Nonintegrated local processor system 70s also can be configured to receive messages an/or image data from more than one reader, possibly in a keyboard wedge configuration as described as described in U.S. Pat. No. 6,161,760, incorporated herein by reference. It is also convenient to employ processor processing. For example a spreadsheet program can be incorporated in system 70s which is useful for analyzing data messages from reader 10e. An image processing application can be loaded into system 70s which is useful for editing, storing, or viewing electronic images received from reader 10e. It is also convenient to configure reader 10e to coordinate communication of data to and from remote processor assembly 88-1. Accordingly processor assembly 68 typically includes I/O interface 74-2, which facilitates remote digital communication with a remote processor assembly, e.g. assembly 88-1 as shown in FIG. 4c.

Figure 6:
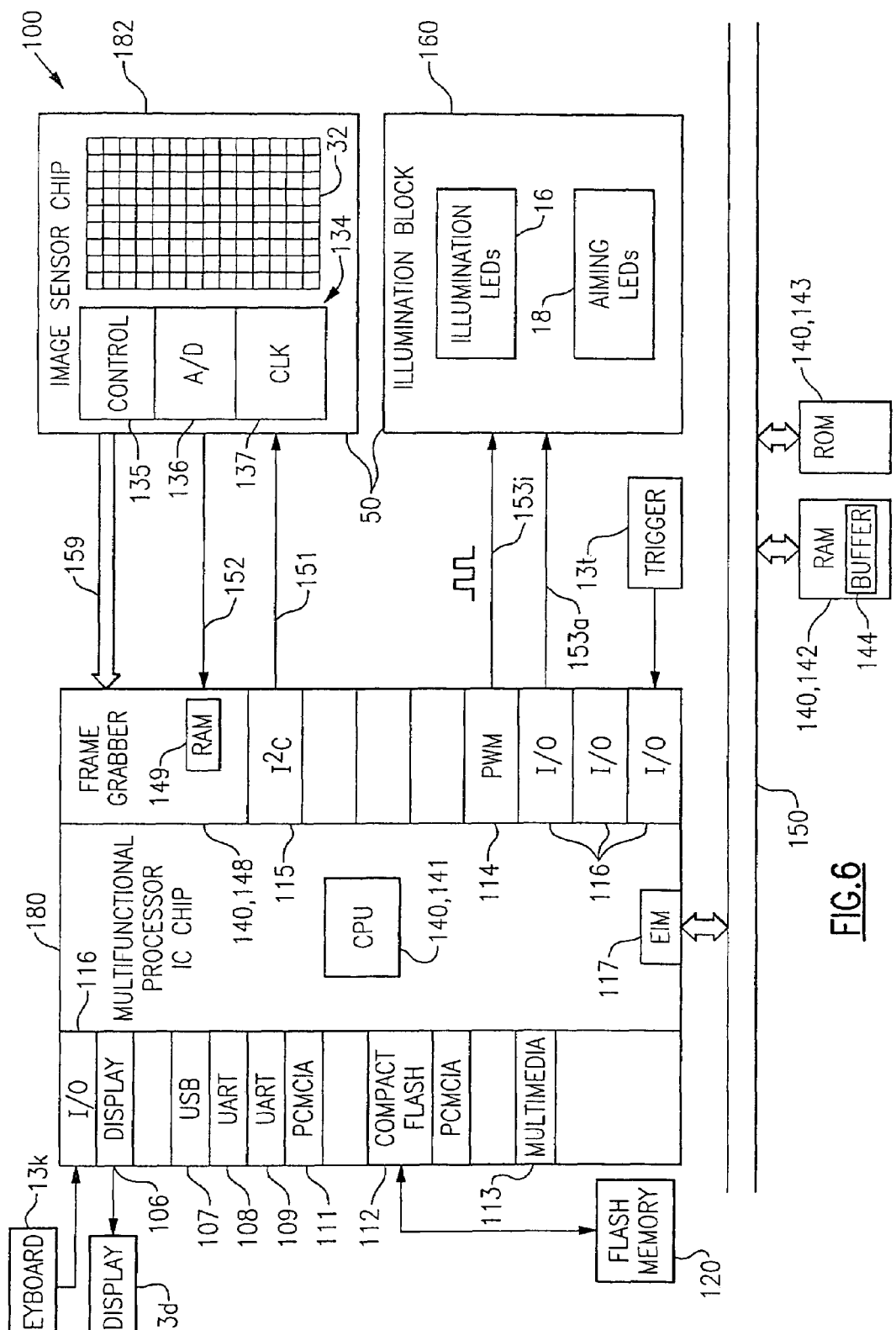
FIG. 6 is a block diagram of an electrical circuit according to an embodiment of the invention.

In FIG. 6, a block diagram of an optical reader electrical circuit is shown having a multi-functional processor IC chip 180 including an integrated frame grabber block 148. Electrical circuit 100 shown in FIG. 6 can be utilized for control of a single 2D imaging module optical reader as is shown for example in U.S. Ser. No. 09/954,081, filed Sep. 17, 2001, entitled "Optical Reader Having Image Parsing Mode", which is hereby incorporated herein by reference in its entirety.

In an illustrative reader embodiment, electrical circuit 100 includes a control circuit 140 comprising CPU 141, system RAM 142 and system ROM 143 and frame grabber block 148. Electrical circuit 100 further includes an image sensor 32 typically provided by a photosensitive array and an illumination block 160 having illumination LEDs 16 and aiming LEDs 18 as shown in the physical form view of FIGS. 3a-3c. Image sensor 32 of FIG. 6 is shown as being provided by a 2D photo diode array. If a 1D image sensor replaces image sensor 32, then aiming LEDs 18 and illumination LEDs 16 may be constituted by one set of LEDs. In the embodiment shown, image sensor 32 is incorporated in an image sensor IC chip 182 which typically further includes an image sensor electrical circuit block 134. Image sensor electrical block 134 includes control circuit 135 for controlling image sensor 32, an A/D conversion circuit 136, for converting analog signals received from image sensor 32 into digital form and integrated clock 137 sometimes referred to as an oscillator. It will be understood that functions referred to herein described as being performed by control circuit 140 can also be performed by control circuit 40 (FIGS. 4*a*-4*e*).

As further illustrated in FIG. 6, CPU 141 and frame grabber block 148 are incorporated in a multi-functional IC chip 180 which in addition to including CPU 141 includes numerous other integrated hardware components. Namely, multifunctional IC chip 180 may include a display control block 106, several general purpose I/O ports 116, several interface blocks such as a USB circuit block 107 and a UART block 108 for facilitating RS 232 communications, a UART block 109 for facilitating infra-red communications (including communication according to standards promulgated by the INFRARED DATA ASSOCIATION$_7$ (IrDA$_7$), a trade association for defining infrared standards), and a pulse width modulation (PWM) output block 110. Multifunctional processor IC chip 180 can also have other interfaces such as a PCMCIA interface 111, a compact flash interface 112, and a multimedia interface 113. If reader 10 includes a display 13*d*, display 13*d* may be in communication with chip 180 via display interface 106. Trigger 13*t* and keypad 13*k* may be in communication with chip 180 via general purpose I/O interface 116. Physical form views of readers having displays and keyboards are shown for example in U.S. application Ser. No. 10/137,484, filed May 2, 2002, entitled "Optical Reader Comprising Keyboard," which is hereby incorporated herein by reference in its entirety. Multi-functional processor IC chip 180 may be one of an available type of multifunctional IC processor chips which are presently available such as a Dragonball MXI IC processor chip or a Dragonball MXL IC processor chip available from Motorola, a DSC IC chip of the type available from Texas Instruments, an O-Map IC chip of the type available from Texas Instruments, or a multifunctional IC processor chip of a variety known as Clarity SOC's (e.g., system on a chip) available from Sound Vision, Inc.

In one embodiment, multi-functional processor IC chip 180 comprises components that provide at least the functions provided by a CPU 140, system RAM 142 and system ROM 143. In some embodiments microprocessor-based decoder module 180 comprises an integrated circuit device having integrated therein a microprocessor, an analog-to-digital converter, a digital-to-analog converter, a direct memory access (DMA) channel, a bi-directional communication line for communication with a sensor such as either or both of line 151 and 152, and a channel for data receipt from a sensor, such as data line 159 that brings data to frame grabber 148. The microprocessor-based IC chip 180 can comprise semiconductor materials, optical materials, and photonic bandgap materials. In some embodiments the multi-functional processor IC Chip 180 further comprise I/O 116 suitable to accept user input (for example from a keyboard 13*k*), interface capability for "flash" memory devices such as "Multimedia" (MMC), "Smart Media," "Compact Flash," and "Memory Stick." Other features may include pulse width modulators (PWM's), serial communication channels (e.g., UARTs, SPIs, and USBs), display drivers and controllers such as for an LCD, wireless communication capability such as Bluetooth and 802.11 (a), (b), and (g)-compatible transmitter/receivers, sequence control modules such as timer banks, sensor controllers, audio generators, audio coder/decoders ("codecs"), speech synthesizers, and speech recognition hardware and/or software.

Frame grabber block 148 of IC chip 180 replaces the function of a frame grabbing field programmable gate array (FPGA) as discussed in commonly assigned application Ser. No. 09/954,081, filed Sep. 17, 2001, entitled "Imaging Device Having Indicia-Controlled Image Parsing Mode," and Ser. No. 09/904,697, filed Jul. 13, 2001, entitled "An Optical Reader Having a Color Imager," both of which are hereby incorporated herein by reference in their entirety. More particularly, frame grabber block 148 is specifically adapted collection of hardware elements programmed to carry out, at video rates or higher, the process of receiving digitized image data from image sensor chip 182 and writing digitized image data to system RAM 142 which in the embodiment shown is provided on a discreet IC chip. Frame grabber block 148 includes hardware elements preconfigured to facilitate image frame capture. Frame grabber block 148 can be programmed by a user to capture images according to a user's system design requirements. Programming options for programming frame grabber block 148 include options enabling block 148 to be customized to facilitate frame capture that varies in accordance with image sensor characteristics such as image sensor resolution, clockout rating, and fabrication technology (e.g., CCD, CMOS, CID), dimension (1D or 2D), tonality (from 1 to N-bits), color (monochrome or color), biometric features, such as fingerprints, retinal patterns, facial features, and one- and two-dimensional patterns that can provide information, such as chromatography patterns and electrophoretic patterns of mixtures of substances, including substances such as biological samples comprising DNA. A decoder board adapted to operate in a manner dependent on sensor attached thereto is described in U.S. patent application Ser. No. 10/339,439, filed Jan. 9, 2003, entitled, "Decoder Board For An Optical Reader Utilizing A Plurality Of Imaging Formats," incorporated by reference.

Aspects of the operation of circuit 100 when circuit 100 captures image data into RAM 140 are now described. Circuit 100 can perform a cycle of receiving a frame of image data, performing internal programming functions, and decoding the frame of image data in a time period of less than or equal to a second. In one aspect, the circuit 100 performs the cycle in a time period of less than or equal to $\frac{1}{30}$ of a second. In another aspect, the time period can be less than or equal to $\frac{1}{270}$ of a second. When trigger 13*t* is pulled, CPU 141, under the operation of a program stored in system ROM 143, writes an image capture enable signal to image sensor chip 182 via communication line 151. Line 151, like the remainder of communication lines described herein represents one or more physical communication lines. In the embodiment shown, wherein image sensor chip 182 is of a type available from IC Media Corp., I$^2$C interface 115 of chip 180 is utilized to facilitate communication with chip 182 (if another image sensor chip is selected another type of interface, e.g. interface 116, may be utilized). Other types of signals may be sent over line 151 during the course of image capture. Line 151 may carry, for example, timing initialization, gain setting and exposure setting signals.

When control block 135 of image sensor chip 182 receives an image capture enable instruction, control block 135 sends various signals to frame grabber block 148. Image sensor control block 135 typically sends various types of synchronization signals to frame grabber block 148 during the course of capturing frames of image data. In particular, control block 135 may send to frame grabber block 148 "start of frame signals" which inform frame grabber block 148 that chip 182 is ready to transmit a new frame of image data, "data valid window" signals which indicate periods in which a row of image data is valid, and "data acquisition clock" signals as established by clock 137 controlling the timing of image data capture operations. In the embodiment described, line 152 represents three physical communication lines, each carrying one of the above types of signals. In an alternative embodiment, vertical and horizontal synchronization signals are processed by frame grabber 148 to internally generate a data valid window signal. Frame grabber block 148 appropriately responds to the respective synchronization signals, by establishing buffer memory locations within integrated RAM 149 of block 148 for temporary storage of the image data received from image sensor chip 182 over data line 159. At any time during the capture of a frame of image data into system RAM 142, buffer RAM 149 of frame grabber block 148 may store a partial (e.g., about 0.1 to 0.8) or a full line of image data.

The process of receiving or capturing a frame of image data (i.e., 1D or 2D symbology, text, image, or other indicia) that meets the threshold criteria of signal contrast, brightness, or other image characteristics utilized by the imager control algorithm will hereinafter be referred to as obtaining an acceptable image. Thus, an acceptable image is one that falls within a configured tolerance of the target image requirements set forth by the algorithm. There are many factors that can affect how acceptable images are obtained. For example, the level of ambient lighting in the imaging environment, the distance of the object from the imager, the contrast characteristics of the object, and others can affect the quality of the acquired image. The quality of the imager control algorithm in an image reader can be gauged by its ability to utilize multiple configuration settings and adapt itself to a variety of imaging situations while acquiring acceptable images. Thus the quality of the imager control algorithm can be further measured by how quickly the algorithm is able to configure the imager to take acceptable images in any given scanning environment.

An embodiment of the invention is directed to a process for obtaining an acceptable image with an image reader that involves adjusting the frame rate of the imager alone or in conjunction with signal gain and/or exposure time parameters. In an aspect of the embodiment, the frame rate may be automatically adjusted by configuring the imager or, alternatively, manually adjusted by manipulating the supporting hardware. In an aspect, the process is directed to obtaining an acceptable image at a maximum frame rate of the imager. The maximum frame rate is herein defined as the highest frame rate that will support a desired exposure time and signal gain to obtain an acceptable image.

As those persons skilled in the art will understand, the frame rate of digital imagers is often configurable. The imager can be set to run at one of a plurality of frame rates supported by the hardware and/or software of the imaging chip. For example, the Toshiba TCD1304AP one dimensional digital image reader is capable of running as fast as 270 pfs, and as slow as external hardware will allow. A two-dimensional imager such as the IC Media 105A, for example, is capable of running as fast as 30 pfs, and as slow as 1 pfs. Depending upon the imager, frame rates can realistically vary between several seconds per frame to over 1,000,000 pfs. In certain image sensors, the frame rate configuration of the chip can be programmed through configuration registers on the part itself. For example, the IC Media 105A has a configuration register that can be set to run the imager at 30 pfs, 20 pfs, 15 pfs, 12 pfs, 10 pfs, 6 pfs, 5 pfs, 4 fps, 3 fps, 2 fps, or 1 pfs. For a selected frame rate, the exposure time (i.e., the time that the pixels are allowed to gain charge) can be configured to be very close to the individual frame time itself. Thus, a frame rate of 20 pfs will produce a maximum frame time of approximately 50 ms.

As optical systems continue to shrink in size, less light transmission through the system, or less sensitivity of a given image sensor can make even the longest sustainable exposure time of a given frame duration inadequate for obtaining sufficient image brightness, contrast, and other characteristics of an acceptable image, in certain environments. Accordingly, in those cases, it would be beneficial to adjust the frame rate downward to a value that provides a longer exposure time. However, it is also desirable to run the system as fast as possible.

Figure 7A:
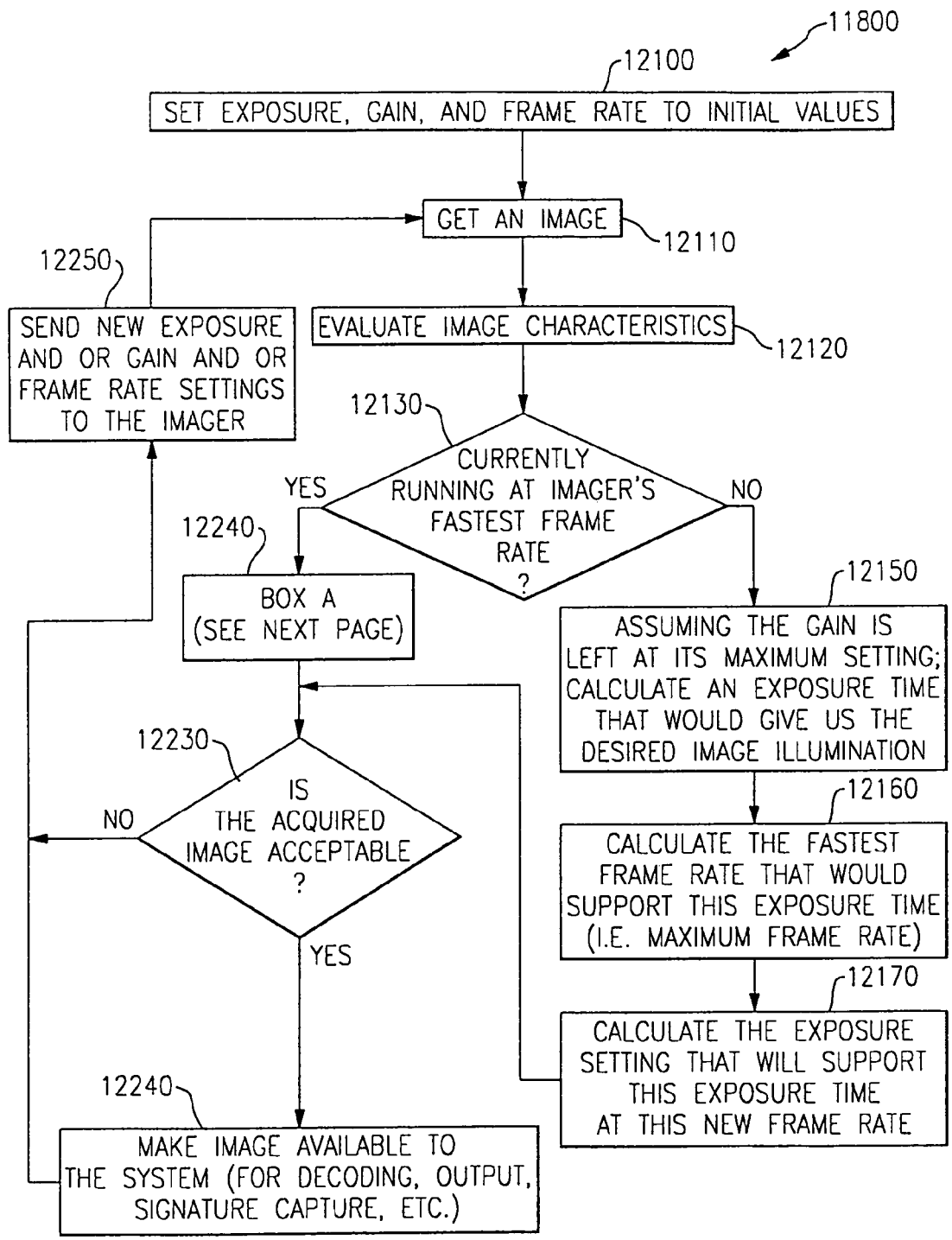
FIGS. 7a and 7b show a flow chart diagram illustrating a frame rate adjustment algorithm according to an embodiment of the invention.
Figure 7B:
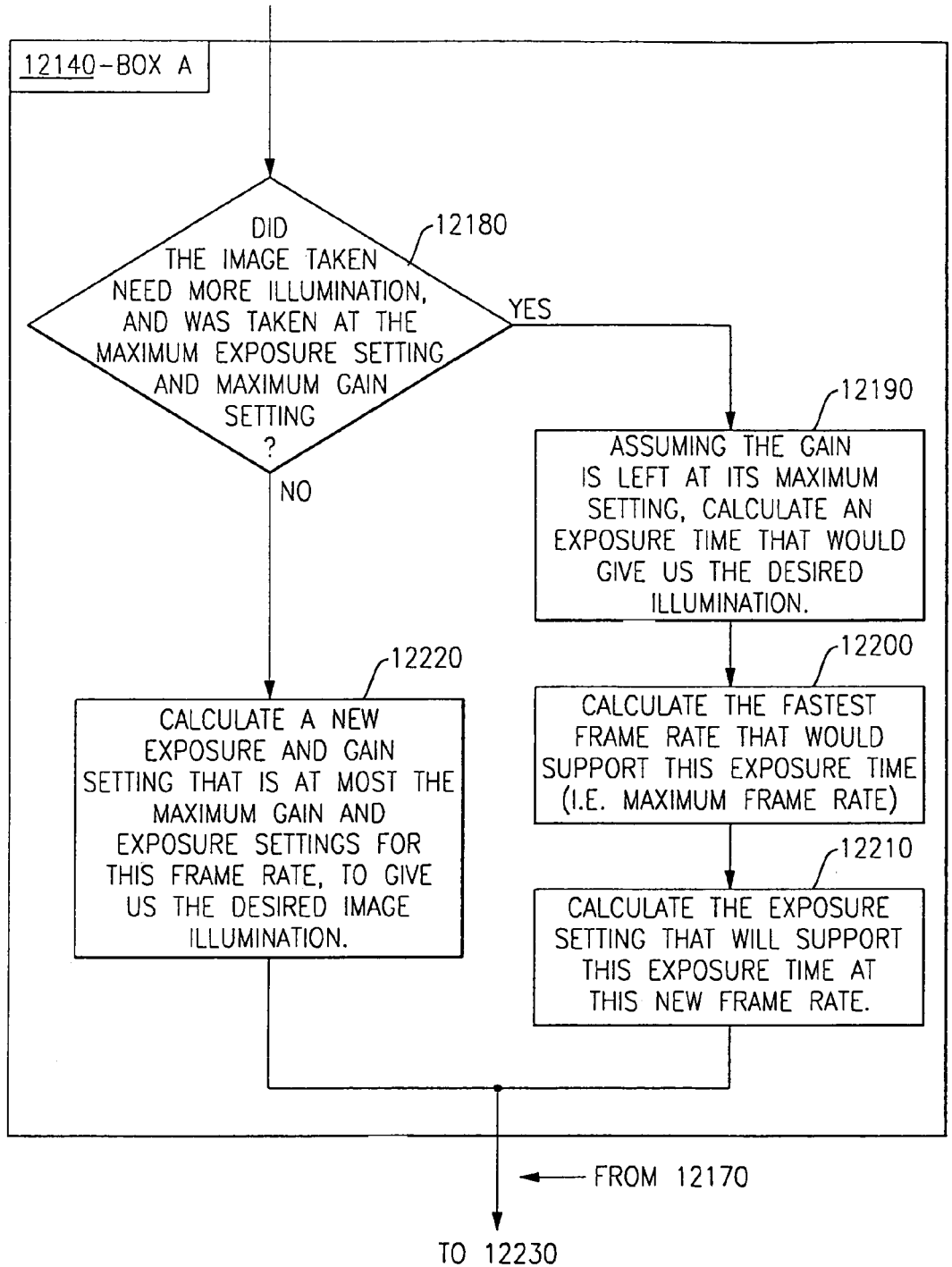

An exemplary process for obtaining an acceptable image with an image reader at a maximum frame rate is set forth in the flow chart 11800 in FIG. 7. At block 12100, the reader is set with initial values of gain, exposure time and frame rate. In an aspect, the next occurring use of the reader will utilize the immediately preceding settings that were used to obtain the last acceptable image. Alternatively, predetermined default settings for frame rate, exposure time, and gain may be set. Upon actuation of the reader, an image is acquired at block 12110. At block 12120, the image is evaluated based upon image characteristics such as signal level, contrast, and others. At block 12130, a determination is made whether the imager is operating at its fastest capability.

If it is determined that the imager is running at the fastest frame rate that it is capable of, the process proceeds through block 12140 to a further determination at block 12180, whether the acquired image needed more illumination, and if so, whether the exposure and gain settings in the imager were set at maximum for the operating frame rate. If the determination at step 12180 is either that the image did not need more illumination (and perhaps required less), or that the exposure and gain settings were not at maximum values, then, at block 12220 new exposure and gain settings are calculated that are, at most, maximum values for the operating frame rate. The process then proceeds to step 12230 to determine whether the image satisfies the criteria required by the imager control algorithm. If yes, the image is made available to the system at block 12240 for decoding, output, signature capture, or other utilization. If the determination at block 12230 is negative, control circuit 140 sends the new exposure and gain settings to the imager at block 12250 and another image is acquired at block 12110, repeating the process. It is convenient to note here that due to potential device limitations, the imager may be configured via control circuit 140 to go from a high exposure setting to a low exposure setting from one frame to the next, however, the ability to change from a low exposure setting to a higher exposure setting may be limited. Since a hardware limitation of the IC Media device provides only for the lengthening of the exposure by a certain amount during each frame, it is advantageous, in an aspect, to lengthen the exposure at a faster frame rate. As such, when adjusting the frame rate, the exposure setting need only be decreased, which can be done from one frame to the next. Furthermore, if the intent is to utilize all of the options available other than frame rate adjustment (i.e., maximizing the exposure and gain settings), then frame rate adjustment can be resorted to as a last option. This may be desirable for a variety of reasons. For example, when the frame rate is decreased, the imager is running slower. As a general rule, faster is better. In addition, as exposure times get longer, motion related blur may be an issue. Therefore, in an aspect, even when the frame rate of the imager is slowed, a maximum allowable gain will be set. In this way, exposure times are maintained for as short a duration as possible at the lower frame rate. Accordingly, at block 12220, the exposure and/or gain settings are adjusted for the fastest frame rate operation.

Proceeding from block 12180, if the control circuit 140 determines that the image did need more illumination and that the exposure and gain settings were already at maximum, then the control circuit will adjust the frame rate lower in order to obtain a brighter image. At block 12190, the control circuit calculates a new exposure time that will provide a desired illumination level, leaving the gain at a maximum setting so as to utilize the shortest exposure time. At block 12200, a calculation is made to determine the fastest frame rate that can support the new exposure time. This fastest frame rate will then be the maximum frame rate. Once the maximum frame rate is determined at block 12200, a new exposure setting is calculated at block 12210 to reflect the exposure time at the new, maximum frame rate. The process then proceeds to step 12230 following the sequence described above.

Returning to the determination at block 12130 that the image was acquired at a frame rate less than the fastest frame rate capability of the imager, leads to blocks 12150 12160 and 12170 that are identical to blocks 12190, 12200 and 12210, respectively. That is, at block 12150, an exposure time is calculated that will give the desired image illumination. At block 12160, the fastest frame rate that will support this exposure time is calculated, and then at block 12170 the exposure setting that will support the new exposure time is calculated. After block 12170, the process proceeds to decision block 12230 and continues as described above. According to the embodiment, when images are acquired at frame rates other than the fastest frame rate capability of the imager, the control circuit 140 provides a calculation to ensure that the frame rate is optimized.

Referring again to decision block 12230, the decision, in practical terms, is whether the image that was acquired is "good enough" to make it available to the rest of the system for decoding, output, signature capture, or other applications. In some cases, the imager control will have very specific criteria with small tolerances for accepting images that only fall within a narrow window of variations. In other cases, the imager control may have no criteria whatsoever, such that the image is handed to the system regardless of quality. At block 12250, the new, calculated settings are communicated to the device. At this point, different considerations may be required depending upon the type and construction of the sensor. For example, in the IC Media 105A camera, when an exposure change is made, it takes effect on the next frame, and is seen in the image captured during the following frame. Thus, if the change is made between frames N and N+1, the change takes effect on frame N+1 and is seen during the transfer on frame N+2. However, changing the gain setting affects the data coming out of the imager immediately. For a certain exposure setting and gain setting to be applied to a single image, if the exposure setting was applied between frames N and N+1, the gain setting would need to be applied between frames N+1 and N+2 to provide the data coming out during frame time N+2 with the resulting exposure and gain. With respect to frame rate adjustment, if the rate is changed between frames N and N+1, the exposure setting from frame N is nullified because the data coming out during frame N+1 does not have a fixed exposure time. Thus, this frame should be discarded.

Figure 8:
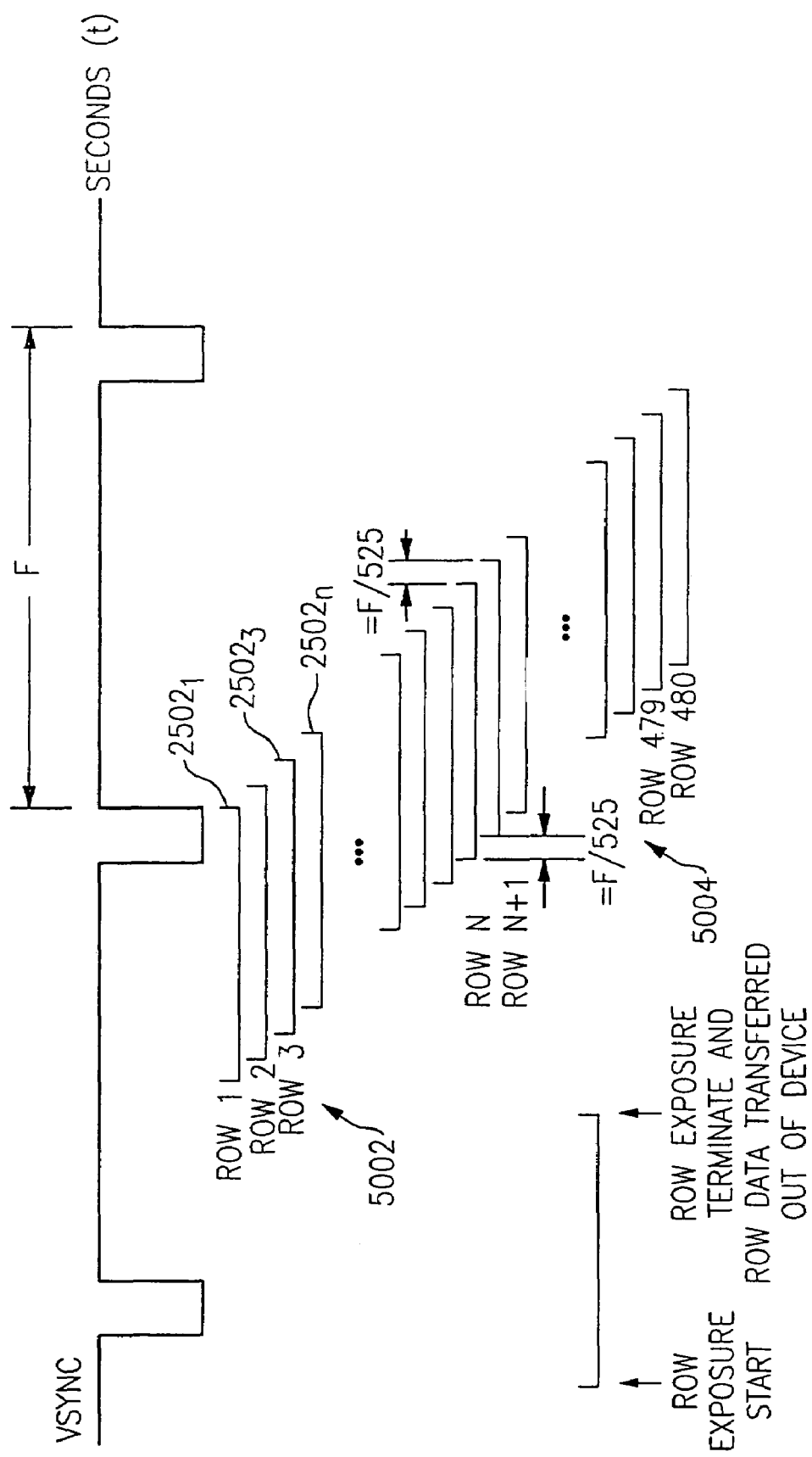
FIG. 8 shows a timing diagram of an electronic rolling shutter according to an embodiment of the invention.

In an illustrative aspect according to the invention, the digital image reader utilizes an IC Media 105A 2-D digital image sensor. This is a CMOS based progressive scan sensor that uses an electronic "rolling shutter," the operation of which is illustrated with reference to FIG. 8. Unlike a "snapshot shutter" typically used in CCD-based imagers, which expose all of the pixels in the array at the same time, a CMOS based sensor utilizing a rolling shutter operates on a time-triggered basis. The rolling shutter allows a single pixel's exposure time (or a group of pixel's exposure time, such as that of a single row or selected group of rows; e.g., two or four rows in a color imager) to be acquired relative to when the pixels or groups of pixels are to be transferred out of the imager. In the case of the IC Media 105A imager, each row $2502_n$ of pixels is exposed during differing, but overlapping, time periods as shown at 5002. In operation, for example, if the imager were set for an exposure time of Xms, then each row would begin its exposure period exactly Xms before the time for that row to be transferred out from the device. The illustrative IC Media 105A imager has 525 rows, however only 480 of them are active rows, which collect light, the remaining rows being either light shielded or simply padding. The amount of time needed to transfer a given row out of the imager (hereafter known as a "row time"), and also the amount of time delay between when the exposure of a given row N begins and the time when the exposure of row N+1 begins, is F/525, where F is the time from a given point in one frame to the same point in the next frame (known as the "frame time," which equals 1/(frame rate) in units of time) as shown at 5004. Therefore, if the imager were configured to run at a 30 pfs frame rate, then the frame time, F, would be 1/30 pfs or 33.3 ms, and the row time for this image would be 33.3 ms/525 or 63.5 μs. If, for example, the imager were configured to run at a 12 fps frame rate, then the frame time would be 1/12 fps or 83.3 ms, and the row time for this image would be 83.3 ms/525 or 159 μs.

In the illustrative embodiment, exposure settings are communicated to the IC Media 105A sensor over the I²C interface, and are configured in units of "row time". In this device, the exposure setting can be a value between 1 and 524, indicating that the exposure time of pixels can be as little as 1/525 to as much as 524/525 of the frame, in increments of 1/525 of the frame time. This relationship establishes why the calculation of a new frame rate should be determined before a new exposure setting is configured. With respect to the algorithm 11800, the illumination of the current image is evaluated at block 12180 and the actual exposure time is calculated by determining the frame time based on the current frame rate, establishing the row time, and multiplying that by the exposure setting used for the current image. Using the well-known relationship between image illumination and exposure time, a new exposure time is determined that will meet the desired image illumination. Given this desired exposure time, a frame rate is determined by finding the fastest frame rate, where, if an exposure setting of 524 were used, for example, would have an exposure time greater than the desired exposure time. After having determined the fastest frame rate, the row time is calculated for this frame rate and the exposure setting that would result in the closest exposure time to the desired exposure time is determined. For example, if it were determined that for proper illumination an exposure time of 121 ms was needed, the fastest frame rate that would support the desired exposure time of 121 ms would be 6 pfs. This is due to the maximum exposure time available for the imager. In the illustrative embodiment using the IC Media 105A imager, the frame rates and corresponding maximum exposure times are as follows: at 30 pfs, 33.27 ms; at 20 pfs, 49.9 ms; at 15 pfs, 66.5 ms; at 12 fps, 83.2 ms; at 10 pfs, 99.8 ms; at 6 pfs, 166 ms; at 5 pfs, 199 ms; at 4 fps, 250 ms; at 3 fps, 332 ms; at 2 fps, 499 ms; and at 1 pfs, 998 ms. Thus at 6 pfs, the row time is (1/6 pfs)/525, or 317 μs. Therefore, the desired exposure setting to get as close to 121 ms of exposure time as possible is the desired exposure time divided by the row time, or 121 ms/317 μs, which is an exposure setting of 382 (this gives an actual exposure time of 121.3 ms).

Referring to further aspects of electrical circuit 100 in FIG. 6, circuit 100 includes a system bus 150. Bus 150 may be in communication with CPU 141 via a memory interface such as EIM interface 117 of IC chip 180. System RAM 142 and system ROM 143 are also connected to bus 150 and in communication with CPU 141 via bus 150. In the embodiment shown, RAM 142 and ROM 143 are provided by discreet IC chips. System RAM 142 and system ROM 143 could also be incorporated into processor chip 180.

In addition to having system RAM 142, sometimes referred to as "working" RAM, electrical circuit 100 may include one or more long-term storage devices. Electrical circuit 100 can include for example a "flash" memory device 120. Several standardized formats are available for such flash memory devices including: "Multimedia" (MMC), "Smart Media," "Compact Flash," and "Memory Stick." Flash memory devices are conveniently available in card structures which can be interfaced to CPU 141 via an appropriate "slot" electro mechanical interface in communication with IC chip 180. Flash memory devices are particularly useful when the reader must archive numerous frames of image data. Electrical circuit 100 can also include other types of long term storage such as a hard drive which may be interfaced to bus 150 or to an appropriate I/O interface of processor IC chip 180.

In a further aspect of electrical circuit 100, control circuit 140 is configured to control the turning "OFF" and turning "ON" of LEDs 16, 18 of illumination block 160. Control circuit 140 preferably controls illumination block 160 in a manner that is coordinated with the capturing of the frames of image data. Illumination LEDs 16 are typically "ON" during at least a portion of frame capture periods. Configuring circuit 140 so that LEDs 16, 18 have "OFF" periods significantly reduces the power consumption of circuit 100.

In a further aspect of the electrical circuit 100, electrical circuit 100 can be configured so that PWM output interface 114 of IC chip 180 controls illumination LEDs of an imaging module such as illumination LEDs 16 of module 10-1 or aiming/illumination LEDs 18 of module 10-2.

In one embodiment, illumination block 160 is in communication with PWM output interface 114 and configured in such manner that LEDs 16 are turned "ON" at a leading edge of PWM pulses output at PWM interface 114, and are turned "OFF" at falling edges of PWM pulses output at PWM interface 114. PWM interface 114 should be configured so that several pulses are generated and sent over communication line 153i during the time that a single row of pixels of image data are exposed to light prior to clocking out of pixel values corresponding to that row. Thus, illumination LEDs 16 would be turned "ON" and "OFF" several times during the exposure period for exposing a row of pixels to light. Further, the number of pulses output by PWM output 114 during the time that a single row of pixels are exposed should not vary substantially from row to row. The pixel clock signal received at frame grabber block 148 of IC chip 180 can be utilized to generate the PWM output. It can be seen, therefore, that multifunctional IC chip 180 including frame grabber block 148 and PWM output 114 greatly simplifies the task of developing PWM signals for use in controlling illumination LEDs 16 of module 10.

In another embodiment, PWM output 114 and illumination block 160 are configured so that PWM output 114 controls the intensity of illumination, not the on time/off time of illumination. Illumination LED block 160 in such an embodiment can include a power supply circuit which is interfaced to PWM output 114 such that the PWM signal output at PWM output 114 varies the voltage or current supplied to LEDs 16.

Figure 9A:
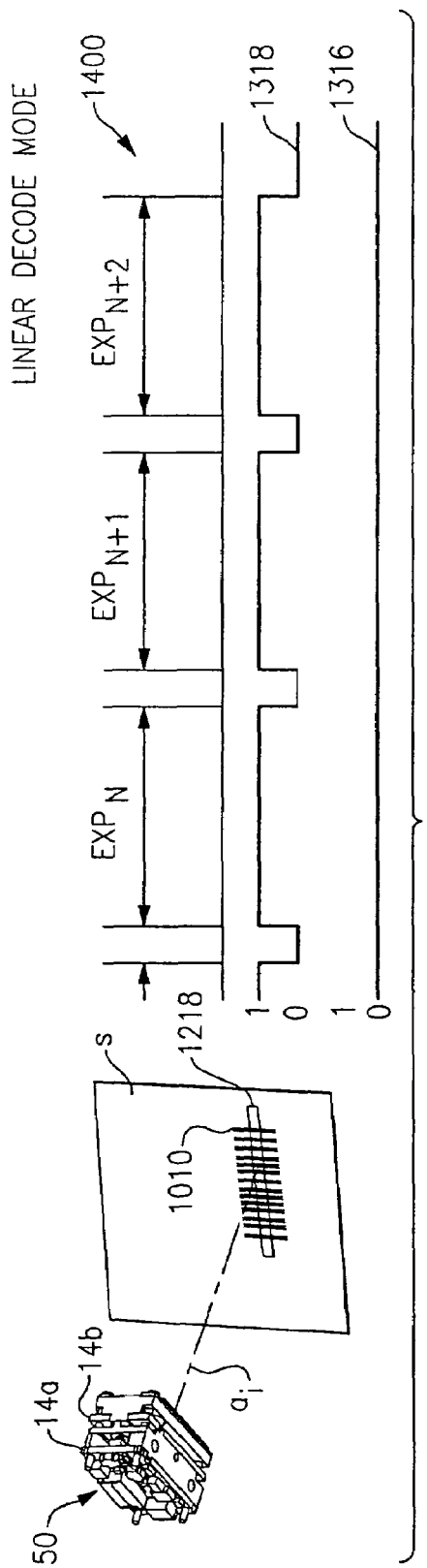
Figure 9B:
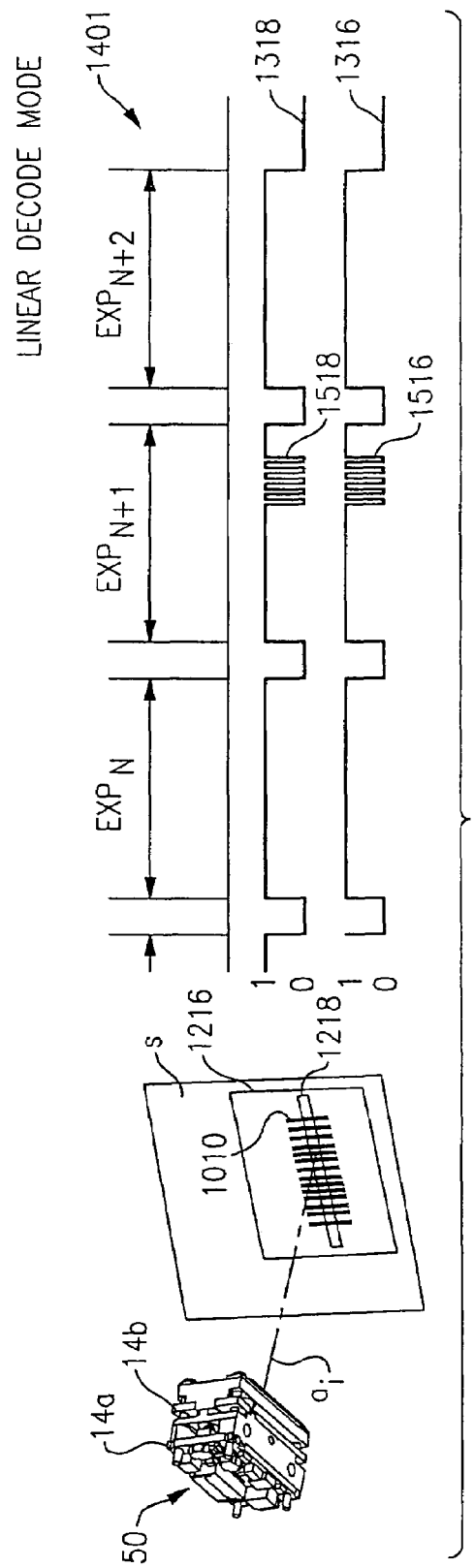

In a further aspect of electrical circuit 100, aiming LEDs 18 of circuit 100 can be controlled by a signal transmitted by a general purpose I/O port 116 of IC chip 180 over communication line 153a. Multifunctional processor IC chip 180 can be programmed so that an aiming LED control signal is caused to change to an "ON" state when frame grabber block 148 completes the process of capturing a complete frame of image data. Frame grabber block 148 may be configured to generate an "end of acquisition" or "end of frame" signal when frame grabber block 148 completes the process of capturing a complete frame of image data into RAM 142. When CPU 141 receives an "end of acquisition" signal, CPU 141 controls I/O port 116 to change the state of LED control signal 168. Control circuit 140 may also change the state of LED control signal 168 when generating a start of frame signal. Control circuit 140 may execute a delay prior to changing the state of signal 168. Control circuit 140 is programmed so that LED control signal 168 remains in an "ON" state known to be sufficiently short duration so as not to cause actuation of an aiming LED 18 during a succeeding frame exposure period. Configured in the manner described, aiming LEDs 18 are selectively pulsed "ON" for a short duration during intermediate successive frame exposure periods. Control circuit 140 in one mode of operation selectively turns illumination LEDs 16 "ON" during exposure periods and "OFF" intermediate exposure periods, and conversely turns aiming LEDs 18 "ON" intermediate frame exposure periods and "OFF" during exposure periods. To the user, given the frame rate, substrate's (as shown in FIG. 9a) appears to simultaneously have projected thereon aiming pattern 1218 and illumination pattern 1216 as indicated by FIG. 9b, though in an instant of time only one or the other of the patterns 1216, 1218 is actually present.

While aiming LEDs 18 may be turned "OFF" during frame exposure periods for energy conservation purposes and for purposes of more uniformly illuminating, a substrate, s, the inventors developed a mode of operation in which it is beneficial to turn aiming LEDs "ON" during a frame exposure period.

Control circuit 140 may be configured to operate in a "linear decode" mode of operation in which control circuit 140 is optimized for reading 1 dimensional bar codes (such as UPC/EAN, Code 39, Code 128, UPC, ITF, LED 1316). One example of a linear decode mode of operation is described with reference to FIG. 9a including time line 1400 in which aiming LED control signal 1318 and illumination LED 1616 signal are plotted against exposure periods $EXP_N$, $EXP_{N+1}$, $EXP_{N+2}$. In the linear decode mode described with reference to FIG. 9a, control circuit 140 turns aiming LEDs "ON" during frame exposure periods $EXP_N$, $EXP_{N+1}$, $EXP_{N+2}$ and maintains illumination LEDs "OFF" throughout the time that control circuit 140 operates according to the linear decode mode. Thus, as shown in FIG. 9a, an operator of a reader 10 in which module 50 is incorporated will observe aiming line 1218 without there being an illumination pattern 1216 projected on a target substrate. Maintaining illumination LEDs 16 "OFF" during the linear decode mode is useful for a variety of reasons. Maintaining illumination LEDs "OFF" during a linear decode mode conserves power. Maintaining illumination LEDs "OFF" during a linear decode mode also enhances the attention with which a user focuses on aiming pattern 1218. Turning "ON" aiming LEDs 18 increases the signal strength of image signals corresponding to pixel locations representing an area illuminated by pattern 1218, and aids a user in aligning a reader with a symbol to be read.

Control circuit 140 and module 50 may be configured so that in a linear decode mode, control circuit 140 preferentially processes image data corresponding to an area of a target substrate illuminated by aiming pattern 1218. Control circuit 140 can process image data within an area corresponding to aiming pattern 1218 by operating in a "partial frame mode" as described in U.S. application Ser. No. 09/766,922, filed Jan. 22, 2001, entitled "Optical Reader Having Reduced Parameter Determination Delay," incorporated by reference, and as described in U.S. application Ser. No. 09/766,806, filed Jan. 22, 2001, entitled "Optical Reader Having Partial Frame Operating Mode," also incorporated by reference. Control circuit 140 can also preferentially process image data corresponding to an area illuminated by aiming pattern 1218 by capturing a full frame of image data and then commencing a decode attempt by reading a line of pixel valves corresponding to an area of a target expected to be illuminated by aiming pattern 1218. The reading out of a line of image data during a 1D symbology decode attempt is sometimes referred to by skilled artisans as "launching a scan line."

Another embodiment of a linear decode mode is illustrated with reference to FIG. 9b. In the linear decode mode depicted of FIG. 9b, aiming LEDs 18 are "ON" during exposure periods along with illumination LEDs 16. The embodiment of FIG. 9b in which both LEDs 16 and LEDs 18 are "ON" during an exposure period is advantageous at least for the reason that it provides for a capture of a high quality two-dimensional image. The high quality two-dimensional image can be processed (e.g., for 1D decoding, 2D decoding, OCR) should a one-dimensional symbology decode attempt fail. It will be understood that any period as described herein can be characterized by a rapid turning "ON" and "OFF" of LEDs 16 or 18 during an exposure period, as is suggested by high-speed pulse segments 1516, 1518.

In the examples of FIGS. 9a and 9b, there is a delay between frame exposure periods $EXP_N$, $EXP_{N+1}$, $EXP_{N+2}$. An example of a linear decode mode implemented in a reader having overlapping frame exposure periods is explained with reference to FIG. 9c. Overlapping frame exposed periods are common when certain types of image sensors are used, e.g., CMOS and CID image sensors. In the embodiment described with reference to signal-time plots 1520, 1530 of FIG. 9c, aiming LEDs 18 are pulsed "ON" during exposure periods and illumination LEDs 16 are maintained "OFF" for the entire time the reader operates in the linear decode mode. Control circuit 140 and module 50 can be configured so that aiming LED control signal 1318 is selectively pulsed "ON" during the time that lines of pixels corresponding to area 1218 illuminated by LEDs 18 are being exposed. Signal-time plots 1550, 1560 of FIG. 9c illustrate possible operation of a reader having overlapping frame exposure periods in a "normal" mode of operation. Signal-time plot 1550 illustrates control of aiming LEDs 18 in a "normal" mode. Signal-time plot 1560 illustrates control of illumination LEDs 16 in a "normal" mode. In a "normal mode" of a reader having an overlapping frame exposure period, illumination LEDs 16 may be "ON" during course of time in which control circuit 140 captures frame of image data (LEDs 16 may actually be "flickered" as indicated by pulses 1516, 1516, FIG. 9b). Control circuit 140, however, selectively turns aiming LEDs 18 "ON" and "OFF" while operating in a "normal" mode. Specifically, while operating in a "normal" mode, control circuit 140 may selectively turn aiming LEDs 18 "OFF" during times that it is expected that middle rows of image sensor 32 are being exposed so that light from LEDs 18 (projected to define aiming pattern 1218) does not affect image signals generated by middle row pixels of image sensor 32. Because in accordance with signal-time plot 1550, LEDs 18 are "ON" for a substantial portion of a frame capture period, pattern 1218 appears to be always projected to a user. It will be appreciated that selection of a single line horizontal aiming pattern 1218 (as opposed to a two dimensional pattern) in connection with an image sensor reader having overlapping frame exposure periods and line by line frame capture simplifies the task of controlling aiming LEDs 18 to project a visible pattern 1218 without light from the LEDs 18 affecting image signals generated by image sensor 32.

For comparison, a control circuit 140 operating according to a normal decode mode in which the control circuit 140 is optimized for decoding a symbology of an unknown type (1D or 2D) is described with reference to FIG. 9d. In the embodiment described with reference to FIG. 9d, illumination LEDs 16 are selectively turned "ON" during exposure periods $EXP_N$, $EXP_{N+1}$, $EXP_{N+2}$, while aiming LEDs 18 are selectively turned "ON" intermediate of the exposure periods $EXP_N$, $EXP_{N+1}$, $EXP_{N+2}$. As alluded previously, illumination LEDs 16 and aiming LEDs 18 can be repeatedly pulsed "ON" and "OFF". Thus, referring to FIG. 9b illumination LEDs 16 can be rapidly pulsed "ON" and "OFF" during a frame exposure period, $EXP_N$, $EXP_{N+1}$ as suggested by high-speed control pulses 1516. Likewise, aiming LEDs 18 can be rapidly pulsed "ON" and "OFF", as is suggested by high speed control pulses 1518 as shown in the timing diagram 401 of FIG. 9b.

Figure 3E:
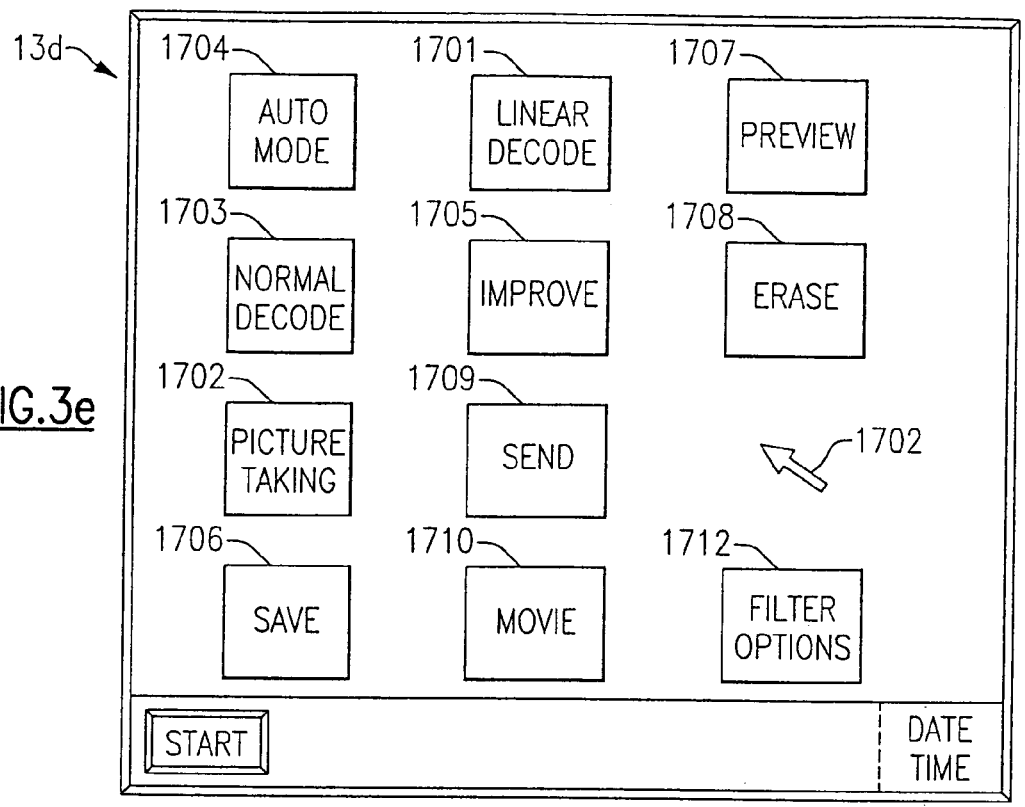
FIGS. 3e and 3f show graphical user interfaces, which may be utilized in the selection of an operating mode according to an embodiment of the invention.
Figure 3F:
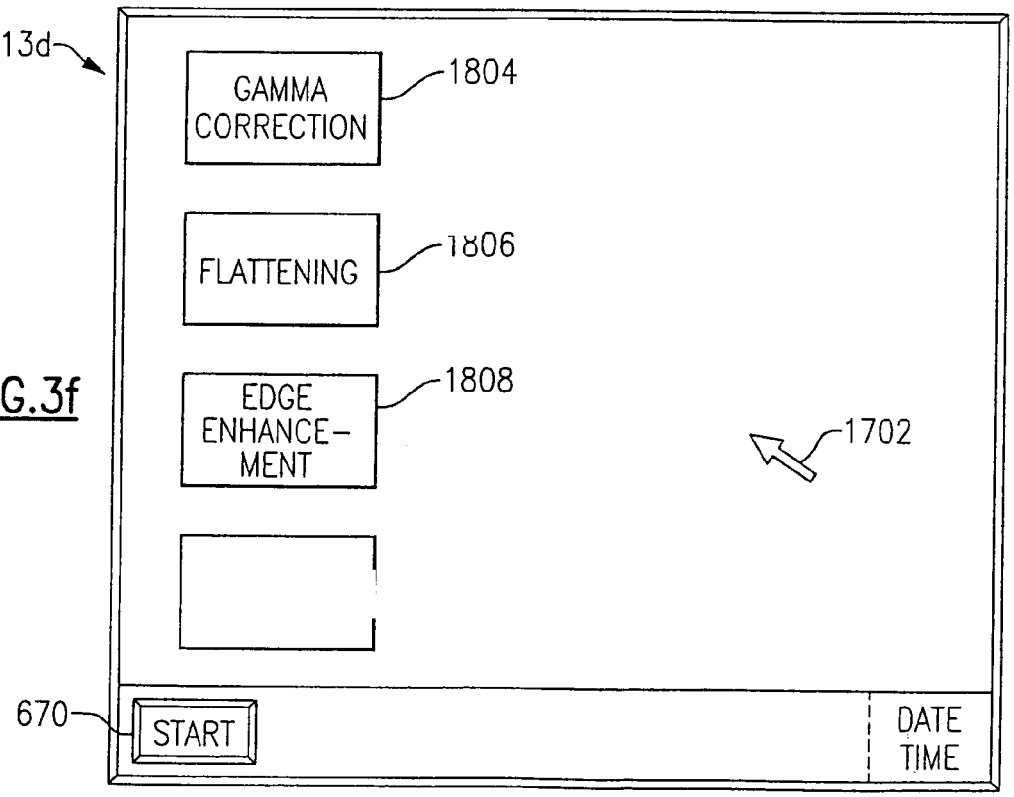
Figure 10:
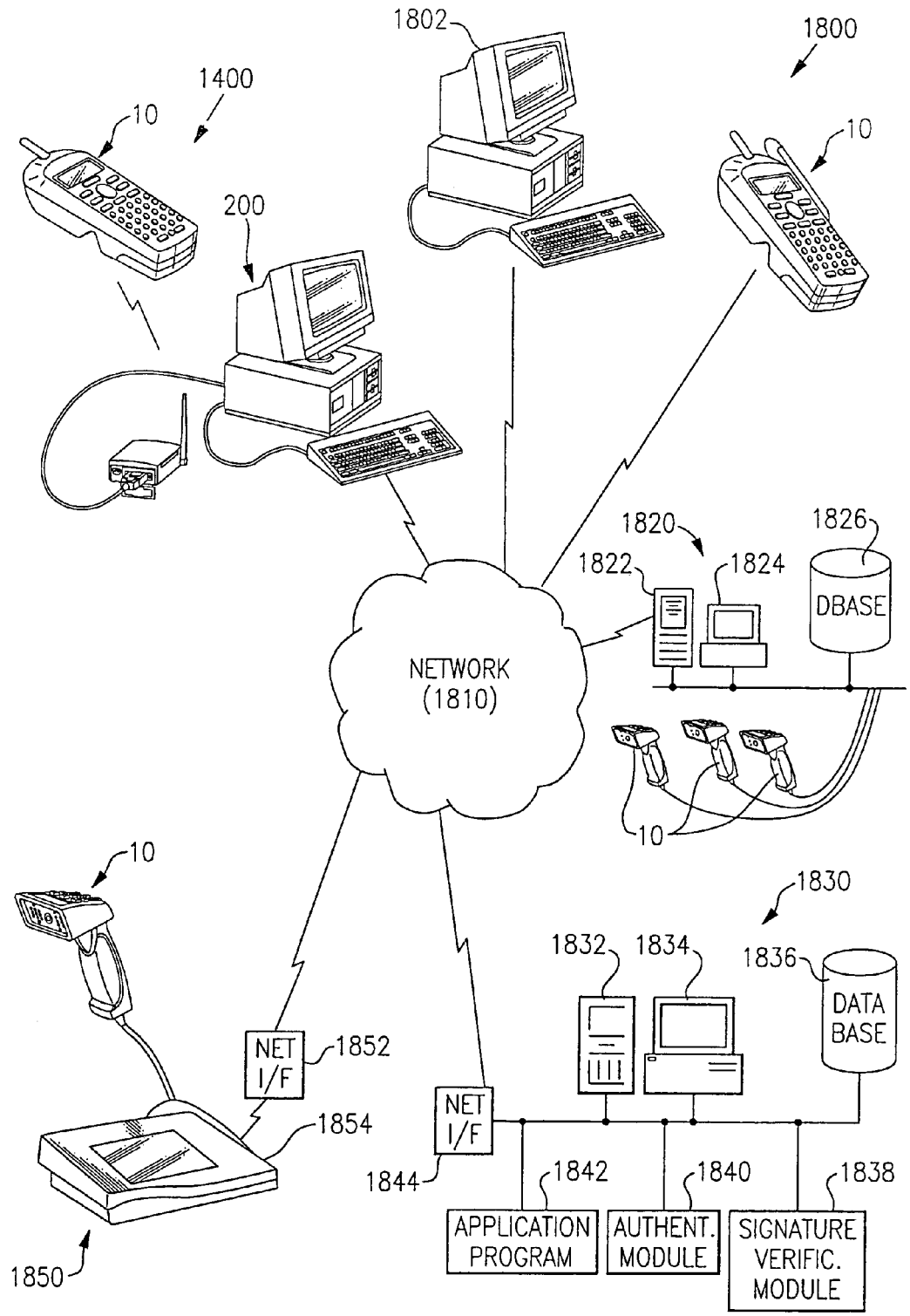
FIG. 10 illustrates an optical reader network according to an embodiment of the invention.

Reader 10 can be configured to be driven into a linear decode mode by selection of a menu-displayed icon 1701 as shown in FIG. 3e. The icon 1701 can be selected by "pointing and clicking" using a mouse, trackball, joystick or other pointer to move arrow 1702. Icon 1701 can be selected by applying pressure to icon 1701 if display 13 is a touch screen display having an associated touch screen overlay. Reader 10 can be configured to be driven into a linear decode mode with use of another menu interface. For example, reader 10 can be configured to commence operation in a linear decode mode on the selection of an appropriate key of a keyboard 13k. Reader 10 can also be driven into the linear decode mode by reading a reprogramming "menu symbol" as described in U.S. Pat. No. 5,929,418, issued Jul. 27, 1999, entitled, "Optical Reader Having Improved Menuing Features," incorporated by reference. The selection of the linear decode mode may also be made remotely by input of a command into a nonintegrated host computer (e.g., a GUI or keyboard of a host 200, 1802, 1824, 1834, as shown in FIG. 10).

In one embodiment of a linear decode mode, the linear decode mode is not ceased until a user manually selects another operating mode. In another embodiment, reader 10 is configured on selection of the linear decode operating mode to operate in a linear decode mode, and then automatically switch to a normal decode mode of operation if a decode attempt fails subsequent to a trigger signal being turned "ON". In another embodiment, reader 10 is configured, on selection of a linear decode mode to operate in a linear decode mode, and then automatically switch to a normal decode mode of operation if there is no successful decoding of a symbol, a predetermined time subsequent to a trigger signal being turned "ON". The predetermined time may be calculated based on the frame rate. That is, the predetermined time may be considered to have elapsed if after Y frames have been captured and subjected to a decode attempt, and decoding is still not successful. Trigger signals can be caused to change state on the actuation of trigger 13*t*. Trigger signals can also be caused to change state to an "ON" state automatically on the sensing of features in image data as explained in U.S. patent application Ser. No. 09/432,282, filed Nov. 2, 1999, entitled, "Indicia Sensor System For Optical Reader," incorporated by reference. Trigger signals can also be caused to change state to an "ON" state by communication from a nonintegrated processor system M as explained in U.S. patent application Ser. No. 09/385,597, filed Aug. 30, 1999, entitled, "Optical Reader System Comprising Local Host Processor And Optical Reader" incorporated herein by reference in its entirety.

An embodiment of the invention wherein control circuit 140 is configured to operate in a picture taking mode and in a decode mode, is described with reference to FIGS. 11*a* and 11*b*. The inventors observed that it may be desirable to differentiate between imager control parameters used for picture taking and imager control parameters used for decoding. For picture taking, for example, the speed with which an image is taken is generally not an important consideration. Therefore, a long exposure period can be used with less artificial light. For decoding, speed of image capture is often critical. Users of optical readers demand that the readers they use decode decodable symbols quickly. Therefore, decoding is generally enhanced with use of substantial artificial light and shorter exposure periods.

Figure 11A:
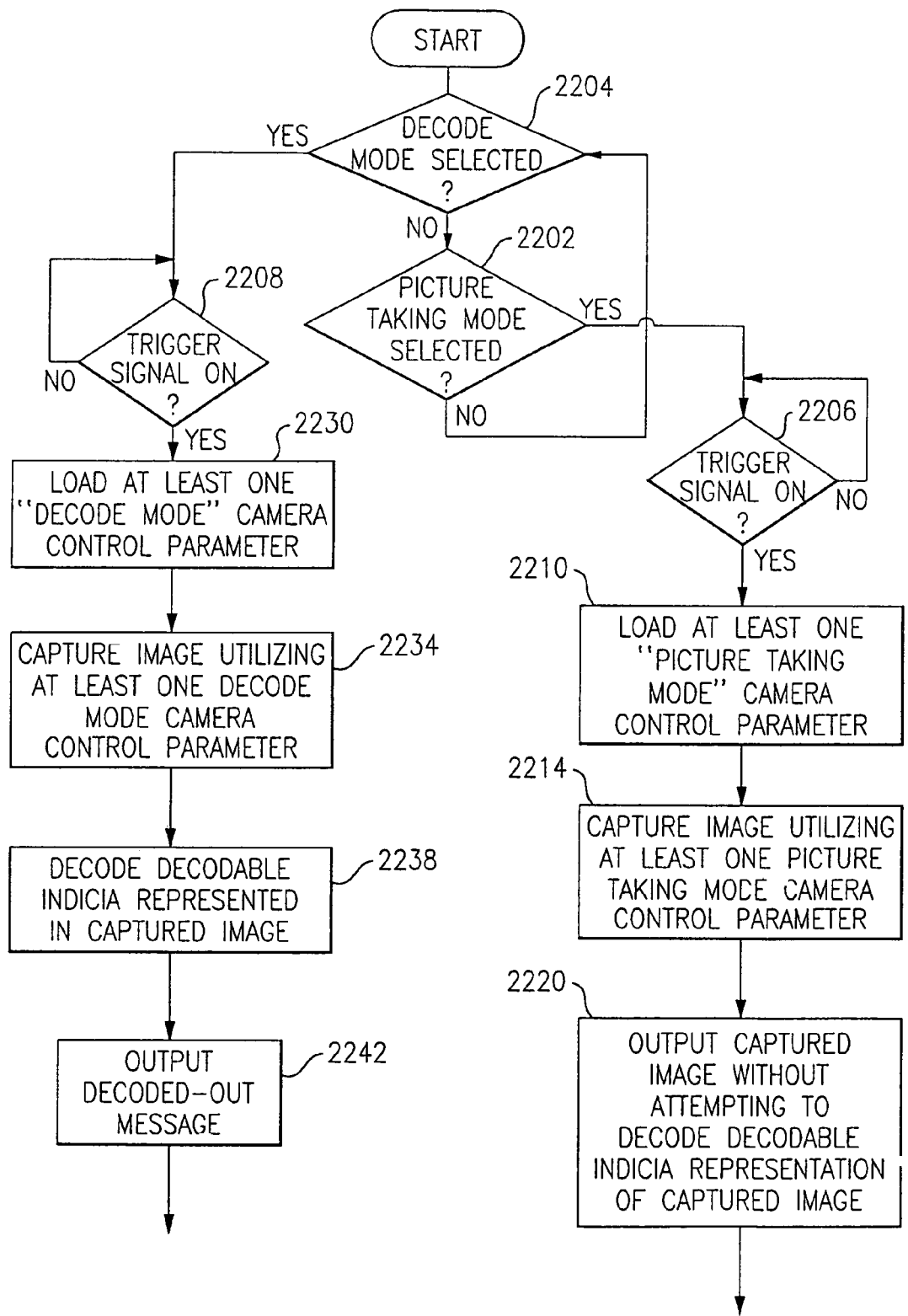
FIGS. 11a-11e are flow diagrams illustrating various operating modes according to an embodiment of the invention.
Figure 11B:
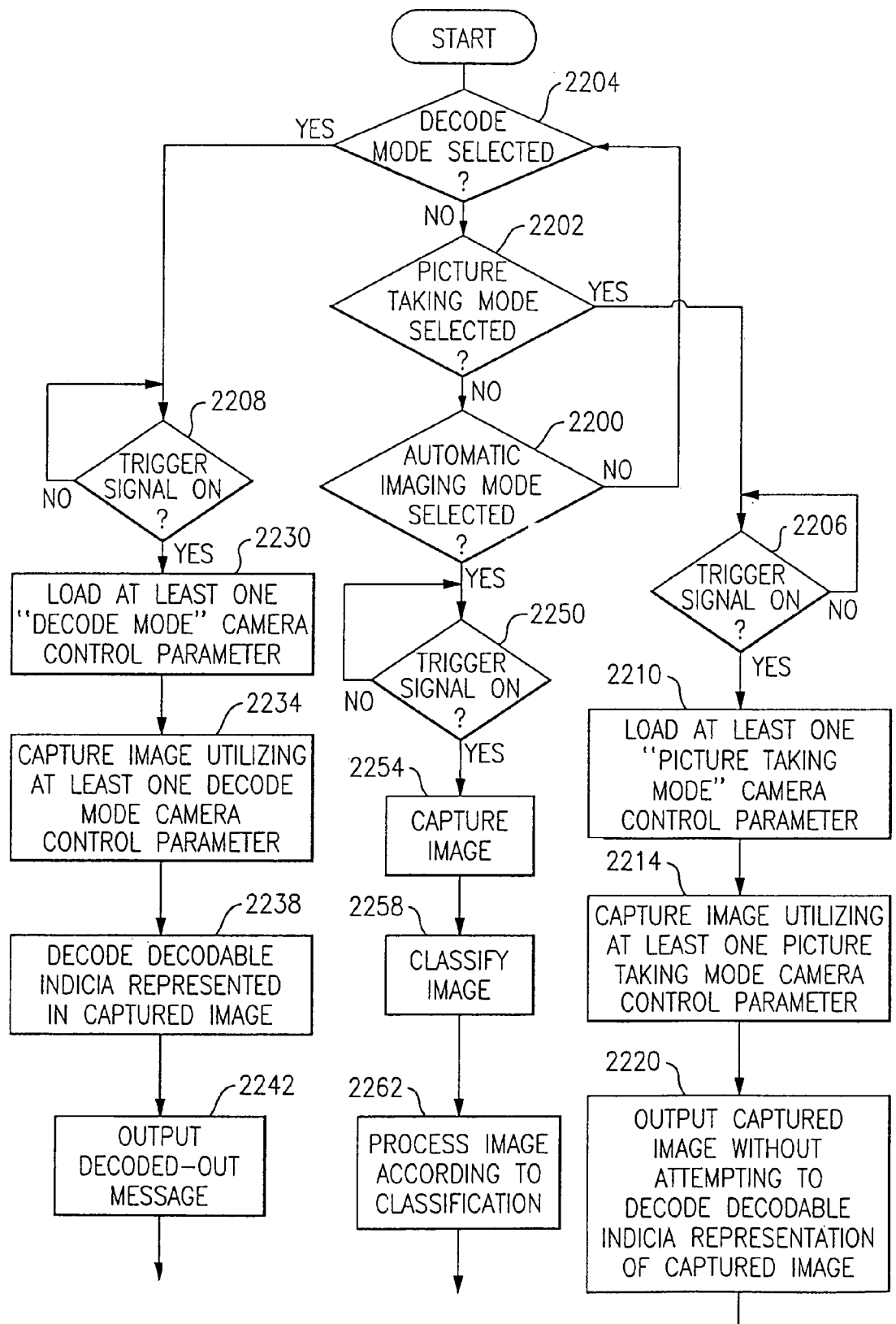
Figure 11C:
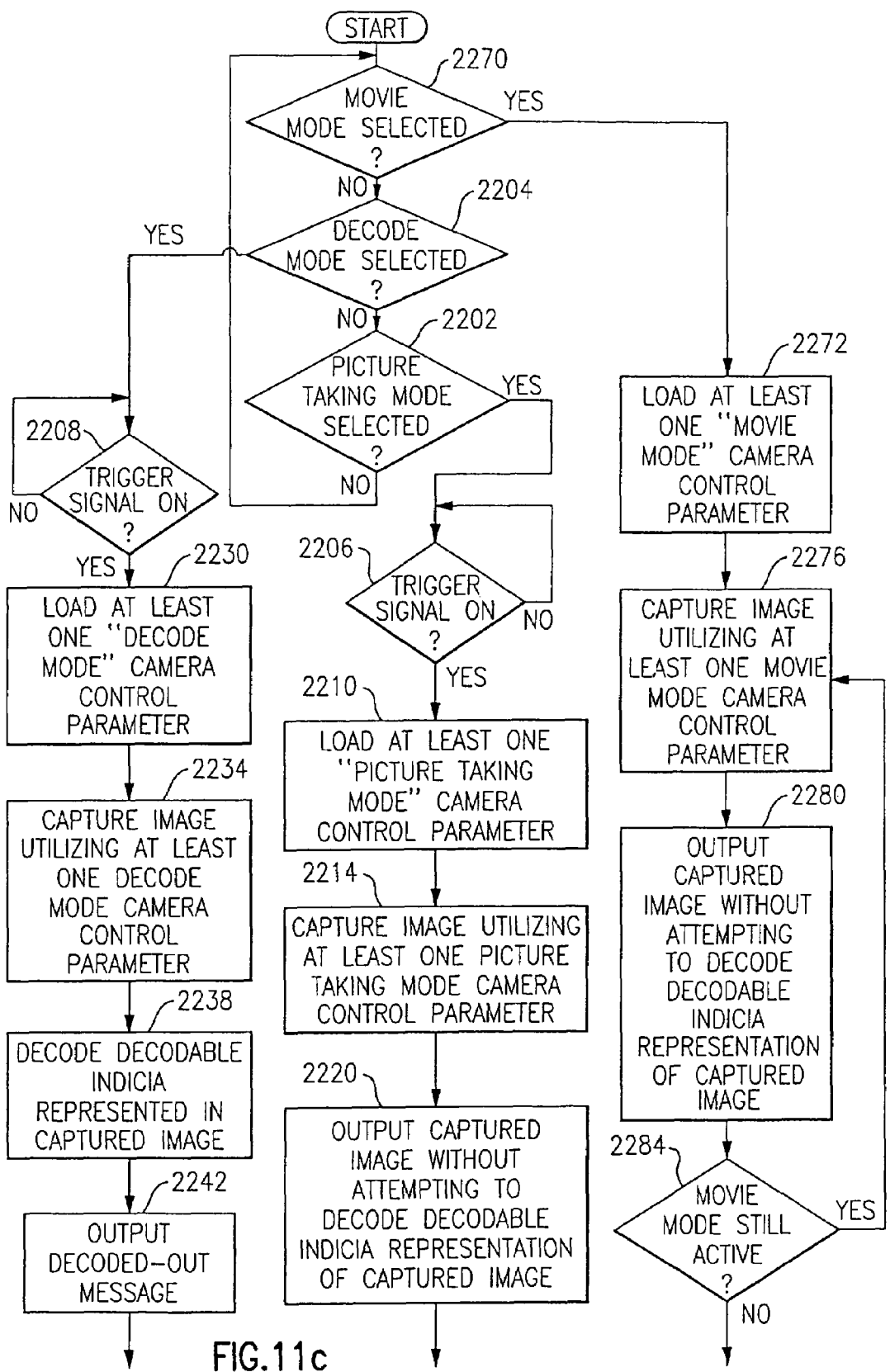

Referring to the flow diagram of FIG. 11*a*, a mode selection of one a picture taking mode at block 2202 or decode mode at block 2204 causes branching to one of blocks 2206, 2208, in which control circuit waits for a trigger signal to change to an "ON" state (trigger signals can be caused to switch to an "ON" state manually, manually remotely, or automatically as described previously). At block 2210 control circuit 140 loads an imager control parameter.

The "loading a imager control parameter" step as described herein can be accomplished using any one of a number of known programming methods. A program executed by control circuit 140 can have a "parameter table" storing a plurality of parameter values and the program may call one or more parameters of the parameter table at a specific point of a program execution. The loading of an imager control parameter step can be accomplished by changing one or more values of a program's parameter table. The loading of an imager control parameter step can also be accomplished by changing a destination of one or more program pointers or by any other known programming method for generating a command to redirect program flow.

The at least one imager control parameter loaded at block 2210 may take on a variety of forms. The at least one imager control parameter may be (e.g., an exposure period value, a gain control value, an illumination level value (controlling current to LEDs 16, 18), a frame rate, an initial exposure period value, an initial gain value, an initial illumination level value (controlling current to LEDs 16, 18), or an initial frame rate). In one particular example of the invention, a parameter loaded at block 2210 is a parameter that establishes a zero illumination level generated by the aiming/illumination system of the reader during the course of the picture-taking mode (a parameter which when read operates to cut off current to LEDs 16, 18). Photograph quality under certain circumstances may be enhanced when an image is captured with LEDs 16, 18 "OFF".

A parameter loaded at block 2210 may also be a variable of a formula used to adjust a characteristic of frame capture over the course of several frames as in the exposure period development method described in U.S. patent application Ser. No. 09/776,922, filed Jan. 22, 2001, entitled, "Optical Reader Having Reduced Parameter Determination Delay," incorporated by reference. To illustrate an example of a formula variable type parameter which could be loaded at block 2210, the variable parameter could be a variable of the formula used to adjust characteristics of image capture over the course of several frames. In a specific example, a next frame's (Frame N) exposure period could be calculated based on a relationship between a target frame white value (which may be calculated using a sample pixel white value data), an observed frame white value, a previous frame's (Frame N-M, M1) exposure period and a variable, wherein the value of the variable depends on whether the picture taking mode or the decode mode is selected. The imager control parameter which is loaded at block 2210 may also comprise a series of instructions. For example, control circuit 140 at block 2210 may alter a program pointer or set up an appropriate call or other suitable command so that a dynamically linked library file (as .dll, .ocx or equivalent kinds of files) particular to the picture taking mode is installed. At block 2210, control circuit 140 may install a first dynamically linked library (DLL) file for execution of first algorithm for controlling (e.g., gain or exposure or illumination). At block 2230 (executed during the decode mode) control circuit 140 may install a second DLL for execution of a second algorithm for controlling (e.g., gain, exposure, illumination level), wherein the second algorithm includes a set of instructions different than the set of instructions of the first algorithm.

At block 2214, control circuit 140 captures a frame of image data utilizing the at least one imager control parameter loaded at block 2210. For example, if the at least one parameter loaded at block 2210 is the single parameter of a specific exposure period, control circuit 140 at block 2214 captures a frame of image data into RAM 142 utilizing the specific exposure period setting loaded at block 2210. It will be understood that capture block 2214 may actually include the capture of one or more "parameter determination" frames of image data which are captured for purposes of developing a frame of image data intended for output at block 2220.

Referring again to the flow diagram of FIG. 11*a*, control circuit 140 at block 2220 outputs a frame of image data captured at block 2214. Outputting a frame of image data at block 220 may be accomplished in a variety of useful ways. Control circuit 140 may display the captured image on display 13*d*, may send the image to a host 200 or network 1810 (FIG. 10), or may send the image to a printer for printing.

If the decode mode is selected at block 2204, control circuit 140 proceeds to block 2208 to wait for a trigger signal to change to an "ON" state as described previously. On the changing of a trigger signal to an "ON" state at block 2208, control circuit 140 loads at least one decode mode imager control parameter in the manner of the loading of the picture taking imager control parameters as described relative to block 2230. At block 2234, control circuit 140 captures a frame of image data into RAM 142 utilizing the at least one imager control parameter loaded at block 2230. As explained with reference to capture block 2214, the capture block 2234 may actually involve a series of frame capture steps including capturing of "parameter determination" frames of image data. At block 2238, control circuit 140 decodes a decodable symbol. As explained in U.S. Pat. No. 5,929,418, issued Jul. 27, 1999, entitled, "Optical Reader Having Improved Menuing Features," incorporated herein by reference in its entirety, it is understood that the capture and decode steps 2234 and 2238 may comprise a series of frame captures and failed decode attempts until a decodable symbol represented in a captured frame of image data is successfully decoded. The decode algorithm launched at block 2238 may be a bar code decoding algorithm. Aspects of decoding algorithms for decoding various types of symbols are known and are publicly available. AIM, Inc., the Association for Automatic Identification and Data Capture Technologies, publishes bar code symbology standards and notices. Various bar code standards are available from the AIM, Inc. website, www.aimglobal.org. The symbol decoded at block 2238 in addition to being a bar code may be (e.g., a decodable character such as an OCR character or a fingerprint) Further aspects of decodable symbol decoding are described in the previously referenced U.S. patent application Ser. No. 09/904,647.

At block 2242, control circuit 140 outputs a decoded out message, typically in the form of a character string in the case the decoded symbol decoded at block 2238 is a bar code symbol. The outputting of the decoded out message may be accomplished by displaying a decoded out message on a display 13d and/or sending a decoded out message to a device (e.g., a host computer 200 or network 1810) external from reader 10.

An example of image capture block 2214 in which at least one "parameter determination" frame of image data is captured for parameter determination prior to a frame being captured for output is described with reference to the flow diagram of FIG. 11d.

Figure 11D:
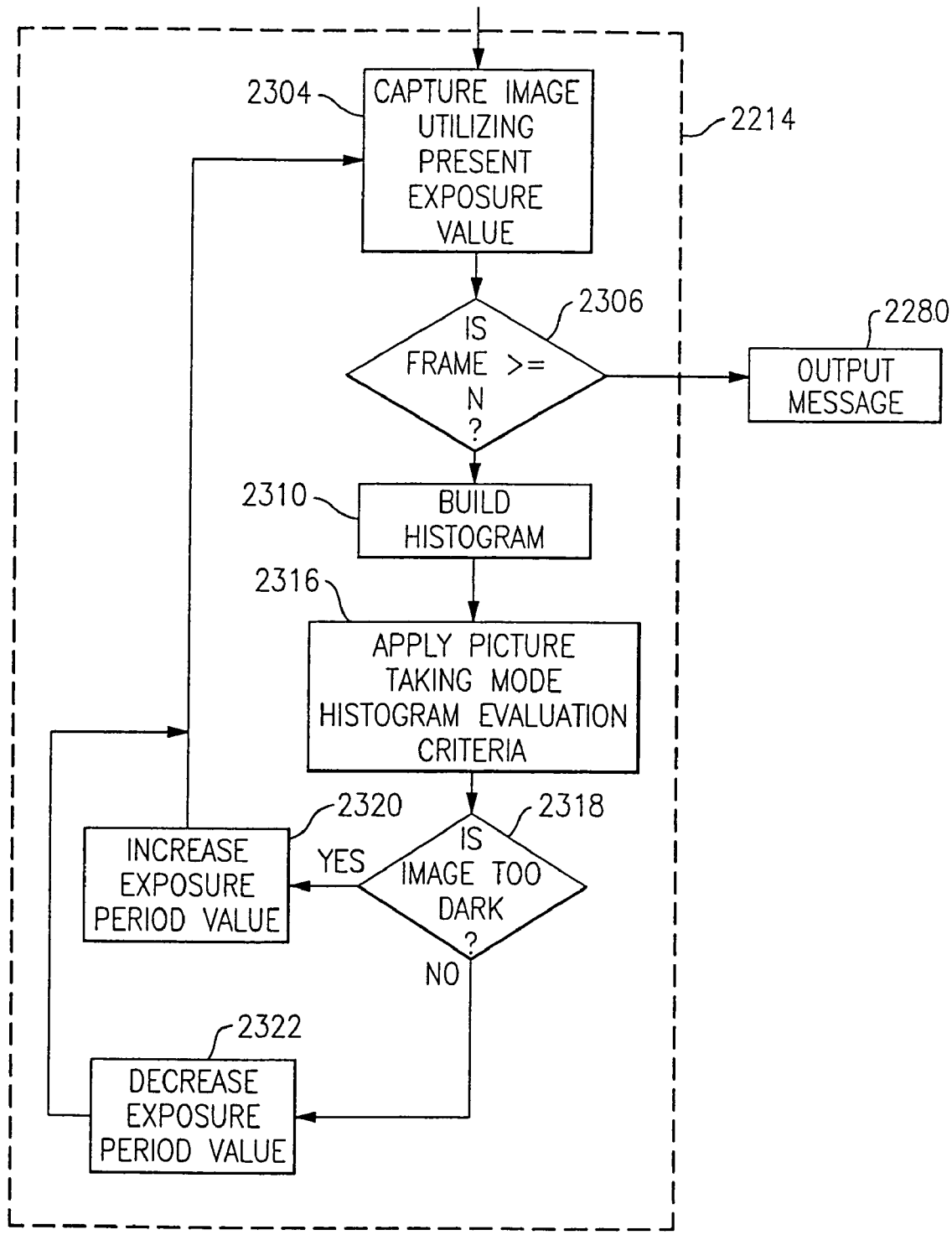

At block 2304, control circuit 140 captures a frame of image data utilizing a present exposure period value. If the frame captured at block 2304 is the first frame captured after reader 10 is driven into a picture taking mode, then the exposure period value may be an initial exposure period value loaded at block 2210 and selected to yield an image of high visual quality (another picture taking mode imaging input such as gain or illumination level could also or in the alternative be applied at block 2304). At block 2306, control circuit 140 determines if the last captured frame is to be output. For example, reader 10 can be set up so that a second, third or Nth frame is output after the previous frames are processed for parameter determination. In certain imaging systems, a parameter derived by analysis of captured image data is not available for input until after a plurality of frames have been captured. At block 2310, control circuit 140 builds a histogram summarizing the image data of the frame. A captured frame of image data typically comprises a plurality of gray scale pixel values. Generally a sample of pixel values are sampled from a full frame for purposes of generating a histogram. Alternatively, a partial frame of image data can be captured as described in copending application Ser. Nos. 09/766,806, filed Jan. 22, 2001, entitled "Optical Reader Having Partial Frame Operating Mode" and Ser. No. 09/766,922, filed Jan. 22, 2001, entitled "Optical Reader Having Reduced Parameter Termination Delay," incorporated herein by reference in its entirety. A histogram corresponding to a picture of a typical visual image (that is, not a typical decodable symbol) may take to form of picture taking mode histogram 2502 of FIG. 11f. Histogram 2502, if corresponding to a typical visual display image, may comprise substantially an even count of pixels at each gray scale value (0-255 in an 8 bit gray scale) throughout the range of possible gray scale values.

At block 2316, control circuit 140 evaluates picture taking mode histogram 2502 according to a picture taking mode histogram evaluation criteria. The inventors found that captured images have a high visual observation quality if image capturing inputs (exposure period, gain, illumination level) are controlled so that a median gray scale value of an image is at about a predetermined gray scale value, preferably a gray scale value in the middle (e.g., a gray scale value from about 55 to about 200) of the gray scale. In the specific example of FIG. 11f, histogram 2502 is evaluated to determine whether the median gray scale value of histogram is above or below the predetermined middle range gray scale value of 150. In other words, the median gray scale value of the histogram 2502 is set to a set point. In order to achieve the set point, imaging inputs are controlled in accordance with the evaluation of the histogram evaluation block 2316. If the captured image is too dark (if the median gray scale value of histogram 2502 is less than 150), control circuit 140 at block 2320 increases an exposure period value. If the captured image is too light, control circuit 2322 at block 2322 decreases an exposure period value to lighten a subsequent image. The exposure period adjustment steps at block 2320, 2322 could be substituted for by another suitable image capturing input (e.g., gain, control or illumination level control).

Figure 11E:
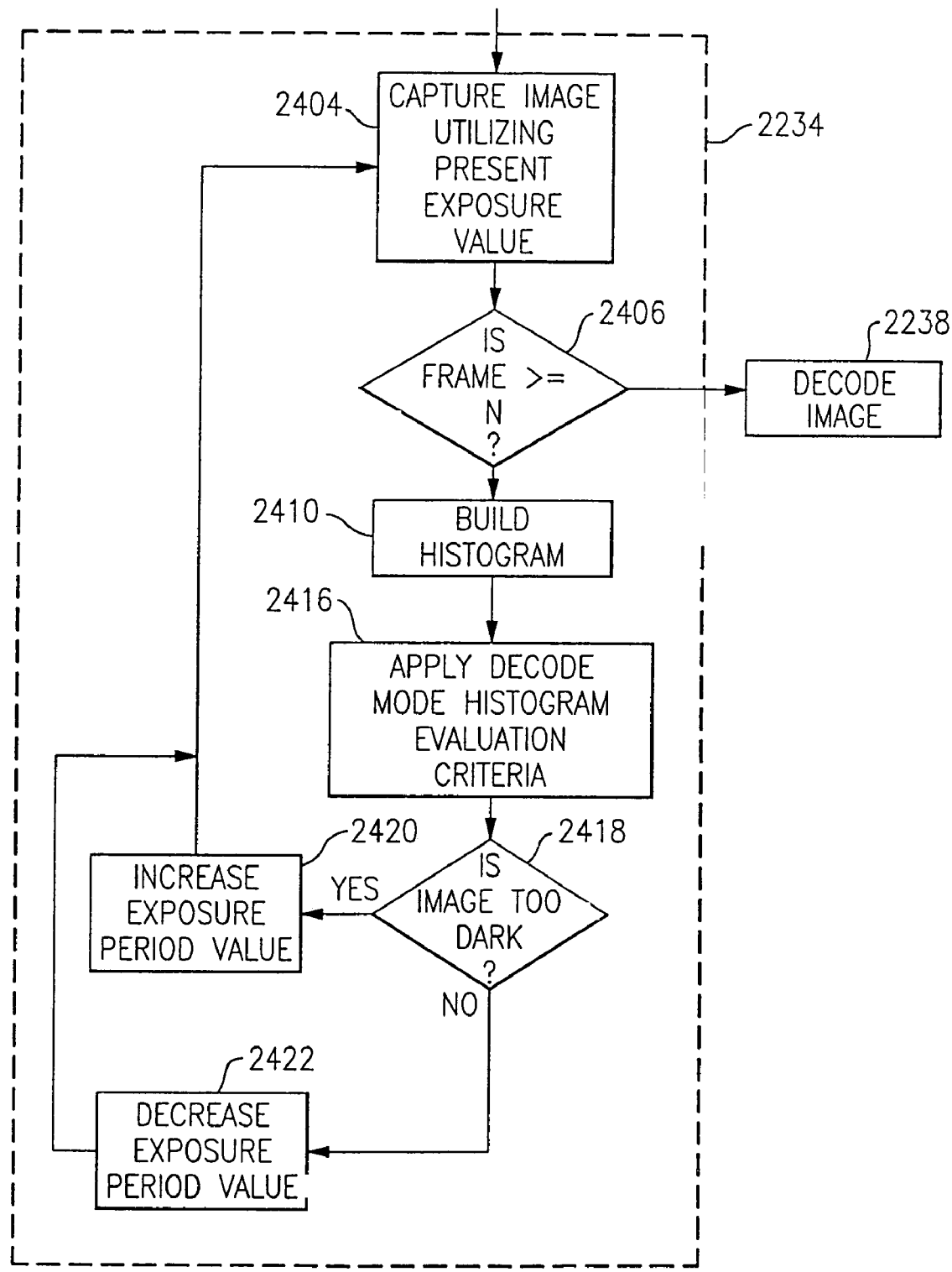
Figure 11F:
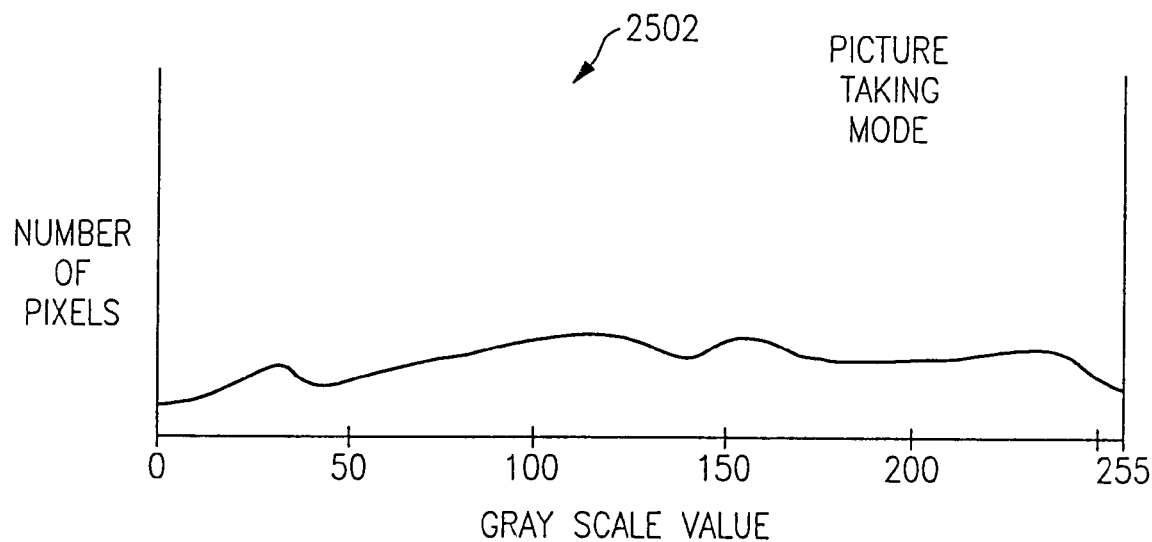
FIGS. 11f and 11g are histograms corresponding to captured frames of image data captured according to an embodiment of the invention.

In the flow diagram of FIG. 11e, an example of decode mode image capture block 2334 having a plurality of image capturing steps including parameter determination steps is described. The steps 2404, 2406, 2410, 2416, 2418, 2420, and 2422 of decode mode image capturing block 2234 of FIG. 11e are the same as the steps 2304, 2306, 2310, 2316, 2318, 2320, and 2322 described with reference to the flow diagram of FIG. 11d except for two points of distinction: first, the initial ($E_0$) decode mode exposure value period (or other initial imaging input) applied at the first execution of block 2404 is a value different than the initial ($E_0$) picture taking mode exposure period value applied at block 2304. In general, an initial exposure period in a picture taking mode is selected to be longer than an initial exposure period in a decode mode. The inventors found that for high quality visual display (display wherein represented objects can readily be discerned by the human eye), lighter images are preferred and that for decoding, darker and faster captured images can be utilized.

Figure 11G:
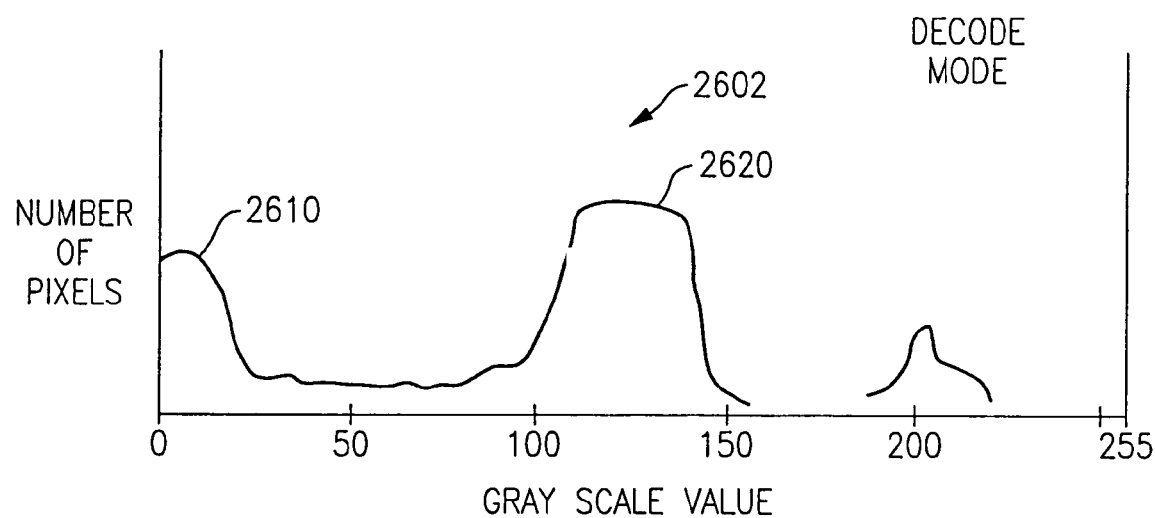

The second difference respecting the decode mode capture block 2234 as depicted in FIG. 11e and the picture taking mode image capture block 2214 as depicted in FIG. 11d is in relation to the application of histogram evaluation criteria (block 2416 as compared to block 2316). In a decode mode histogram evaluation block 2416 a different histogram evaluation criteria is applied than the criteria applied at picture taking mode histogram evaluation block 2316. A representation of histogram 2602 corresponding to an image of a black decodable symbol on a white substrate is shown on FIG. 11g. Histogram 2602 represents what may be considered a bi-tonal image. Histogram 2602 includes a high number of gray scale values at a dark pixel range, as indicated by dark peak 2610 and a high number of gray scale values at a light pixel range as is indicated by light peak 2620.

The inventors found that captured images are quickly obtained and readily decoded if image capturing inputs (exposure period, gain, illumination level) are controlled so that a predetermined near peak gray scale value of a histogram corresponding to an image is at about a predetermined gray scale value, preferably a gray scale value in the middle (e.g., a gray scale value from about 55 to about 200) of the gray scale. In the specific example of FIGS. 11e and 11f, histogram 2602 is evaluated to determine whether a predetermined 97% peak gray scale value of histogram 2602 (the gray scale value at which 3% of gray scale values are above and 97% below) is above or below the predetermined middle range gray scale value of 150. In other words, a predetermined near peak gray scale value of the histogram is set to a set point. In order to achieve the set point, imaging inputs are controlled in accordance with the evaluation at the histogram evaluation block 2416. If the captured image is too dark (if the 97% gray scale value of histogram 2602 is less than 150), control circuit 140 at block 2420 increases an exposure period value to brighten the image. If the captured image is too light, control circuit 140 at block 2422 decreases an exposure period value. The exposure period adjustment steps at blocks 2420, 2422 could be substituted for by another suitable image capturing input (e.g., gain, control or illumination level control). The use of a near peak value (e.g., 97%) at histogram evaluation block 2416 as opposed to a peak value (the highest gray scale value of the histogram) minimizes the impact that spuriously high light values (as might be caused Referring now to the flow diagram of FIG. 11b an alternative embodiment of the invention is described. In the embodiment of FIG. 11b, control circuit 140 is operable as described in FIG. 11a except that control circuit 140 further includes an automatic imaging mode as indicated by block 2200. In an automatic imaging mode as described in previously referenced U.S. patent application Ser. No. 09/904,647, filed Jul. 13, 2001, entitled, "Applying A Color Imager To A Hand Held Reader For Indicia Reading And Image Capture," an image is captured at block 2254 and subjected to classification by a classification circuit at block 2258. At block 2258, the image can be classified on the basis of whether the image includes a graphical symbol such as bar codes, text or OCR characters. High energy, (e.g., black-white transitions are a good indicator for the presence of a graphical symbol, such as a bar code symbol). Where image sensor 32 is a color image sensor, a black and white bi-tonal image will consist of green pixels that are in one of two possible value ranges. One narrow range of values is representative of white portions of the image, whereas the other narrow range of values is representative of black portions of the image. Where image sensor 32 is a monochrome image sensor, a black and white bi-tonal image will consist of pixel values that are within one of two ranges at the extremes of the gray scale. Further aspects of graphical symbol detection are described in greater detail in the previously referenced U.S. patent application Ser. No. 09/904,647, filed Jul. 13, 2001, entitled, "Applying A Color Imager To A Hand Held Reader For Indicia Reading And Image Capture," In determining whether a captured frame of image includes a bi-tonal graphical symbol, control circuit 140 may evaluate whether a frame of image data includes pixel values in two distinguishable ranges of pixel values.

At block 2262, control circuit 140 processes the image captured at block 2254 in a manner that depends on the classification of the image at block 2258. For example, if at block 2258, control circuit 140 determines that the captured image does not include a graphical symbol, then control circuit 140 may, without attempting to decode decodable symbol, output the image in the manner described with reference to block 2220. If control circuit 140 at block 2258 determines that the image does in fact include a graphical symbol, control circuit 140 at block 2262 may attempt to decode a decodable symbol therein and output a decoded out message (e.g., display the message on a display or sent it to host 200 or network 1810).

If at block 2262, control circuit 140 determined that an image does not include a graphical symbol, control circuit 140 may in the alternative automatically jump to block 2210 to load at least one "picture taking mode" imager control parameter, and then automatically execute blocks 2214 and block 2220 as described previously to capture a subsequent frame of image data and to output the captured frame captioned at block 2214. If at block 2262, control circuit 140 determines that an image does, in fact, include a graphical symbol, control circuit 140 may automatically jump to block 2230 to load at least one decode mode imager control parameter as described previously and then automatically jump to block 2234 and then to block 2242 to decode a decodable symbol (block 2238) and then output a decoded output message corresponding to the symbol (block 2242).

Control circuit 140 may be driven into one of the picture taking, decode mode or automatic imaging modes by way of a user entering a command with use of one of an available menu interface, as described previously with reference to selection of the linear decode mode. The picture taking, decode, and automatic imaging modes may be selected (e.g., with use of a local or remote graphical user interface, with use of menu symbols, or by actuation of an appropriate key or a local or remote keyboard). With reference to FIG. 3e, a picture taking mode can be selected by actuation of icon 1702, a decode mode can be selected by actuation of decode mode icon 1701, 1703 an automatic imaging mode can be selected by actuation of icon 1704. Further, as will be described, "photograph improvement" mode of operation, which can be selected by actuation of icon 1705, or with use of another suitable menu interface (e.g., remote GUI, local or remote keyboard key, menu symbol) describer herein.

Figure 12:
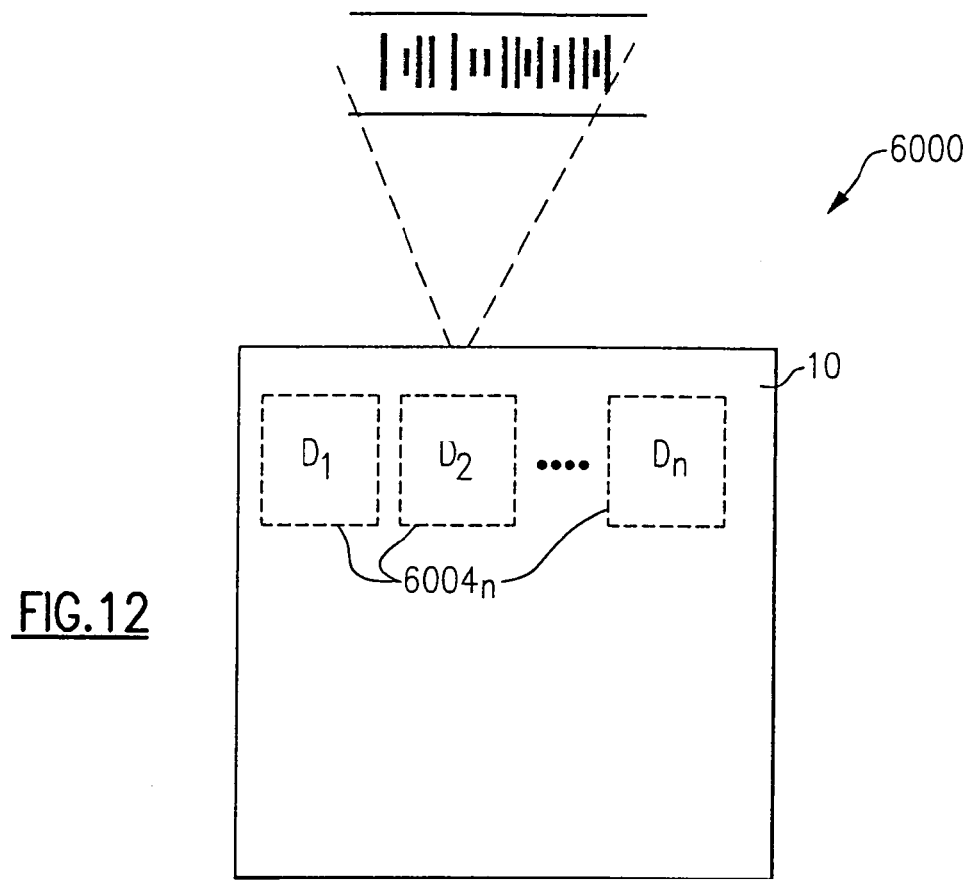
FIG. 12 schematically illustrates a digital image reading system according to an embodiment of the invention.

According to another embodiment, illustrated in block form in FIG. 12, a digital image reading system 6000 includes an image reading component 10 that contains and/or utilizes a plurality of digitizers ($D_1 \ldots D_n$) $6004_n$, and an image decode component (not shown). The fundamental purpose of a digitizer is to accurately determine the bars and spaces (or other symbology contrast indicia of a particular dataform or code) so that the information can then be sent to the decode module for decoding. As mentioned earlier, a "one size fits all" digitizer may have high failure rates under varying read conditions that do not fall within the operational window of the digitizer. For instance, a typical single digitizer reader configured to optimally operate in a warehouse environment may work fine for a relatively long read distance. However, the same digitizer may produce inferior performance in a reader utilized for a relatively short reading distance, as in a supermarket checkout for example. Digitizers may also be optimally configured for parameters other than reading range; for example, bar code contrast, bar code color contrast, motion induced blur, and bar growth are illustrative parameters that affect successful image capture. The range of each parameter over which the digitizer will successfully operate will be determined by the various constraints built into the algorithm for the particular digitizer.

Figure 13:
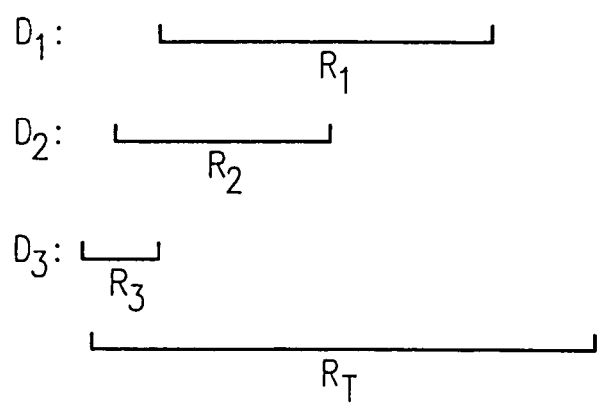
FIG. 13 illustrates exemplary plural digitizer parameter ranges according to an embodiment of the invention.

According to the embodiment of the invention, the reader 10 illustrated in FIG. 12 may, for example, employ three separate digitizers $D_1$, $D_2$, and $D_3$, each of which is configured to operate over a respective read range, $R_n$, as illustrated in FIG. 13. In this example, $R_1$ represents a relatively far reading distance, $R_2$ represents a relatively medium reading distance, and $R_3$ represents a relatively short reading distance. In a reader system incorporating all three digitizers, a total reading distance represented by $R_T$ could successfully be captured where $R_T$ is greater than any one of the reading distances $R_n$. In an aspect, digitizers 6004$_n$ ($D_1$, $D_2$ ... $D_n$) are software modules executable by control circuit 140. Integrated circuit 180 may also include decoders $C_1$, $C_2$ ... $C_n$ in the form of software modules executable by control circuit 140.

The interface of the multiple digitizers to the overall system 100 is a principal consideration in efficiently decoding bar code symbols, while utilizing the advantages of the multiple digitizers $D_n$. In one aspect, control circuit 140 may drive the different plurality of digitizers in parallel with each other, depending on the speed of the scanning system. One could then combine the results that get passed to the decoder $C_n$ by adding the digitizer results of one scan to the end of the digitizer results of another scan, giving a single result. In another aspect, control circuit 140 may launch the plurality of digitizers sequentially, with each scan being sent through one digitizer, $D_1$, and the result then attempted to be decoded. If that attempt fails, the scan could then be sent through another digitizer, $D_2$, and another attempt at decoding made, and so on and so forth for the plurality of digitizers $D_n$. In another aspect relating to a linear scanning system wherein the scanning itself may be the fastest part of the system, the control circuit 140 directs each of the scans to go through successive digitizers; that is, the first scan taken by the device would go through the first digitizer and an attempt would be made to decode the result. After the decode attempt, control circuit 140 would launch a new scan and the results sent to the second digitizer, with an attempt to decode the result, and so on for the plurality of digitizers.

Several illustrative techniques for making intelligent decisions about which digitizer methodology to use, which can help optimize the decoding speed, are presented as follows:

EXAMPLE 1: Voting

In linear bar code decoding, the process of verifying a bar code read by successively decoding the same bar code in multiple scans is used to eliminate cases where the bar code is not interpreted correctly or where a noisy signal may randomly generate a bar code read. This will be henceforth referred to as voting the bar code. To find the correct digitization method for the bar code itself, the system cycles through the different digitizers running on the system. However, once a digitizer has yielded what appears to be valid bar code data, then the system will "lock on" to that digitizer, and use it exclusively for the next few scans in an attempt to vote the bar code and get a successful read. For instance, if a certain digitizer $D_x$ found what is believed to be bar code data, the control circuit 140 would then configure the system to use that same digitizer $D_x$ and only that digitizer for the next N number of scans (where usually N>1) to ensure that a significant number of attempts are made with that digitizer to see that same data again. If that same bar code data is seen during those N times of using the same digitizer during the voting process, the control circuit 140 would refresh the system that number of times to use that same digitizer again for N times. However, if or when enough decodes are seen to consider the symbol voted as a successful read, or if the number of times to use the same digitizer counts down to zero, the control circuit would reset the system to cycle through the digitizers to find the next bar code.

In an aspect, once bar code data has been seen by a digitizer, that same scan is run through all of the digitizers to determine if there are multiple digitizers that can extract the same data from the scan line. An attempt can then be made to rank the effectiveness of each one. For instance, if three digitizers came up with the same data (i.e. decoded the bar code part of the signal correctly), it might be determinable which of the digitizers ignored more of the surrounding area or, in other words, which digitizer found the least number of transitions in the signal but still was able to successfully decode the bar code. An alternative aspect would involve ranking individual strong and weak points of each digitizer in the system. In this case, where the same data is decoded in a given scan line with more than one digitizer, it may be noticed that all of the digitizers were respectively ascending in rank of a particular attribute, but descending in rank of another, in which case the idea would be to pick the middle-most one of that group.

EXAMPLE 2: Stacked Linear

Another instance where the control circuit 140 can configure the system such that a given digitizer is used for the next subsequent N scans is with the case of a stacked linear bar code such as PDF417. Stacked linear bar codes inherently require multiple single line scans in order to successfully decode. For example, where the system is cycling through the plurality of digitizers and sees a valid decode of a row of stacked linear data, the system is configured to use that same digitizer exclusively for the next N scans (again usually N>1). If a subsequent line of data from that stacked linear code is decoded during those N times of using the same digitizer, the system is then refreshed to use that digitizer for another N scans. However, if or when enough data is received to create a successful decode, or if the number of times to use a given digitizer N counts down to zero having not seen another row of stacked linear data, the system is then reset to cycle through the other digitizers in attempting to find the next bar code.

In another aspect, if a valid row of a stacked linear bar code is found, the process would cycle through all of the digitizers with that exact scan to determine which digitizer produces the highest code word yield for that line of data, and then configure the system to use that digitizer.

EXAMPLE 3: Statistical Decision Making

In a contemplated aspect, the multiple digitizers would be used to essentially optimize scanning in a given environment. For example, statistical records would kept internal to the system during the process of cycling through the digitizers to rank all of the digitizers in the order of their success rate at finding bar code data (i.e. not counting the times when a specific digitizer is used repeatedly for voting). Then, an intelligent decision could be made as to the order of how the digitizers would be run through. For instance, the first digitizer in this ranking would be the one that was statistically most successful at finding a bar code, the second would be the second most successful, and so on. It may be that one digitizer happens to be twice as successful as the combined success rate of each of the others, in which case that one digitizer would get called not only with the first scan, but also with the third, and fifth, etc. Assuming that the scanning environment remains fairly consistent (i.e. print quality, size, read distance, etc.), eventually the order of the digitizers would be optimized to run in this environment.

A digital image reading system including an image sensor and a computer that is programmed to adjust the frame rate of the image sensor, and to obtain a maximum frame rate of the image sensor for obtaining an acceptable image. An algorithm for adjusting the frame rate evaluates image parameters and calculates new exposure times, gain values, and exposure settings to support a maximum frame rate of the image sensor. A process for obtaining an acceptable image with an image reader evaluates an image signal level and adjusts the frame rate if the signal level is outside of a predetermined range. The process adjusts the image sensor to run at a maximum operational frame rate. A digital image reading system including multiple separate digitizers for use in various read environments and under various read conditions.

In accordance with embodiments of the invention described and claimed herein, there are provided an optical image reading system (including scanning and decoding components) and method suitable for use with bar code readers, bar code scanning engines, portable data terminals (PDTs) and other device form factors as those skilled in the art will appreciate, that are adaptable to the object environment and/or input conditions, and by which result improved data acquisition time and data acquisition accuracy. In an aspect, the reader will automatically adapt to different read conditions or environments.

An embodiment of the invention is directed to a process for obtaining an acceptable image with an image reader. As used herein, the term "acceptable image" refers to image data (i.e., 1D or 2D symbology, text, image, or other indicia) that meets the threshold criteria of signal contrast, brightness, or other image characteristics utilized by the imager control algorithm; that is one that falls within a configured tolerance of the target image requirements set forth by the algorithm. In an aspect, the process includes the acquisition of an initial image (pixel data) with an appropriate image reader operating at a given frame rate and, based upon a signal level analysis, calculating a new frame rate. In an aspect, the new frame rate is a maximum frame rate. The term 'maximum frame rate' as used herein throughout refers to the highest operation frame rate of the image sensor that supports a calculated or otherwise desirable exposure time/ signal gain value, and which results in the acquisition of an acceptable image. According to an aspect, the method involves the step of dynamically adjusting the frame rate such that a maximum frame rate is achieved. The acceptable image is then decoded or otherwise processed by the system.

Another embodiment of the invention is directed to an algorithm that is utilized by an image reader/decoder. The algorithm is designed to evaluate certain image characteristics of an acquired image and to determine whether the image sensor is operating at the fastest frame rate. The outcome of this determination can then be the basis for calculating new exposure time and gain values that support a new frame rate which, in an aspect, is the maximum operationa frame rate of the imager for obtaining an acceptable image.

Another embodiment of the invention is directed to a digital image reading system, including an image sensor that is operationally coupled to a computer that can dynamically alter the frame rate of the image sensor to acquire an acceptable image. In various aspects, the image reader can read/decode/display 1D or 2D symbology and/or composite images.

Another embodiment according to the invention is directed to a digital image reading system including an image reading component having a plurality of digitizers. In an aspect, the image reader utilizing multiple digitizers can operate over various parameter ranges of different image reading parameters that may vary beyond the control of the operator and detrimentally affect image acquisition. The plurality of digitizers collectively enable the reader to successfully operate over a greater or enhanced range of conditions than would be enabled by a single digitizer. In various aspects, the digitizers are hardware-based digitizers or, alternatively, software-based digitizers employing known digital signal processing algorithms. In various aspects, the plurality of digitizers are operationally configured to run in parallel or, alternatively, sequentially, or time overlapped with a predetermined lag time, such that the total processing time required for multiple digitization attempts is equivalent to, or faster than, the processing time required by a single digitizer image reader or a reader that successively subjects the image parameters to multiple digitization algorithms.

All of the foregoing device and process embodiments may be carried out using a hand-held dataform (bar code or other symbology) reading device having a solid-state image sensor.

While the present invention has been particularly shown and described with reference to the preferred mode as illustrated in the drawing, it will be understood by one skilled in the art that various changes in detail may be effected therein without departing from ythe spirit and scope of the invention as defined by the claims.

We Claim:

1. An algorithm for use by a digital image reader/decoder, comprising the steps:
    (i) acquire an image at an initial frame rate parameter, gain parameter, and exposure time parameter,
    (ii) evaluate the image,
    (iii) determine whether the system is operating at a fastest frame rate, and, if not,
    (iv) calculate a new exposure time parameter to provide a desired image illumination,
    (v) calculate a maximum frame rate parameter that will support the new exposure time,
    (vi) calculate a new exposure setting parameter that will support the new exposure time at the maximum frame rate,
    (vii) determined whether the image is acceptable and, if yes,
    (viii) output and decode the image, and provide the parameters in (iv-vi) to the imager as new initial parameters, and
    (ix) return to (i).

2. An algorithm for use by a digital image reader/decoder, comprising the steps:
    (i) acquire the image,
    (ii) evaluate the image,
    (iii) determine whether the system is operating at a fastest frame rate, and, if not,
    (iv) calculate a new exposure time parameter to provide a desired image illumination,
    (v) calculate a maximum frame rate parameter that will support the new exposure time,
    (vi) calculate a new exposure setting parameter that will support the new exposure time at the maximum frame rate,
    (vii) determine whether the image is acceptable and, if not,
    (viii) provide the parameters in (iv-vi) to the imager as new initial parameters, and
    (ix) return to (i).

3. An alogrithm for use by a digital image reader/decoder, comprising the steps:
    (i) acquire the image,
    (ii) evaluate the image, (iii) determine whether the system is operating at a fastened frame rate, and, if yes
(iv) determine an illumination level of the image and whether the image was acquired at a maximum exposure setting and a maximum gain setting and, if no,
(v) calculate a new exposure parameter and a new gain parameter that are, at most, maximum respective values for the initial frame rate, which produce a desired image illumination,
(vi) determine whether the image is acceptable and, it not,
(vii) provide the parameters in [(iv-vi)] to the imager as new initial parameters, and
(viii) return to (i).

4. An alogrithm for use by a digital image reader/decoder, comprising the steps:
(i) acquire the image,
(ii) evaluate the image,
(iii) determine whether the system is operation at a fastest rate, and, if yes,
(iv) determine an illumination level of the image and whether the image was acquired at a maximum exposure setting and a maximum gain setting and, if no,
(v) calculate a new expsoure parameter and a new gain parameter that are, at most, maximum respective values for the initial frame rate, which produce a desired image illumination,
(vi) determine whether the image is acceptable and, if yes,
(vii) output and decode the image, and provide the parameters in (iv-vi) to the imager as new initial parameters, and
(viii) return to (i).

5. An algorithm for use by a digital image reader/decoder, comprising the steps:
(i) acquire the image,
(i) evaluate the image,
(iii) determine whether the system is operating at a fastest frame rate, and, if yes,
(iv) determine an illumination level of the image and whether the image was acquired at a maximum exposure setting and a maximum gain setting and, if yes,
(v) calculate a new exposure time parameter that will provide a desired image illumination,
(vi) calculate a maximum frame rate parameter that will support the new exposure time parameter,
(vii) calculate a new exposure setting parameter that will support the new exposure time at the maximum frame rate,
(viii) determine whether the image is acceptable and, if yes,
(ix) output and decode the image, and provide the parameters in (v-vii) to the imager as new initial parameters, and
(x) return to (i).

6. An algorithm for use by a digital image reader/decoder, comprising the steps:
(i) acquire the image,
(ii) evaluate the image,
(iii) determine whether the system is operating at a fastest frame rate, and, if yes,
(iv) determine an illumination level of the image and whether the image was acquired at a maximum exposure setting and a maximum gain setting and, if yes,
(v) calculate a new exposure time parameter that will provide a desired image illumination,
(vi) calculate a maximum frame rate parameter that will support the new exposure time parameter,
(vii) calculate a new exposure setting parameter that will support the new exposure time at the maximum frame rate,
(viii) determine whether the image is acceptable and, if yes,
(ix) output and decode the image, and provide the parameters in (v-vii) to the imager as new initial parameters, and
(x) return to (i).

7. A digital image reading system, comprising:
a) an image sensing component adapted to acquire an image at an initial frame rate parameter, gain parameter, and exposure time parameter; and
b) a computer coupled to the image sensing component, wherein the computer is programmed to adjust the frame rate such that the image sensing component can operate at a maximum frame rate to capture an acceptable image, wherein the computer is programmed to:
(i) acquire the image,
(ii) evaluate the image
(iii) determine whether the system is operating at a fastest frame rate, and, if not,
(iv) calculate a new exposure time parameter to provide a desired image illumination,
(v) calculate a maximum frame rate parameter that will support the new exposure time,
(vi) calculate a new exposure setting parameter that will support the new exposure time at the maximum frame rate,
(vii) determine whether the image is acceptable and, if yes,
(viii) output and decode the image, and provide the parameters in (iv-vi) to the imager as new initial parameters, and
(ix) return to (i).

8. A digital image reading system, comprising:
(a) an image sensing component adapted to acquire an image at an initial frame rate parameter, gain parameter, and exposure time parameter; and
(b) a computer coupled to the image sensing component, wherein the computer is programmed to adjust the frame rate such that the image sensing component can operate at a maximum frame rate to capture an acceptable image, wherein the computer is programmed to:
(i) acquire the image,
(ii) evaluate the image
(iii) determine whether the system is operating at a fastest frame rate, and if not,
(iv) calculate a new exposure time parameter to provide a desired image illumination,
(v) calculate a maximum frame rate parameter that will support the new exposure time,
(vi) calculate a new exposure setting parameter that will support the new exposure time at the maximum frame rate,
(vii) determine whether the image is acceptable, and if not,
(viii) provide the parameters in (iv-vi) to the imager initial parameters, and
(ix) return to (i).

9. A digital image reading system, comprising:
a) an image sensing component adapted to acquire an image at an initial frame rate parameter, gain parameter, and exposure time parameter; and
b) a computer coupled to the image sensing component, wherein the computer is programmed to adjust the frame rate such that the image sensing component can operate at a maximum frame rate to capture an acceptable image, wherein the computer is programmed to:
(i) acquire the image,
(ii) evaluate the image
(iii) determine whether the system is operating at a fastest frame rate, and if yes,
(iv) determine an illumination level of the image and whether the image was acquired at a maximum exposure setting and a maximum gain setting, and, if no,
(v) calculate a new exposure parameter and new gain parameter that are, at most, maximum respective values for the initial frame rate, which produce a desired image illumination,
(vi) determine whether the image is acceptable and, if not,
(vii) provide the parameters in (iv-vi) to the imager as new initial parameters, and
(viii) return to (i).

10. A digital image reading system, comprising:
a) an image sensing component adapted to acquire an image at an initial frame rate parameter, gain parameter, and exposure time parameter; and
b) a computer couopled to the image sensing component, wherein the computer is programmed to adjust the frame rate such that the image sensing component can operate at a maximum frame rate to capture an acceptable image, wherein the computer is programmed to:
(i) acquire the image,
(ii) evaluate the image,
(iii) determine whether the system is operating at a fastest frame rate, and, if yes,
(iv) determine an illumination level of the image and whether the image was acquired at a maximum exosure setting and a maximum gain setting, and, if no,
(v) calculate a new exposure parameter and a new gain parameter that are, at most, maximum rsepective values for the initial frmae rate, which produce a desired image illumination,
(vi) determine whether the image is acceptable and, if yes,
(vii) output and decode the image, and provide the parameters in (iv-vi) to the imager as new initial parameters, and <(viii) return to (i).

11. A digital image reading system, comprising:
a) an image sensing componenet adapted to acquire an image at an initial frame rate parameter, gain parameter, and exposure time parameter; and
b) a computer coupled to the image sensing component, wherein the computer is programmed to adjust the frame rate such that the image sensing component can operate at a maximum frame rate to capture an acceptable image, wherein the computer is programmed to:
(i) acquire the image,
(ii) evaluate the image,
(iii) determine whether the system is operating at a fastest frame rate, and, if yes,
(iv) determine an illumination level of the image and whether the image was acquired at a maximum exposure setting and a maximum gain setting, and, if yes,
(v) calculate a new exposure time parameter that will provide a desired image illumination,
(vi) calculate a maximum frame rate parameter the will support the new exposure time parameter,
(vii) calculate a new exposure setting parameter that will support the new exposure time at the maximum frame rate,
(viii) determine whether the image is acceptable and, if yes,
(ix) output and decode the image, and provide the parameters in (v-vii) to the imager as new initial parameters, and
(x) return to (i).

12. A digital image reading system, comprising:
a) an image sensing component adapted to acquire an image at an initial frame rate parameter, gain parameter, and exposure time parameter; and
b) a computer coupled to the image sensing component, wherein the computer is programmed to adjust the frame rate such that the image sensing component can operate at a maximum frame rate to capture an acceptable image, wherein the computer is programmed to:
(i) acquire the image,
(ii) evaluate the image,
(iii) determine whether the system is operating at a fastest frame rate, and, if yes,
(iv) determine an illumination level of the image and whether the image was acquired at a maximum exposure setting and a maximum gain setting, and, if yes,
(v) calculate a new exposure time parameter that will provide a desired image illumination,
(vi) calculate a maximum frame rate parameter that will support the new exposure time parameter,
(vii) calculate a new exposure setting parameter that will support the new exposure time at the maximum frame rate,
(viii) determine whether the image is acceptable and, if yes,
(ix) output and decode the image, and provide the parameters in (v-vii) to imager as new initial parameters, and
(x) return to (i).

13. A digital image reading system, comprising:
a) an image reading component including a digitizer; and
b) an image decoding component,
wherein the image reading component includes a plurality of digitizers, and wherein each of the plurality of digitizers is configured to operate over a respective parameter range of a given parameter associated with the plurality of digitizers, and further wherein each parameter range is different from any other parameter range.

14. The digital image reading system of claim 13, wherein the given parameter is a reading distance.

15. The digital image reading system of claim 13, wherein the given parameter is a symbology black/white contrast.

16. The digital image reading system of claim 13, wherein the given parameter is a symbology color contrast.

17. The digital image reading system of claim 13, wherein the given parameter is a motion blur.

18. The digital image reading system of claim 13, wherein the given parameter is a bar growth.

19. The digital image reading system of claim 13, comprising three digitizers configured to operate over a close reading range, a medium reading range, and far reading range.

20. The digital image reading system of claim 19, wherein at least two of the parameter ranges overlap.

21. A process for obtaining an acceptable image, comprising:

providing a digital image reader having a plurality of digitizers;

making an image acquistion attempt utilizing one of the plurality of digitizers; and making a subsequent image acquistion attempt utlilizing a different one of the plurality of digitizers, wherein the plurality of digitizers are configured for operation over a respective parameters range of a given parameter associated with the plurality of digitizers, further wherein each parameter range is different from any other parameter range.

22. A bar code reading device comprising:

an image sensor including a plurality of photosensitive elements:

a lens assembly focusing an image onto said image sensor;

a trigger;

a housing encapsulating said image sensor;

a control circuit in communication with said image sensor wherein said device is configured so that said device captures image data in response to actuation of said trigger; and a plurality of digitizers, wherein each of the plurality of digitizers is configured to operate over a respective parameter range of a given parameter associated with the plurality of digitizers, and further wherein each parameter range is different from any other parameter range.

23. The bar code reading device of claim 22, wherein the given parameter is a reading distance.

24. The bar code reading device of claim 22, wherein the given parameter is a symbology black/white contrast.

25. The bar code reading device of claim 22, wherein the given parameter is a symbology color contrast.

26. The bar code reading device of claim 22, wherein the given parameter is a motion blur.

27. The bar code reading device of claim 22, wherein the given parameter is a bar growth.

28. The bar code reading device of claim 22, comprising three digitizers configured to operate over a close reading range, a medium reading range, and a far reading range.

29. The bar code reading device of claim 22 wherein at least two of the parameter ranges overlap.

30. The bar code reading device of claim 22, wherein each of said plurality of digitizers is a software module executable by said control circuit.

31. The bar code reading device of claim 22, wherein said plurality of digitizers are configured to run in parallel.

32. The bar code reading device of claim 22, wherein said plurality of digitizers are configured to run in series.

33. The bar code reading device of claim 22, wherein said image sensor is a two dimensional image sensor comprising a plurality of pixels formed in a plurality of rows and columns of pixels.

34. The bar code reading device of claim 33, wherein the given parameter is a reading distance.

35. The bar code reading device of claim 33, wherein the given parameter is a symbology black/white contrast.

36. The bar code reading device of claim 33, wherein the given parameter is a symbology color contrast.

37. The bar code reading device of claim 33, wherein the given parameter is a motion blur.

38. The bar code reading device of claim 33, wherein the given parameter is a bar growth.

39. The bar code reading device of claim 33, comprising three digitizers configured to operate over a close reading range, a medium reading range, and a far reading range.

40. The bar code reading device of claim 39, wherein at least two of the parameter ranges overlap.

41. The bar code reading device of claim 33, wherein each of said plurality of digitizers is a software module executable by said control circuit.

42. The bar code reading device of claim 33, wherein said plurality of digitizers are configured to run in parallel.

43. The bar code reading device of claim 33, wherein said plurality of digitizers are configured to run in series.

* * * * *